US011366858B2

(12) United States Patent
Atallah

(10) Patent No.: US 11,366,858 B2
(45) Date of Patent: Jun. 21, 2022

(54) DATA PREPARATION USING SEMANTIC ROLES

(71) Applicant: Tableau Software, Inc., Seattle, WA (US)

(72) Inventor: Ryan Andrew Atallah, Palo Alto, CA (US)

(73) Assignee: TABLEAU SOFTWARE, INC., Seattle, WA (US)

(*) Notice: Subject to any disclaimer, the term of this patent is extended or adjusted under 35 U.S.C. 154(b) by 195 days.

(21) Appl. No.: 16/679,234

(22) Filed: Nov. 10, 2019

(65) Prior Publication Data

US 2021/0141838 A1 May 13, 2021

(51) Int. Cl.
| | |
|---|---|
| *G06F 7/00* | (2006.01) |
| *G06F 16/9032* | (2019.01) |
| *G06F 16/904* | (2019.01) |
| *G06F 16/957* | (2019.01) |
| *G06F 16/901* | (2019.01) |

(52) U.S. Cl.
CPC ...... *G06F 16/90332* (2019.01); *G06F 16/904* (2019.01); *G06F 16/9024* (2019.01); *G06F 16/9027* (2019.01); *G06F 16/9577* (2019.01)

(58) Field of Classification Search
CPC .......... G06F 16/90332; G06F 16/904; G06F 16/9577; G06F 16/9027
USPC ................................ 707/722, 769, 999.001
See application file for complete search history.

(56) References Cited

U.S. PATENT DOCUMENTS

| | | | |
|---|---|---|---|
| 2004/0083199 A1 | 4/2004 | Govindugari et al. | |
| 2013/0031117 A1 | 1/2013 | Stein et al. | |
| 2014/0074760 A1 | 3/2014 | Boldyrev et al. | |
| 2015/0261796 A1* | 9/2015 | Gould ................... | G06F 16/215 |
| | | | 707/694 |

(Continued)

FOREIGN PATENT DOCUMENTS

WO  WO2016049437 A9  3/2016

OTHER PUBLICATIONS

Hulsebos Madelon et al., "Sherlock A Deep Learning Approach to Semantic Data Type Detection," KDD' 19 Aug. 4-8, 2019, Anchorage, AK, USA, 9 pgs.

(Continued)

*Primary Examiner* — Md I Uddin
(74) *Attorney, Agent, or Firm* — Morgan, Lewis & Bockius LLP

(57) ABSTRACT

A method prepares data for subsequent analysis. The method obtains a data model that encodes a data sources as a tree of logical tables. Each logical table has its own physical representation and includes logical fields. Each logical field corresponds to either a data field or a calculation that spans logical tables. The method associates each logical table in the data model with a corresponding concept in a concept graph. The concept graph embodies hierarchical inheritance of semantics. For each logical field, the method assigns a semantic role to the logical field based on a concept corresponding to a logical table. The method also validates the logical field based on its semantic role. The method also displays transformations to clean the logical field based on validating the logical field. The method transforms the logical field according to a user selection, and updates the logical table.

19 Claims, 35 Drawing Sheets

(56) References Cited

U.S. PATENT DOCUMENTS

2016/0259832 A1* 9/2016 Shore .................. G06F 16/283

OTHER PUBLICATIONS

Sean Kandel et al., "Wrangler: Interactive Visual Specification of Data Transformation Scripts," CHI 2011, Session: Developers & End-user Programmers, May 7-12, 2011, Vancouver, BC, Canada, pp. 3363-3372, 10 pgs.
Tableau Software, Inc., International Search Report and Written Opinion, PCT/US2020/053406, dated Nov. 23, 2020, 15 pgs.
Vidya Setlur et al., "Inferencing Underspecified Natural Language Utterances in Visual Analysis," Proceedings of the 24th International Conference on Intelligent User Interfaces, (IUI" 19), Mar. 17-20, 2019, pp. 40-51, 12 pgs.
Xu Chu et al., "Katara: A Data Cleaning System Powered by Knowledge Bases and Crowdsourcing," Proceedings of the 2015 ACM SIGMOD' 15, International Conference on Management of Data, SIGMOD' 15, May 31-Jun. 4, 2015, 15 pgs.

\* cited by examiner

| Row | interpretation_nlg_long |
|---|---|
| 61 | sum of Transaction Amt by Audit Type and by Batch Transaction ID, filter Audit Type to Alcohol, sort Batch Transaction ID in alphabetical order |
| 62 | sum of Number of Records by Employee ID, filter Audit Type to Alcohol |
| 63 | sum of Transaction Amt by Audit Type, by Division, and by Employee ID, filter Audit Type to Alcohol as a pie chart |
| 64 | sum of Transaction Amt by Exchange Rate, filter Cost Centre WBS Element Descr to D/R OFF |
| 65 | sum of Transaction Amt by Card Posting Dt's day, filter Audit Type to Alcohol |
| 66 | sum of Transaction Amt by Card Posting Dt's weekday, filter Audit Type to Alcohol |

Table: JSON

First < Prev   Rows 61 - 66 of 93   Next > Last

- Analysis complete
- Refresh

- Audit Type
- Batch Transaction ID
- Card Posting Dt
- Cost Centre WBS Elem...
- Division
- Employee ID
- G L Account
- G L Account Description
- Holiday
- Merchant Category
- Merchant Name
- Merchant Type
- Merchant Type Descript...

count of Merchant Name — 650 filter count of Merchant Name at least 1 — 652 filter count of Merchant Name to 1 — 654 filter Merchant Name to TERANET EXPRESS — 656

119,448 — 660

Transaction Amt at least 100.00

Salary at least 0 — 662

| StatKey | Stat Type | Key | Value |
|---|---|---|---|
| conceptTypeToConceptIDKey | Exp Occurrence | ExpType | ConceptID |
| fieldOccurrenceKey | Field Occurrence | Field ID | |
| fieldToValueKey | Filter to Value | Field ID | Complex Value JSON |
| textValueToFieldKey | Text Value to Field | Text Value | FieldID |

Figure 6K

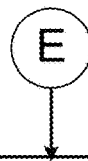

1038 — The logical field is a calculation based on a first data field and a second data field.

Assign the semantic role to the logical field further based on a first semantic role corresponding to the first data field and a second semantic role corresponding to the second data field.

Figure 10F

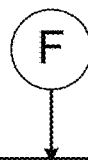

1040 — Determine a default format for a data field corresponding to the logical field.

Assign the semantic role to the logical field is further based on the default format for the data field.

Figure 10G

1042 — Select and store, to the first data source, a default formatting option for displaying the logical field based on the assigned semantic role.

Figure 10H

DATA PREPARATION USING SEMANTIC ROLES

RELATED APPLICATIONS

This application is related to U.S. patent application Ser. No. 16/234,470, filed Dec. 27, 2018, entitled "Analyzing Underspecified Natural Language Utterances in a Data Visualization User Interface," which is incorporated by reference herein in its entirety.

This application is also related to U.S. patent application Ser. No. 16/221,413, filed Dec. 14, 2018, entitled "Data Preparation User Interface with Coordinated Pivots," which is incorporated by reference herein in its entirety.

This application is also related to U.S. patent application Ser. No. 16/236,611, filed Dec. 30, 2018, entitled "Generating Data Visualizations According to an Object Model of Selected Data Sources," which is incorporated by reference herein in its entirety.

This application is also related to U.S. patent application Ser. No. 16/236,612, filed Dec. 30, 2018, entitled "Generating Data Visualizations According to an Object Model of Selected Data Sources," which is incorporated by reference herein in its entirety.

TECHNICAL FIELD

The disclosed implementations relate generally to data visualization and more specifically to systems, methods, and user interfaces to prepare and curate data for use by a data visualization application.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, data frequently needs to be manipulated or massaged to put it into a format that can be easily used by data visualization applications.

SUMMARY

Disclosed implementations provide methods to clean and/or replace data values in a data set, based on semantic roles of data fields, which can be used as part of a data preparation application.

In accordance with some implementations, a method prepares data for subsequent analysis. The method is performed at a computer having a display, one or more processors, and memory storing one or more programs configured for execution by the one or more processors. The method includes obtaining a data model encoding a first data source as a tree of logical tables. Each logical table has its own physical representation and includes a respective one or more logical fields. Each logical field corresponds to either a data field or a calculation that spans one or more logical tables. Each edge of the tree connects two logical tables that are related. The method also includes associating each logical table in the data model with a corresponding concept in a concept graph. The concept graph (e.g., a directed acyclic graph) embodies hierarchical inheritance of semantics for the logical tables. The method also includes, for each logical field included in a logical table, assigning a semantic role to the logical field based on a concept corresponding to the logical table. The method also includes validating the logical field based on its assigned semantic role. The method further includes displaying, in a user interface on the display, one or more transformations to clean (or filter) the logical field based on validating the logical field. In response to detecting a user input selecting a transformation to transform the logical field, the method transforms the logical field according to the user input, and updates the logical table based on transforming the logical field.

In some implementations, the method further includes, for each logical field, storing its assigned semantic role to the first data source (or to an auxiliary data source).

In some implementations, the method further includes generating a second data source based on the first data source and, for each logical field, storing its assigned semantic role to the second data source.

In some implementations, the method further includes, for each logical field, retrieving, from a second data source, distinct from the first data source, a representative semantic role (e.g., an assigned semantic role for a similar logical field). Assigning the semantic role to the logical field is further based on the representative semantic role. In some implementations, the user input is detected from a first user, and the method further includes, prior to retrieving the representative semantic role from the second data source, determining if the first user is authorized to access the second data source.

In some implementations, the semantic role includes a domain of the logical field, and validating the logical field includes determining if the logical field matches one or more domain values of the domain. The method further includes, prior to displaying the one or more transformations, determining the one or more transformations based on the one or more domain values.

In some implementations, the semantic role is a validation rule (e.g., a regular expression) used to validate the logical field.

In some implementations, the method further includes, displaying, in the user interface, a first one or more semantic roles for a first logical field based on a concept corresponding to a first logical table that includes the first logical field. The method also includes, in response to detecting a user input selecting a preferred semantic role, assigning the preferred semantic role to the first logical field. In some implementations, the method further includes, selecting a second one or more semantic roles for a second logical field based on the preferred semantic role. The method also includes displaying, in the user interface, the second one or more semantic roles for the second logical field. In response to detecting a second user input selecting a second semantic role from the second one or more semantic roles, the method includes assigning the second semantic role to the second logical field. In some implementations, the method further includes training one or more predictive models based on one or more semantically-labeled data sources (e.g., data sources with data fields that have assigned or labeled semantic roles). The method also includes determining the first one or more semantic roles by inputting the concept corresponding to the first logical table to the one or more predictive models.

In some implementations, the method further includes detecting a change to the first data source. In response to detecting the change to the first data source, the method includes updating the concept graph according to the change to the first data source, and repeating the assigning, validating, displaying, transforming, and updating, for each logical field, according to the updated concept graph. In some implementations, detecting the change to the first data source is performed at predetermined time intervals.

In some implementations, the logical field is a calculation based on a first data field and a second data field. Assigning the semantic role to the logical field is further based on a first semantic role corresponding to the first data field and a second semantic role corresponding to the second data field.

In some implementations, the method includes determining a default format for a data field corresponding to the logical field. Assigning the semantic role to the logical field is further based on the default format for the data field.

In some implementations, the method further includes selecting and storing, to the first data source, a default formatting option for displaying the logical field based on the assigned semantic role.

In some implementations, the method further includes, prior to assigning the semantic role to the logical field, displaying, in the user interface, the concept graph and one or more options to modify the concept graph. In response to detecting a user input to modify the concept graph, the method includes updating the concept graph according to the user input.

In some implementations, the method further includes determining a first logical field to add to a first logical table based on its concept. The method also includes displaying, in the user interface, a recommendation to add the first logical field. In response to detecting a user input to add the first logical field, the method includes updating the first logical table to include the first logical field.

In some implementations, the method further includes determining, based on the concept graph, a second dataset corresponding to a second data source to join with a first dataset corresponding to the first data source. The method also includes displaying, in the user interface, a recommendation to join the second dataset with the first dataset of the first data source. In response to detecting a user input to join the second dataset, the method also includes creating a join between the first dataset and the second dataset, and updating the tree of logical tables.

In some implementations, a computer system has one or more processors, memory, and a display. The one or more programs include instructions for performing any of the methods described herein.

In some implementations, a non-transitory computer readable storage medium stores one or more programs configured for execution by a computer system having one or more processors, memory, and a display. The one or more programs include instructions for performing any of the methods described herein.

Thus, methods, systems, and graphical user interfaces are disclosed that enable users to analyze, prepare, and curate data.

BRIEF DESCRIPTION OF THE DRAWINGS

For a better understanding of the aforementioned systems, methods, and graphical user interfaces, as well as additional systems, methods, and graphical user interfaces that provide data visualization analytics and data preparation, reference should be made to the Description of Implementations below, in conjunction with the following drawings in which like reference numerals refer to corresponding parts throughout the figures.

FIG. 6H illustrates example usage statistics according to some implementations.

FIG. 6I illustrates example suggestions for natural language queries, in accordance with some implementations.

FIG. 6K illustrates a table of example implementations of interfaces for fetching usage statistics, in accordance with some implementations

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
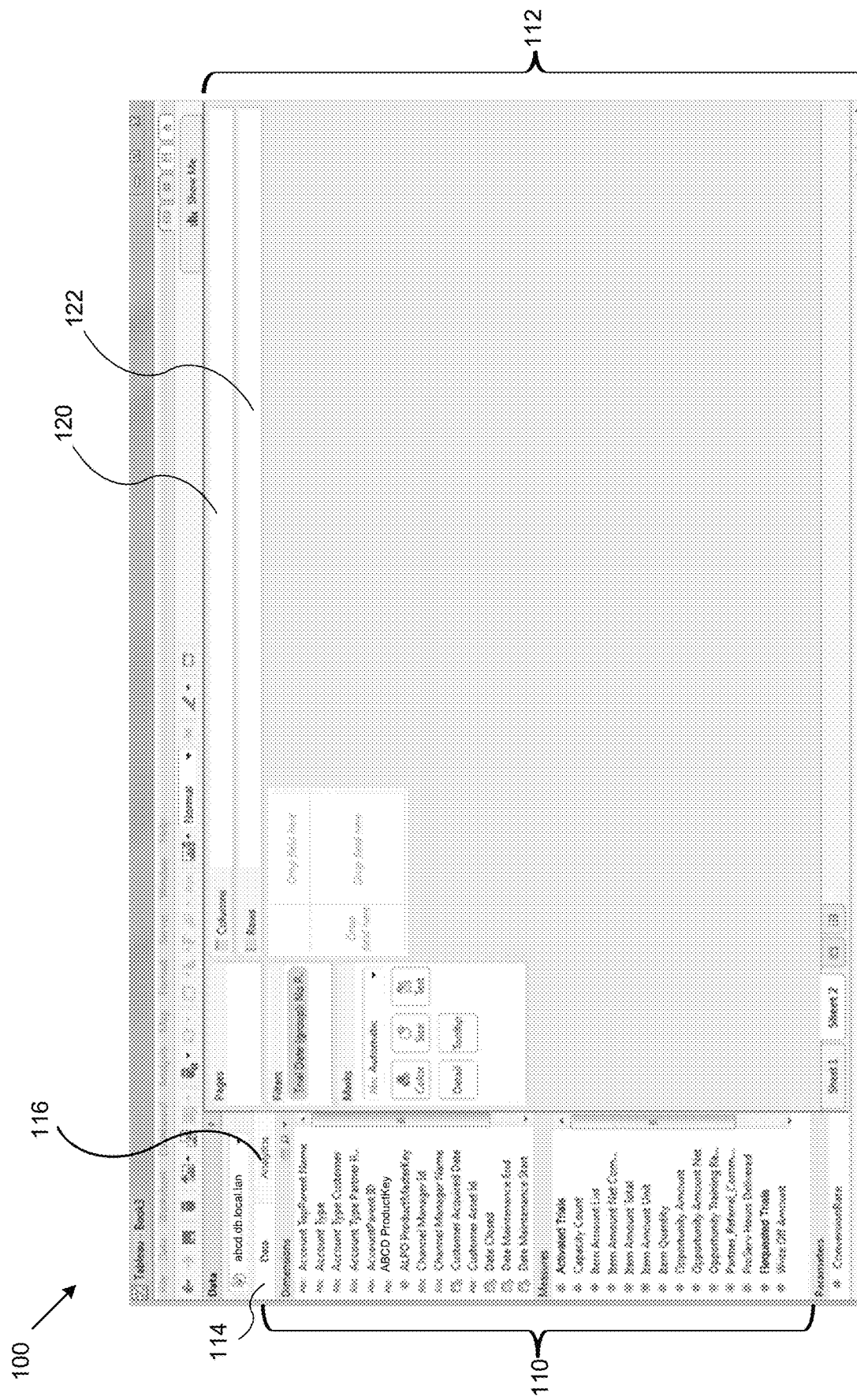
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic. In some implementations, the data visualization region 112 has multiple layers, which are referred to as sheets.

Figure 2:
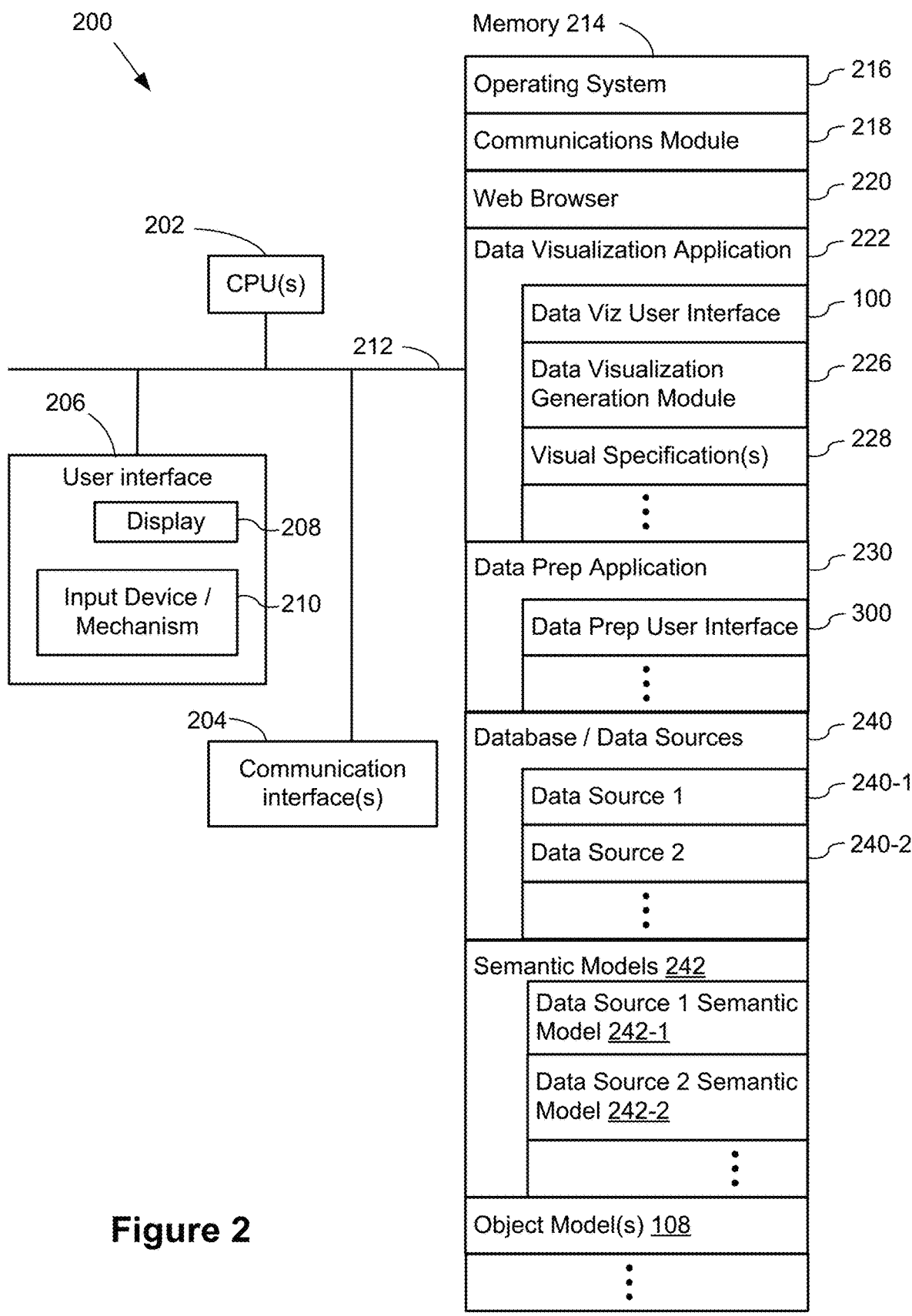
FIG. 2 is a block diagram of a computing device in accordance with some implementations.

FIG. 2 is a block diagram illustrating a computing device 200 that can display the graphical user interface 100 in accordance with some implementations. The computing device can also be used by a data preparation ("data prep") application 230. Various examples of the computing device 200 include a desktop computer, a laptop computer, a tablet computer, and other computing devices that have a display and a processor capable of running a data visualization application 222 and/or a data prep application 230. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 100 for a user to construct visual graphics. For example, a user selects one or more data sources 240 (which may be stored on the computing device 200 or stored remotely), selects data fields from the data sources, and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server;
- zero or more databases or data sources 240 (e.g., a first data source 240-1 and a second data source 240-2), which are used by the data visualization application 222. In some implementations, the data sources are stored as spreadsheet files, CSV files, XML, files, or flat files, or stored in a relational database;
- zero or more semantic models 242 (e.g., a first semantic model 242-1 and a second semantic model 242-2), each of which is derived directly from a respective database or data source 240. A semantic model 242 represents the database schema and contains metadata about attributes. In some implementations, a semantic model 242 also includes metadata of alternative labels or synonyms of the attributes. A semantic model 242 includes data types (e.g., "text," "date," "geospatial," "Boolean," and "numeric"), attributes, (e.g., a currency type such as the United States Dollar), and a semantic role or a data role (e.g., "City" role for a geospatial attribute) for data fields of the respective database or data source 240. In some implementations, a semantic model 242 also captures statistical values (e.g., data distribution, range limits, average, and cardinality) for each attribute. In some implementations, a semantic model 242 is augmented with a grammar lexicon that contains a set of analytical concepts found in many query languages (e.g., average, filter, and sort). In some implementations, a semantic model 242 also distinguishes between attributes that are measures (e.g., attributes that can be measured, aggregated, or used for mathematical operations) and dimensions (e.g., fields that cannot be aggregated except by counting). In some implementations, the semantic models 242 include one or more concept graphs that encapsulate semantic information for the data sources 240. In some implementations, the one or more concept graphs are organized as directed acyclic graphs, and/or embody hierarchical inheritance of semantics between one or more entities (e.g., logical fields, logical tables, and data fields). Thus, the semantic models 242 help with inferencing and assigning semantic roles to fields; and one or more object models 108, which identify the structure of the data sources 240. In an object model (or a data model), the data fields (attributes) are organized into classes, where the attributes in each class have a one-to-one correspondence with each other. The object model also includes many-to-one relationships between the classes. In some instances, an object model maps each table within a database to a class, with many-to-one relationships between classes corresponding to foreign key relationships between the tables. In some instances, the data model of an underlying source does not cleanly map to an object model in this simple way, so the object model includes information that specifies how to transform the raw data into appropriate class objects. In some instances, the raw data source is a simple file (e.g., a spreadsheet), which is transformed into multiple classes.

In some instances, the computing device 200 stores a data prep application 230, which can be used to analyze and massage data for subsequent analysis (e.g., by a data visualization application 222). FIG. 3B illustrates one example of a data prep user interface 300. The data prep application 230 enables user to build flows 323, as described in more detail below.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
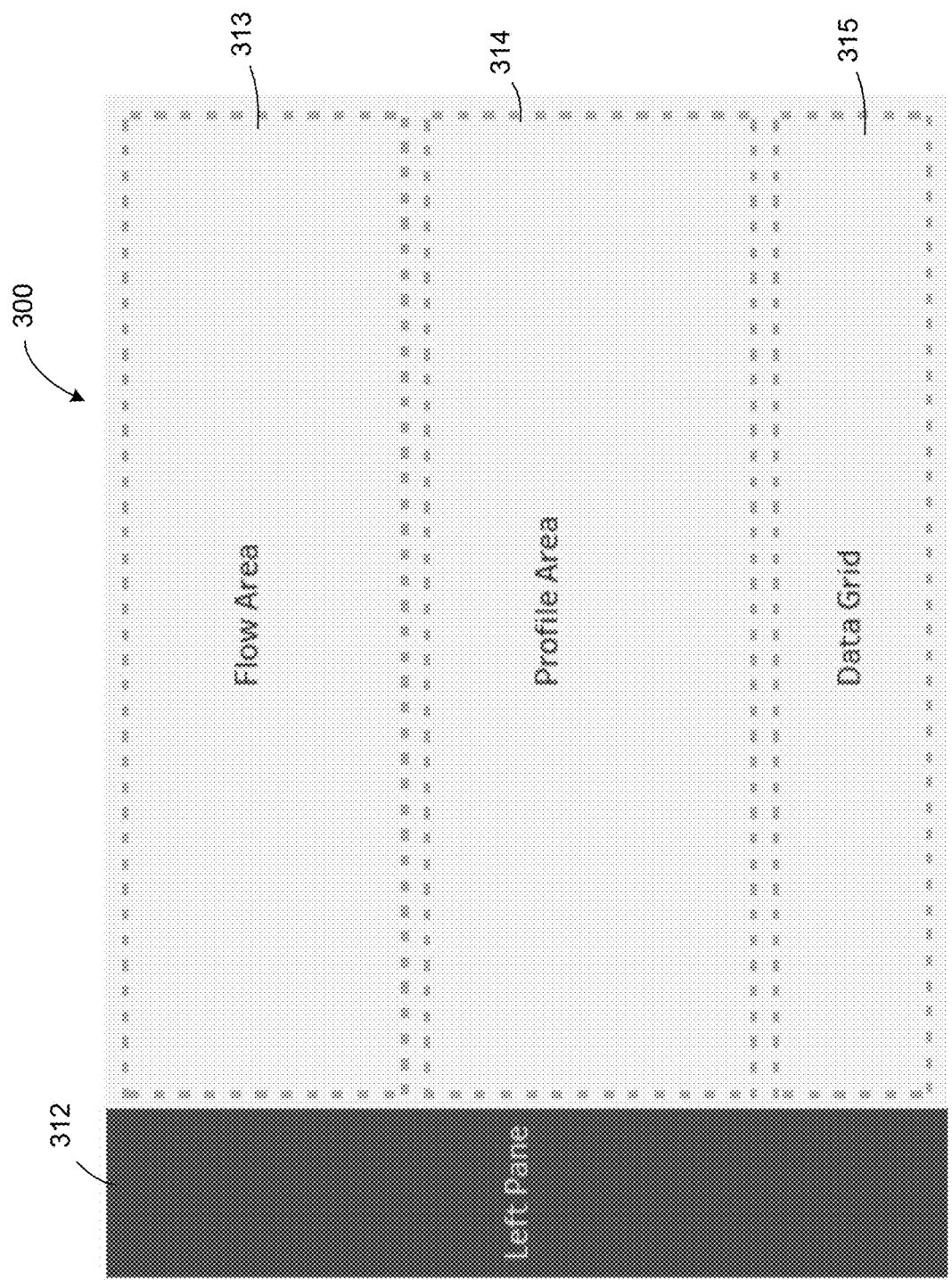
FIGS. 3A and 3B illustrate user interfaces for a data preparation application in accordance with some implementations.
Figure 3B:
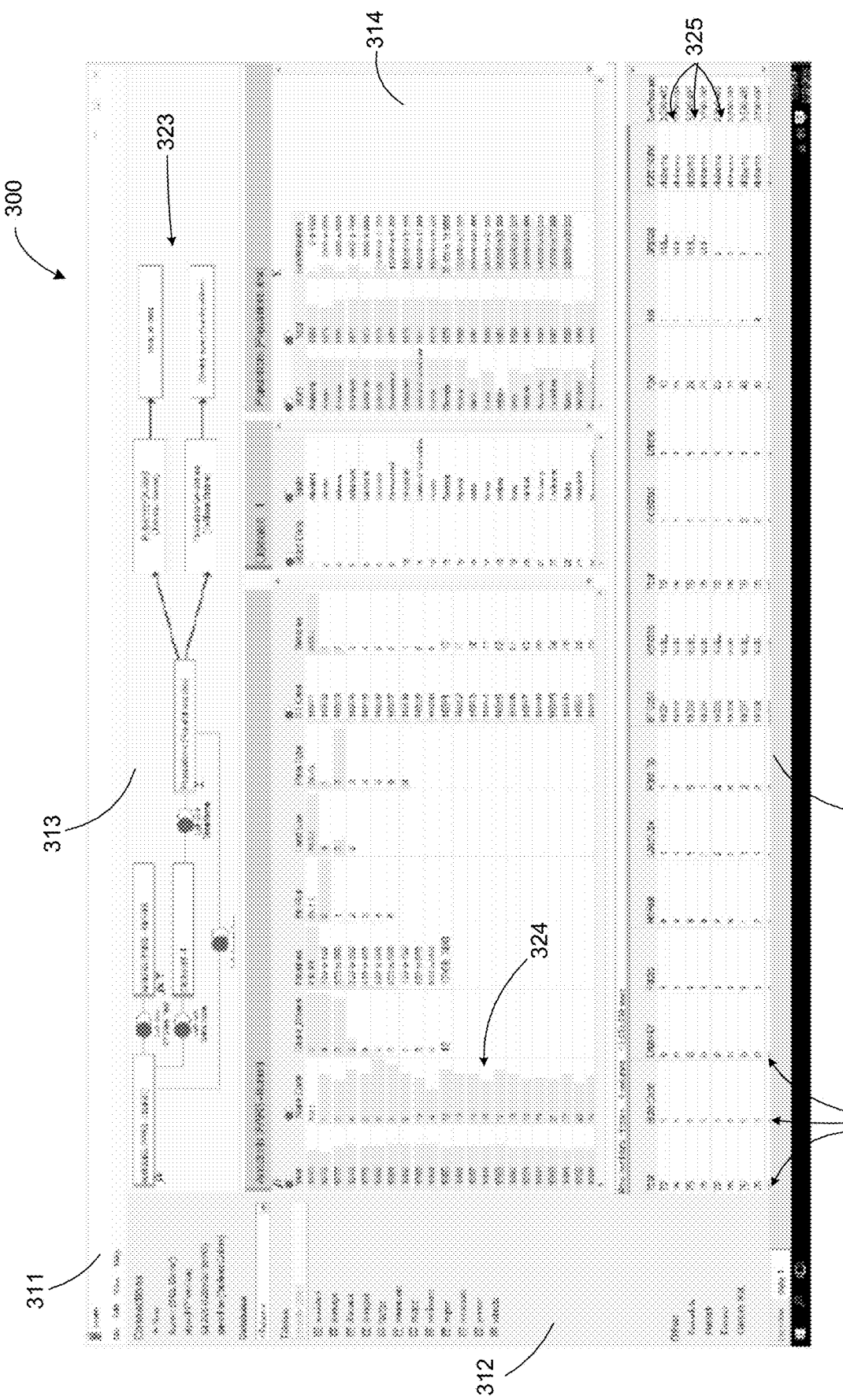

FIG. 3A illustrates an overview of a user interface 300 for data preparation, showing panes that group together different functionality. In some implementations, the left-hand pane 312 provides options for a user to locate and connect to data or to perform operations on already selected data. In some implementations the flow area 313 illustrates one or more operations at nodes to perform on selected data (e.g., data manipulations to prepare data for analysis). In some implementations the profile area 314 provides information about the data set at the currently selected node (e.g., histograms of data value distributions for some of the data fields in the data set). In some implementations, the data grid 315 provides raw data values in rows and columns of the data set at the currently selected node.

FIG. 3B provides a concrete example of a user interface 300 for data preparation, showing the user interface elements in each of the panes. The menu bar 311 includes one or more menus, such as a File menu and an Edit menu. Although the edit menu is available, more changes to the flow are performed by interacting with the flow pane 313, the profile pane 314, or the data pane 315.

In some implementations, the left-hand pane 312 includes a data source palette/selector. The left-hand pane 312 also includes an operations palette, which displays operations that can be placed into the flow. In some implementations, the list of operations includes arbitrary joins (of arbitrary type and with various predicates), union, pivot, rename and restrict column, projection of scalar calculations, filter, aggregation, data type conversion, data parse, coalesce, merge, split, aggregation, value replacement, and sampling. Some implementations also support operators to create sets (e.g., partition the data values for a data field into sets), binning (e.g., grouping numeric data values for a data field into a set of ranges), and table calculations (e.g., calculate data values, such as percent of total, for each row, which depends not only on the data values in each row, but also on other data values in the table).

The left-hand pane 312 also includes a palette of other flows that can be incorporated in whole or in part into the current flow. This enables a user to reuse components of a flow to create new flows. For example, if a portion of a flow has been created that scrubs a certain type of input using a combination of 10 steps, that 10 step flow portion can be saved and reused, either in the same flow or in completely separate flows.

The flow pane 313 displays a visual representation (e.g., node/link flow diagram) 323 for the current flow. The Flow Pane 313 provides an overview of the flow, which serves to document the process. As the number of nodes increases, implementations typically add scroll boxes. The need for scroll bars is reduced by coalescing multiple related nodes into super nodes, which are also called container nodes. This enables a user to see the entire flow more conceptually, and allows a user to dig into the details only when necessary. In some implementations, when a "super node" is expanded, the flow pane 313 shows just the nodes within the super node, and the flow pane 313 has a heading that identifies what portion of the flow is being displayed. Implementations typically enable multiple hierarchical levels.

A complex flow is likely to include several levels of node nesting. Different nodes within the flow diagram 323 perform different tasks, and thus the node internal information is different. In addition, some implementations display different information depending on whether or not a node is selected. A flow diagram 323 provides an easy, visual way to understand how the data is getting processed, and keeps the process organized in a way that is logical to a user.

As described above, the profile pane 314 includes schema information about the data set at the currently selected node (or nodes) in the flow pane 313. As illustrated here, the schema information provides statistical information about the data, such as a histogram 324 of the data distribution for each of the fields. A user can interact directly with the profile pane to modify the flow 323 (e.g., by selecting a data field for filtering the rows of data based on values of that data field). The profile pane 314 also provides users with relevant data about the currently selected node (or nodes) and visualizations that guide a user's work. For example, the histograms 324 show the distributions of the domains of each column. Some implementations use brushing to show how these domains interact with each other.

The data pane 315 displays the rows 325 of data corresponding to the selected node or nodes in the flow pane 313. Each of the columns 326 corresponds to one of the data fields. A user can interact directly with the data in the data pane to modify the flow 323 in the flow pane 313. A user can also interact directly with the data pane to modify individual field values. In some implementations, when a user makes a change to one field value, the user interface applies the same change to all other values in the same column whose values (or pattern) match the value that the user just changed.

The sampling of data in the data pane 315 is selected to provide valuable information to the user. For example, some implementations select rows that display the full range of values for a data field (including outliers). As another example, when a user has selected nodes that have two or more tables of data, some implementations select rows to assist in joining the two tables. The rows displayed in the data pane 315 are selected to display both rows that match between the two tables as well as rows that do not match. This can be helpful in determining which fields to use for joining and/or to determine what type of join to use (e.g., inner, left outer, right outer, or full outer).

Although a user can edit a flow diagram 323 directly in the flow pane 313, changes to the operations are typically done in a more immediate fashion, operating directly on the data or schema in the profile pane 314 or the data pane 315 (e.g., right clicking on the statistics for a data field in the profile pane to add or remove a column from the flow).

Conventional data visualization frameworks rely on the user to interpret the meaning of data. Some systems understand low-level data constraints like data type, but lack understanding of what data represents in the real world. This limits the value such systems provide to users in two key ways. First, users need expertise in each datasheet to understand what it means, and how to best produce useful visualizations (even curated data sources provide little context). Second, users need to spend a lot of time manually manipulating data and writing calculations to produce data in a form that's meaningful.

Some implementations overcome these limitations by enriching a data model with deeper semantics, and by using those semantics to provide intelligent automation. Such implementations reduce users' dependence on knowledge and expertise to access meaningful content. Semantic include metadata that help computationally model what data represents in the real world. Semantics come in many forms, ranging from exposing relationships between fields to enriching individual rows of data with additional information. In some implementations, row-level semantics include synonyms, geocoding, and/or entity enrichment. In some implementations, field-level semantics include data type, field role, data range type, bin type, default format, semantic role, unit conversions, validation rules, default behavior, and/or synonyms. In some implementations, object-level semantics include object relationships, field calculations, object validation, query optimization, and/or synonyms.

Field-Level Semantics

In some implementations, field-level semantics augment existing metadata about fields with richer type information, in the context of a single field. In some implementations, field-level semantics exclude knowledge about relationships between fields or objects. In some implementations, field-level semantics are constructed from field type metadata. Some implementations use a semantic role attribute (e.g., a geographic role) for data source fields. Some implementations extend field-level semantics by adding support for additional field attributes.

Measure Units

Some implementations add units as an attribute for fields (specifically measures) to automate unit conversion, improve formatting, and improve default visualization behavior. Examples of unit scales include: currency ($), duration (hours), temperature (° F.), length (km), volume (L), area (sq ft), mass (kg), file size (GB), pressure (atm), percentage (%) and rate (km/hour).

Some implementations apply field-level semantics in different use cases and provide improved user experience or results in various scenarios. Some implementations use field-level semantics to provide unit conversion in natural language queries. For example, suppose a user queries "calls over 3.5 hours." Some implementations provide automatic unit conversion of hours to milliseconds (e.g., in a filter). Some implementations provide unit normalization in dual-axis visualizations. Suppose a user compares a Fahrenheit field to a Celsius measure. In this example, Fahrenheit is automatically converted to Celsius. Similarly, during data preparation, some implementations apply field-level semantics to format inference in calculations. Suppose a user creates a calculated field by dividing "Distance" (in miles) by "Time" (in seconds). Some implementations infer a default format of "miles/second." Some implementations apply field-level semantics in visualizations. For example, suppose a user creates a bar chart visualization with height. Some implementations format measures (e.g., the axes show units, such as 156 cm). In some implementations, constant conversions (like miles to kilometers) are encoded in an ontology, but variables like currency are derived from external sources (e.g., a computational knowledge engine).

Automatic Data Validation and Cleanup

Some implementations add validation rules as an attribute for fields to allow users to more easily identify and clean up dirty data. For example, out-of-the-box validation rules include phone numbers, postal codes, addresses, and URLs. Some implementations use field-level semantics to clean up dirty data. For example, suppose a user uploads, during data preparation, a dataset with incorrectly formatted addresses. Some implementations automatically detect invalid rows of data, and suggest clean-up flows (e.g., in Tableau Prep). As another use case, some implementations use field-level semantics to perform field inference while processing natural language user queries. For example, suppose a user queries "user sessions for name@company.com." Some implementations automatically detect that the value provided by the user is an email address, and infer an "Email" field to filter on.

Default Behavior

Some implementations use other attributes of miscellaneous semantic concepts to automatically improve default behavior across fields. Some implementations apply field-level semantics to determine a default sort for generating data visualizations. Suppose a user creates a bar chart visualization using a "Priority" field with data values "High," "Medium," and "Low." Some implementations automatically sort the values in scalar order rather than alphabetical order. Some implementations apply field-level semantics to determine a default color for generating data visualizations. Suppose a user creates a visualization of votes in an election. When the user visualizes party victories by county, some implementations automatically color regions by their party color. Some implementations apply field-level semantics during data preparation to determine a default role. Suppose a user uploads a dataset with a primary key. Some implementations automatically set the primary key field's role as a dimension, even if it is a numeric data field.

Synonyms

Some implementations use knowledge about what fields and their domain values represent in the real world, and the different names people have for them, to improve interpretation of natural language queries, and to improve data discovery through search.

Some implementations use field-level semantics to recognize synonyms during natural language processing. For example, suppose a user queries "average order size by category." Some implementations map "order size" to the "quantity" field and show a bar chart visualization showing average quantity by category. Some implementations perform data source discovery using field-level semantics. For example, suppose a user searches in a data visualization server (e.g., Tableau server) for "customers." Some implementations determine data sources that contain data corresponding to "clients," "customers," and "subscribers."

Object-Level Semantics

Some implementations use object-level semantics to extend semantic roles with new concepts that have meaning in the context of specific objects. This way, some implementations automatically associate natural language, relevant calculations, analytical rules, and constraints, with data elements.

Some implementations associate semantics with data attributes by assigning a field a semantic role, associating it with a concept. In some implementations, concepts are represented using a directed acyclic concept graph. In some implementations, chains of concepts form hierarchies, with each hierarchical level adding new real-world understanding to the data, inheriting the semantics of the previous levels.

Figure 4:
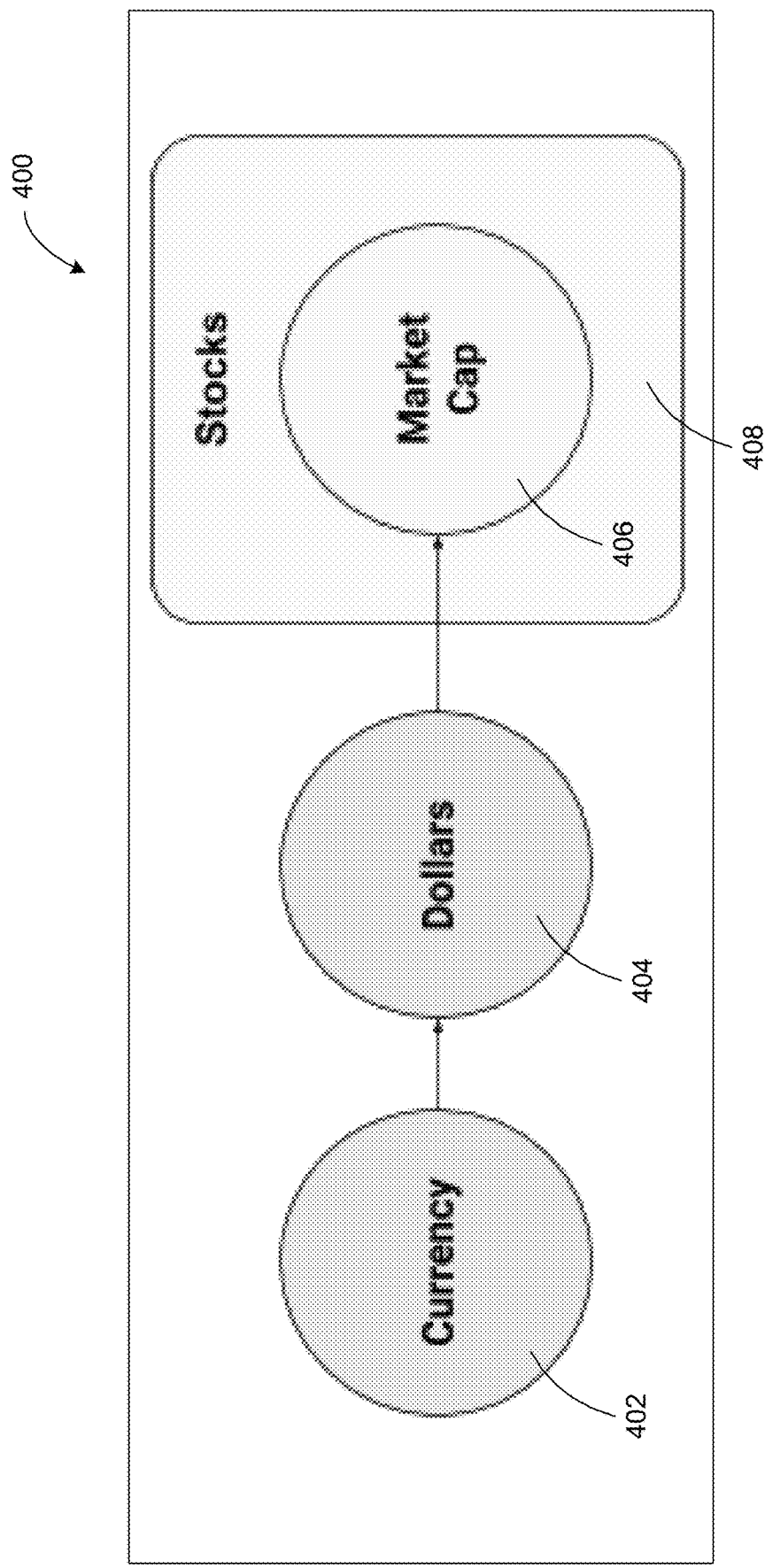
FIG. 4 illustrates an example concept graph in accordance with some implementations.

FIG. 4 illustrates an example concept graph 400 in accordance with some implementations. In the example shown, the first node 402 corresponds to the concept "currency," the second node 406 corresponds to the concept "dollar," the third node 406 corresponds to the concept "market cap," and the fourth node 408 corresponds to the concept "stocks." The edges that connect the nodes represent relationship between the concepts. Data fields and/or tables are associated with one or more concepts. Suppose a field is associated with the concept currency. Some implementations deduce, based on the concept graph, that concept currency is associated with the concept dollars. Based on this semantic relationship, some implementations indicate possible units for fields (dollars in this example). In some implementations, concepts are nested. In some implementations, the relationships are hierarchical, meaning that a child concept inherits characteristics of a parent concept. In the example shown in FIG. 4, the concept market cap inherits the semantic roles of the stocks concept.

In some implementations, each semantic concept includes contextual information defining what the concept means, what natural language expressions users may use to refer to it, and/or what kinds of calculations users should be able to perform (or blocked from performing). In some implementations, this contextual information is different in different object contexts—for example, the term "rate" is used differently in the context of taxes or investments than in the context of sound frequencies or race cars.

Field Calculations

Some implementations use the meaning of a field to automatically infer calculations of other, related information, which may be semantically meaningful. Some implementations of object-level semantics infer calculated fields, to assist the user during data preparation. For example, suppose a user publishes a data source with a Person object that includes a Birth Date field. Some implementations automatically suggest adding a calculated field called "Age." Some implementations automatically interpret natural language queries referencing age. Some implementations use object-level semantic information to interpret ambiguous natural language queries. For example, suppose a user queries "largest countries." Some implementations automatically filter the top countries by population descending. Some implementations use object-level semantics to interpret natural language queries that include relationships between fields. For example, suppose a user queries "average event duration," and further suppose that duration is not in any of the data sources. Some implementations automatically compute duration as a function of start and end dates (and/or times).

Object Relationships

Some implementations use object-level semantics to reason about the relationships between objects and their fields. In some implementations, this reasoning is limited to relationships between pairs of objects. In some implementations, this reasoning is expanded to complete networks of objects to form entire known datasets like "Salesforce" or "Stripe." In some implementations, this reasoning is used to make content recommendations, relating similar datasets, or understanding natural language queries.

Some implementations use object-level semantics to interpret natural language queries to determine relationships between objects. For example, suppose a user queries "messages sent by John." Some implementations determine one or more tables (e.g., Users and Messages) to join. Some implementations determine that a filter operation should be performed on the relationship joined by a foreign key (e.g., a sender_id foreign key).

Some implementations use object-level semantics to perform query evaluation optimizations. For example, suppose a user evaluates a query for "count of users," and further suppose that users have many messages. Some implementations perform an efficient query on the count of distinct normalized messages.

Object Validation

Some implementations perform data and/or object validation based on object-level semantics. Some implementations use the context of the object to gain insight into what validations can be applied to fields. Some implementations constrain analysis to determine validations to apply on fields based on context. Some implementations use object-level semantics to assist users during data preparation. For example, suppose a user publishes a data source with Earthquake magnitude data. Some implementations detect dirty data (e.g., magnitude<1). In response, some implementations provide user options to clean or filter the data, or else automatically clean and/or filter out the bad data.

Row-Level Semantics

Some implementations recognize entities at the row-level of data, and enrich those entities with additional information that is derived from other data sources by intelligently joining recognized entities together. In some implementations, the enrichment data is derived from existing data sources supplied by a customer, or from data provided by data visualization platforms (e.g., geocoding data from Tableau) or even third parties (e.g., public or government datasets).

Some implementations assist a user during data preparation. For example, suppose a user publishes a data source with stock ticker symbols. Some implementations perform entity enrichment with external data. For example, some implementations recommend a join with another dataset (either provided by a user or derived from an external source) to get data (e.g., headquarters location) about each public company. For this example, some implementations subsequently interpret questions about investments in companies headquartered in Canada.

Derivation of Semantic Information

Some implementations enrich data models with semantics even when it is uncertain how pieces of data should be classified. Some implementations use inferred semantics by defining deterministic rules for inferring semantic classifications from existing metadata stored in data sources, such as inferring whether a measure is a percentage by examining its default format. Some implementations use manual classification, and allow users to manually label fields by selecting one or more semantic roles from a list of options. Some implementations perform automate semantic classification by studying patterns in how users label their data sources to make recommendations. In some implementations, these recommendations are explicit semantic classifications, which are overridable by the user. Some implementations use these patterns to fingerprint fields for use in similarity-based recommendations algorithms (e.g., "similar fields are typically used like this").

Global Semantic Concepts

Some implementations provide users with an ontology of global semantic concepts to choose from when labeling their fields. These are concepts with semantic meanings that are universal. For example, the notion of "Currency" or "Length" is not context dependent, and some implementations make reasonable assumptions about desired behavior with these types of fields.

User-Defined Semantic Concepts

Some implementations start with a robust model for describing semantics, and enable users to extend their ontology with custom semantic concepts. Preferably, the valuable concepts are unique to customer datasets or to their businesses, and/or are reconfigurable.

For example, a customer chooses to build their own package of semantic concepts related to "Retail." If a user later uploads a dataset and chooses to apply the "Retail" package, some implementations automatically suggest which semantic labels might apply to which fields.

With semantic governance, some implementations allow organizations to curate ontologies of shared semantic packages across teams of people. Some implementations have developed a large repository of domain-specific semantic concepts and create a marketplace where those semantic concepts can be shared across customers.

Some implementations include modules to provide semantic information. In some implementations, such modules and/or the semantic information are configurable. Some implementations automatically detect data roles. Some implementations use a framework that describes the structure and representation of a semantic concept, as well as the architecture and interface of a semantics service responsible for persisting, accessing, and/or managing semantic concepts. Some implementations use the framework to generate a library of global semantic concepts (e.g., a "default ontology"). Some implementations make the library available to users to manage or edit. Some implementations use examples of semantically-labeled data sources to train predictive models to make recommendations of semantic labels to reduce the amount of work required to semantically prepare data for analysis.

Semantics Service Architecture

Figure 5A:
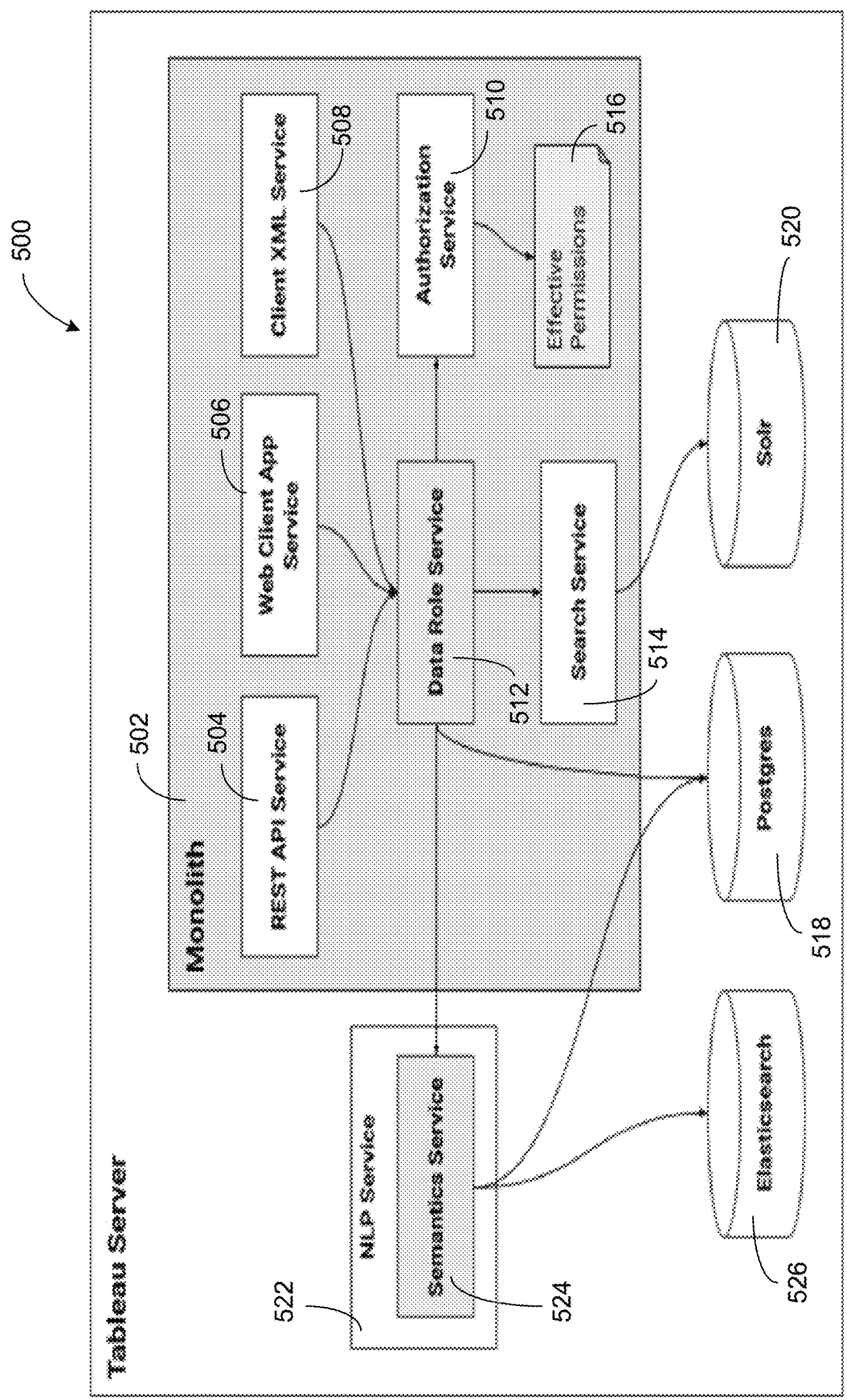
FIG. 5A illustrates an example semantics service architecture in accordance with some implementations.

FIG. 5A provides an example semantics service architecture 500 in accordance with some implementations. In some implementations, a semantics service 524 runs on a data visualization server 522 (e.g., a Tableau Server, either on-premises, online, or in a cloud) and/or on a data preparation server (e.g., a Tableau Prep server). In some implementations, the semantics service 524 is responsible for persisting, and/or managing semantic concepts for use by a data role service 512 and related features. In some implementations, the semantics service 524 is written in Go or a similar programming language (e.g., languages that provide memory safety, typing, and concurrency). In some implementations, the semantics service uses a gRPC interface or similar high performance remote procedure call (RPC) framework that runs in a variety of environment to connect services in and across data centers. The Data Role Service 512 captures semantic properties of data are easily reused, shared, and governed. In some implementations, data roles represent content type. In some implementations, data for data roles has two components: (i) content metadata, which is typically stored on a monolith 502 in a data_roles table, and (ii) semantic concept data, which is typically stored at the semantics service 524 (e.g., in a Postgres database 518, in an Elasticsearch database 526, and/or in a similar analytics engine).

In some implementations, the data role service 512 (e.g., a Java module) runs in the monolith 502 and is responsible for managing data role content metadata. In some implementations, the data role service 512 is an in-process service and does not listen on any ports. In some implementations, the data role service 512 receives requests from external APIs, such as a REST API 504 (used by Data Prep), a Web Client API 506 (used by the Server front-end), and a client XML, service 508.

In some implementations, the semantics service 524 is a Go module, which runs in an NLP Service 522 that provides services such as natural language query processing. In some implementations, the semantics service 524 has an internally exposed gRPC interface, which is consumed by the data role service 512.

Authoring Data Roles

In some implementations, there are two kinds of data roles—built-in data roles (e.g., country, or URL), and custom data roles defined by customers/users.

In some implementations, custom data roles are only authored in Data Prep. In some implementations, custom data roles are also authored in desktop versions of data visualization software, Server, and/or any environment where data sources are authored or manipulated (e.g., Catalog, Web Authoring, or Ask Data).

The arrows in FIG. 5A illustrate an example process flow, according to some implementations. In some implementations, Data Prep sends a request to the REST API service 504. In some implementations, the data role service 512 verifies permissions 516 for the request using an authorization service 510. In some implementations, the data role service 512 persists a data role's content metadata in a data_roles table in a database (e.g., a Postgres database 518). In some implementations, the data role service 512 sends a request to the semantics service 524 to persist the data role's field concept data. The field concept data contains the semantic content of the data role, according to some implementations. In some implementations, the data role service 512 notifies the search service 514 that a piece of content was updated and needs to be indexed in Solr 520 (or a similar enterprise search platform).

Matching Data Roles with Data Fields

In some implementations, the semantics service 524 provides a gRPC (or a similar) interface to expose functionality that uses field concept data to detect data roles for a field and semantically enrich/validate it or its values. Some implementations provide value pattern matching using the field concept data. In such cases, the field concept data encodes regular expressions that validate whether a value is valid in the context of a data role. Some implementations provide name pattern matching using the field concept data. In such cases, the field concept data encodes regular expressions that validate whether a data field's name is valid in the context of a data role. Some implementations provide value domain matching using the field concept data. In such cases, the field concept data references an identifier and field name of a published data source, which defines the domain of valid member values for a data role.

Figure 5B:
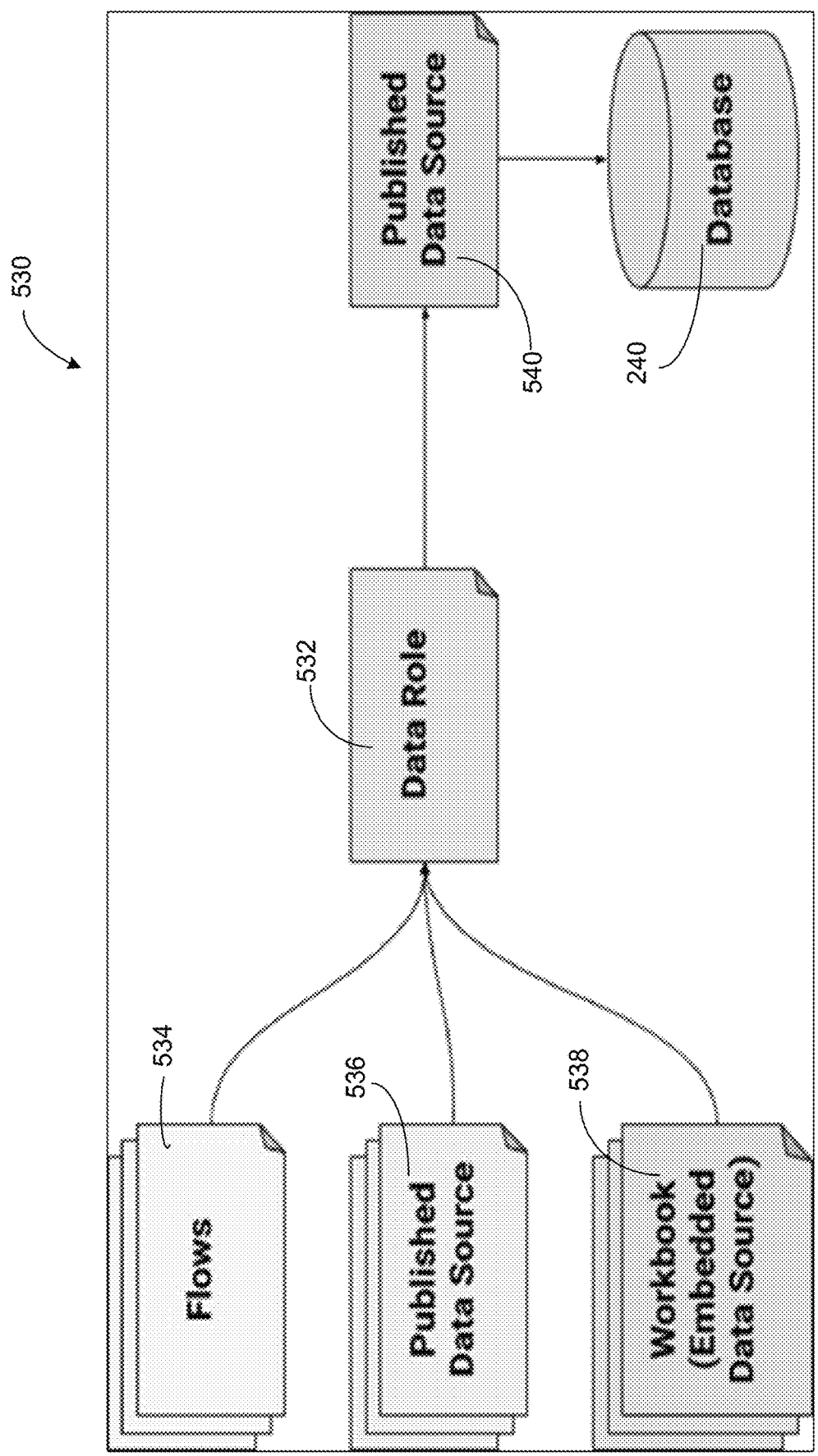
FIG. 5B is a schematic diagram illustrating synchronization between modules that read and write data roles, in accordance with some implementations.

FIG. 5B is a schematic diagram 530 illustrating synchronization between modules that read and write data roles 532, in accordance with some implementations. In some implementations, if a data role uses value domain matching, the semantics service 524 retrieves the values from the published data source 536 and indexes them in Elasticsearch 526 so that matching is performant. In some instances, the underlying data source may be slow, and using a service like ElasticSearch helps in determining whether a value matches with any value of any (accessible) data role within a short duration (e.g., less than a millisecond). In some implementations, each data role references a published data source 536 as the source of truth of values for that data role. When the data role is created or the data source is updated, in some implementations, the semantics service 524 queries the data server to extract the values and index them in Elasticsearch 526.

In some implementations, data for data roles 532 comes from data prep flows 534 and/or workbooks 538 that have embedded data sources. In some implementations, the published data 540 for data roles 532 are stored in a database 240 (e.g., as part of the semantic models 242).

Data Driven Natural Language Query Processing

In some implementations, natural language commands and questions provided by a user (e.g., questions asked by a user regarding information included in a data visualization or a published workbook) may be leveraged to improve the quality and relevance of recommendations, inferences, and for ambiguity resolution.

Recommendations

In some implementations, interpreting a user input (such as a question or natural language command) may include inferring an expression or a part of an expression that is included in the user input. In such cases, one or more recommendations or suggestions may be provided to the user. For example, when a user input selects a data source of interest, a list of suggestions that are automatically generated may include any of the following suggestions: "By Neighborhood," "Sort Neighborhood in alphabetical order," "Top Neighborhood by sum of Number of Records," "Sum of Square Feet," "Sum of Square Feet and sum of Host Total Listings Count as a scatter plot," or "Square Feet at least 0". In some cases, the automatically-generated suggestions may contain suggestions that are not likely to be relevant to the user.

In some implementations, one or more models are used in order to provide recommendations that are relevant to the user. For example, when a data source of interest is selected or identified by a user, the recommendations may include, for example: one or more top fields in the selected data source, one or more top concepts (e.g., an "average" filter) in the selected data source, or one or more fully specified sub-expressions (e.g., filters, sorts, limits, aggregations). In a second example, when a user has selected a data source and a data field in the selected data source, the recommendations may include one or more top sub-expressions (e.g., filters, sorts, limits, aggregations) or one or more top values. In a third example, when a user has selected a data source and one or more expressions, the recommendations may include one or more top data visualization types. In another example, when a data source, a data field, and a filter is selected by the user, the recommendations may include one or more top values in the data field that satisfy the filter condition. In yet another example, when a data source and a sub-expression type is selected by the user, the recommendations may include one or more top correlated sub-expression types.

Existing Visualization Context

In some implementations, the one or more models used to provide the recommendations may take into account the data visualization type of the currently displayed data visualization (e.g., bar chart, line chart, scatterplot, heatmap, geographic map, or pie chart) and historical usage behavior with similar data visualization types. For example, when a data source and data visualization type are specified by a user, the recommendations may include one or more top fields to be added to the existing content. Alternatively, the recommendations may include one or more top expressions (e.g., popular filters) to be added to given existing content.

User Context

In some implementations, the one or more models may include one or more users (e.g., a user account and/or a user profile) in order to provide recommendations that are customized to each user's individual behavior. For example, users on a Business Team may prioritize an "Order Date" field, but members of a Shipping & Logistics Team may prioritize a "Ship Date" field. When a user on the Business Team selects a data source, the model may recommend the "Order Date" field and when a user on the Shipping & Logistics Team selects the same data source, the model may recommend the "Ship Date" field instead of or in addition to the "Order Date" field. Thus, the model may provide personalized recommendations that are most relevant and appropriate to each user.

Ambiguity Resolution

In some implementations, natural language input may include conflicting expressions. While it is possible to use heuristics to select a default expression, the default selection may not always be the best choice given the selected data source, the existing visualization context, or the user.

Some examples of types of conflicts include:
Conflicts between multiple fields
Conflicts between multiple values across fields
Conflicts between multiple values within a field
Conflicts between analytical concepts or expressions
Conflicts between values and fields
Conflicts between values/fields and analytical concepts or expressions In order to address such conflicts in natural language inputs, some implementations use various types of weights to select the most appropriate or relevant expression. Some examples of weights include: hard-coded weights for certain expression types, popularity scores on fields, and frequency of occurrence on values and/or key phrases.

In some implementations, a weight may be updated based on the frequency of occurrence of the expression in natural language inputs and/or in visualizations in published data visualization workbooks.

For example, when a user provides a natural language input "avg price seventh ward" when accessing a data source that includes information on holiday rentals, the recommendations may include any of the following options:

average daily price, filter neighborhood to seventh ward;
average weekly price, filter neighborhood to seventh ward;
average monthly price, filter neighborhood to seventh ward;
average daily price, filter host neighborhood to seventh ward;
average weekly price, filter host neighborhood to seventh ward In a generalized example, when a user selects a data source and provides a string, such as "seventh ward," the recommendations may include one or more text fields that include the string as a data value. In another example, when a user selects a data source and a visualization and provides a string, the recommendations may include one or more expressions (e.g., a value expression or a field expression). Similarly, when a user selects a data source and provides a string while logged into an account or profile (so that personal preferences may be considered by the one or more models), the recommendations may include one or more expressions (e.g., a value expression or a field expression). In some implementations, the one or more expressions include regular expressions, such as patterns that help the user to make a selection.

Figure 6A:
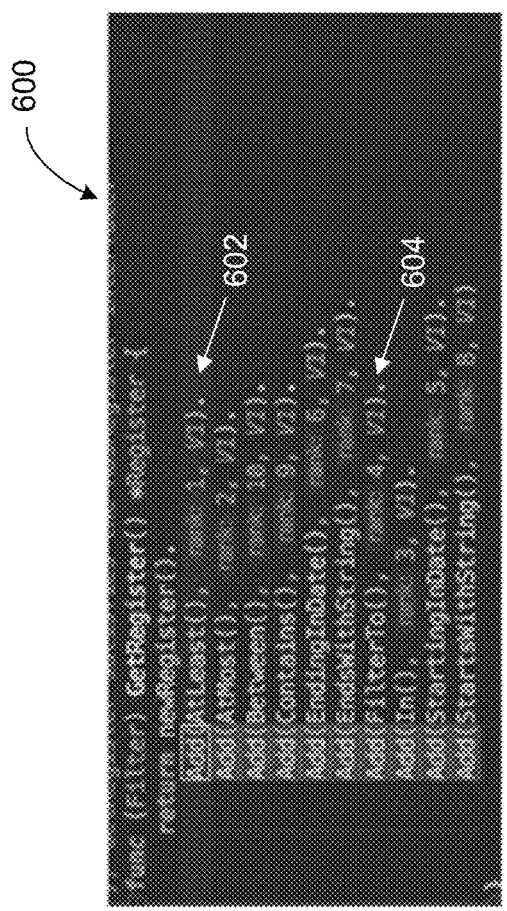
FIG. 6A is an example code snippet illustrating ranking heuristics based on usage statistics, in accordance with some implementations.

There are some instances in which heuristics do not work well in resolving conflicting expressions in natural language inputs. FIG. 6A is an example code snippet 600 illustrating ranking heuristics based on usage statistics, in accordance with some implementations. For this example, suppose the filter FilterTo 604 has higher usage counts compared to the filter AtLeast 602. This may be because there is only one numeric field (Salary) in the corresponding data source, while there are lots of text or geographic fields like City, Continent, Country, League, Player, Team. In these situations, some implementations rank the filters accordingly. In this example, the filter FilterTo 604 is ranked above the filter AtLeast 602.

Figure 6B:
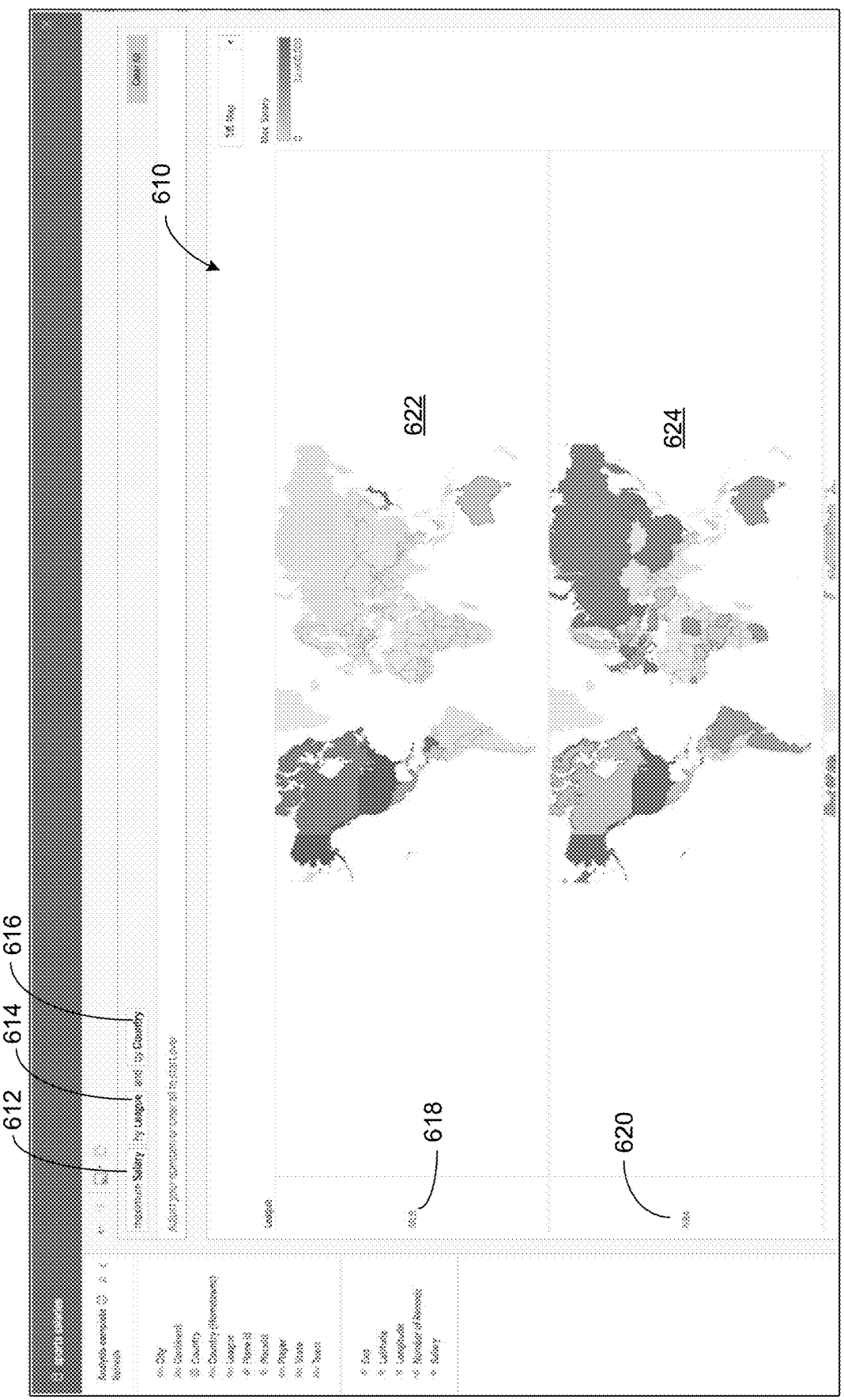
FIG. 6B is an example data visualization 610 for a user query that does not use semantic information, in accordance with some implementations.

FIG. 6B is an example data visualization 610 for a user query that does not use semantic information, in accordance with some implementations. Suppose a user queries maximum salaries 612 by league 614 by country 616. Suppose further that the user does not select a visualization type. Without semantic information, some implementations show maps 622 and 624 that correspond to leagues 618 and 620, respectively.

Figure 6C:
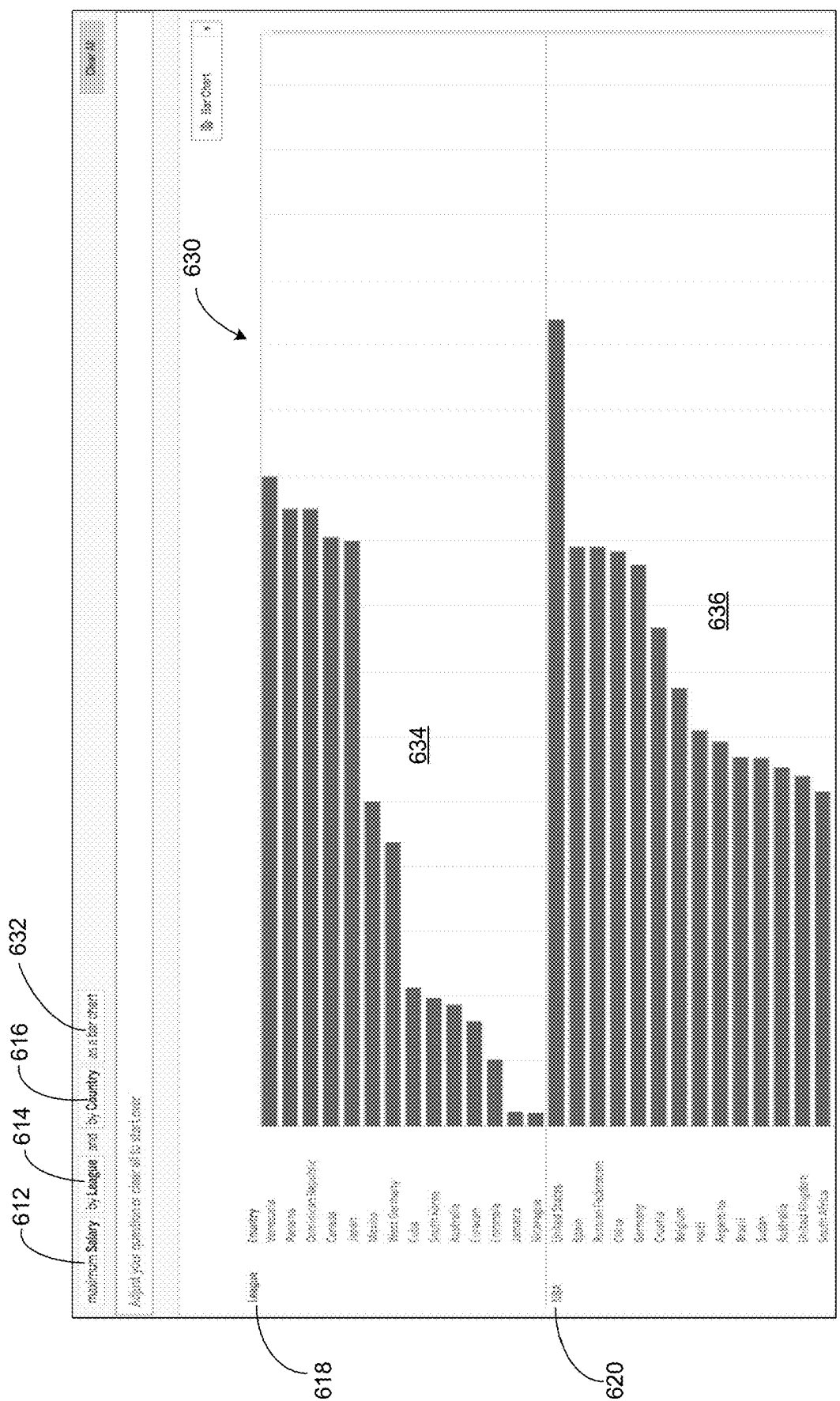
FIG. 6C is an example data visualization 630 for the user query shown in FIG. 6B that makes use of semantic information, in accordance with some implementations.

FIG. 6C is an example data visualization 630 for the user query in FIG. 6B that makes use of semantic information, in accordance with some implementations. Some implementations automatically derive a visualization type (a bar chart 632, in this example) based on semantic information for the underlying data fields. In this case, the data visualization 630 includes bar charts 634 and 636 for the leagues 618 and 620, respectively.

Figure 6D:
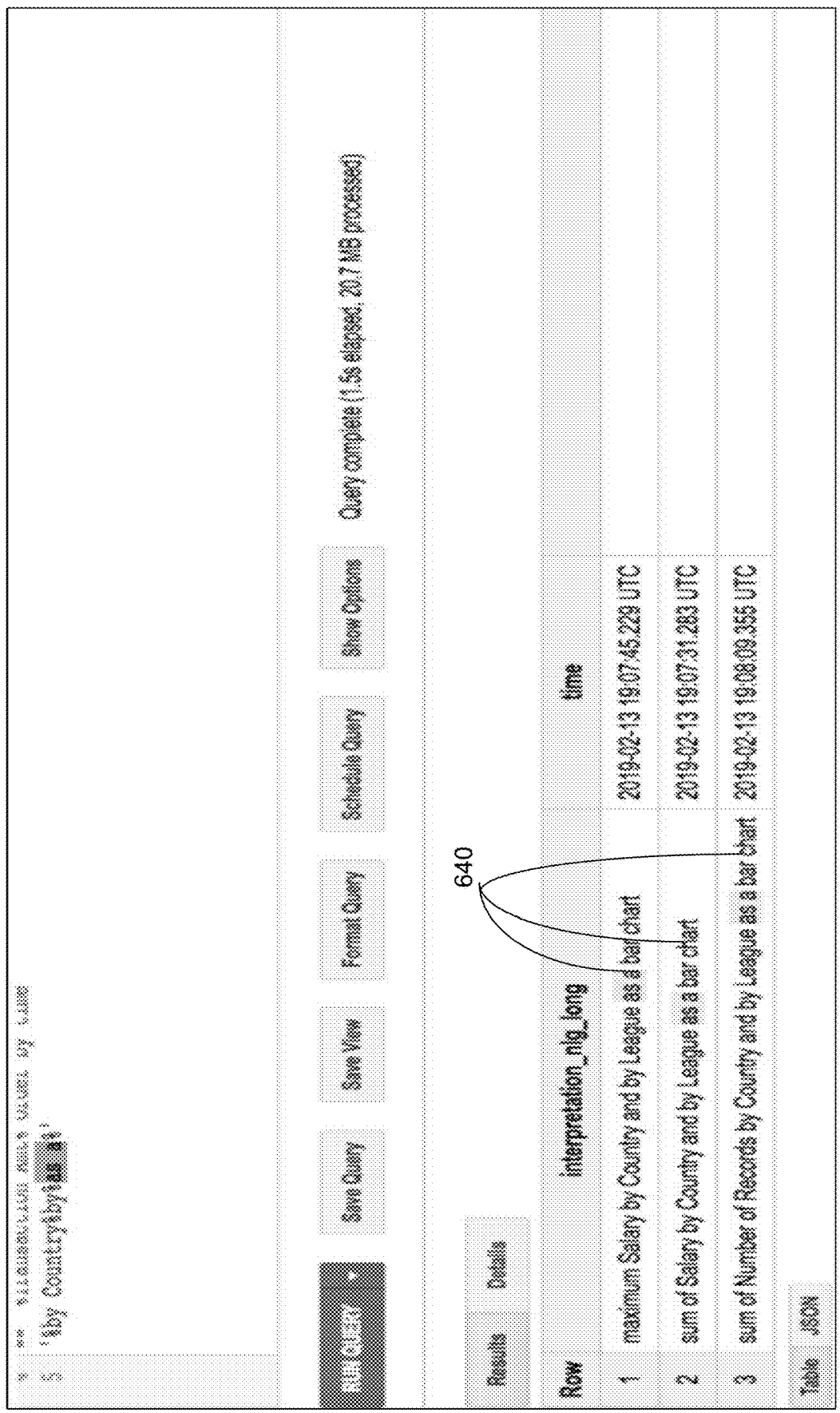
FIG. 6D shows example queries in accordance with some implementations.

FIG. 6D shows example queries in accordance with some implementations. Some implementations track repeated expressions in past queries, and/or track usage counts for expressions in natural language queries, and associate such statistics with data fields (e.g., Salary or League) to automatically derive visualization types. In the example shown in FIG. 6D, the expression "as a bar chart" 640 occurs explicitly multiple times. For this example, when the system (e.g., a parser module) determines that a natural language expression refers to Salary or League, the system automatically shows bar charts.

Figure 6E:
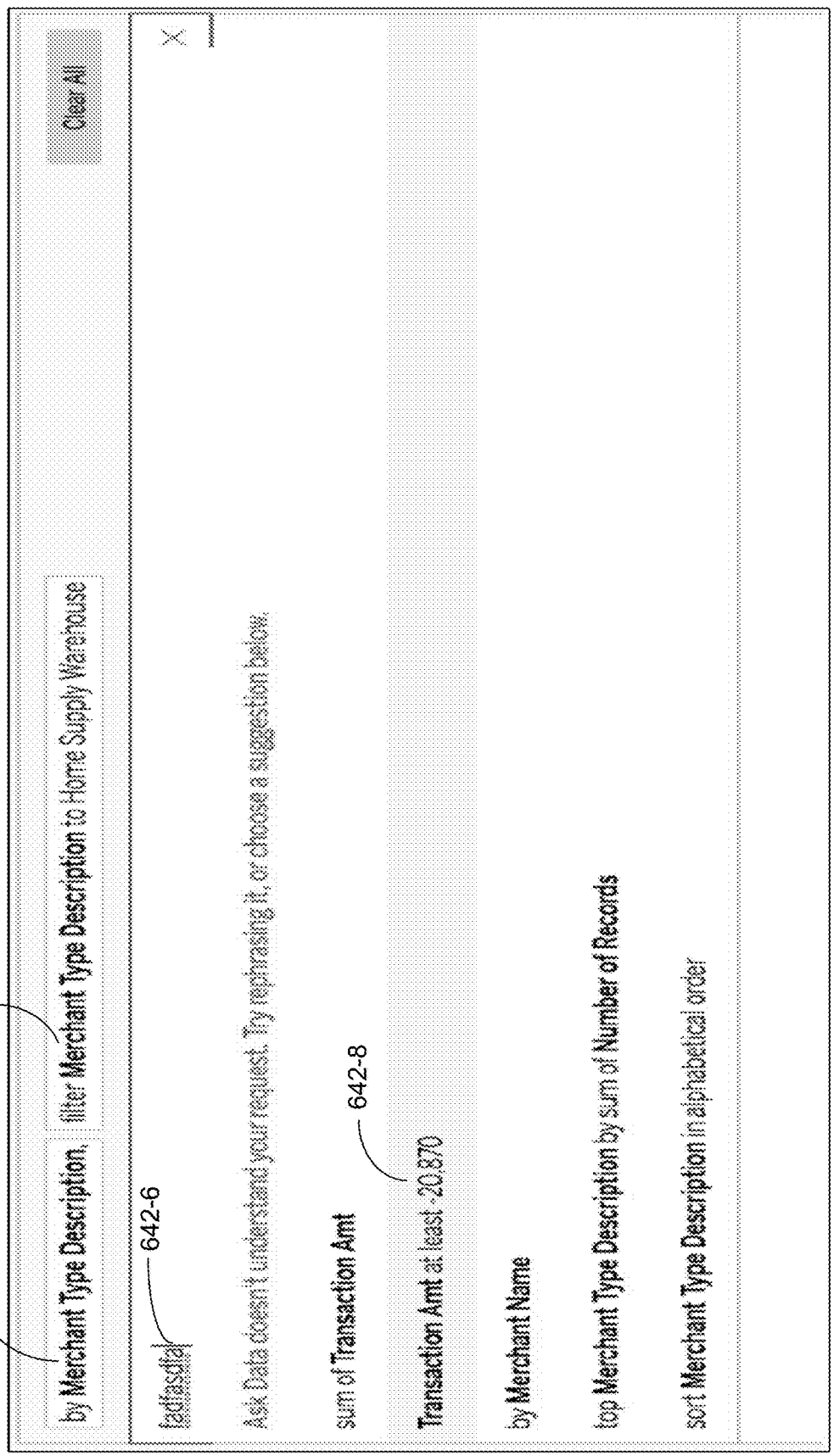
FIG. 6E provides examples of automatically generated suggestions in accordance with some implementations.

FIG. 6E illustrates examples of automatically generated suggestions in accordance with some implementations. Suppose a user queries transaction amount by merchant type description 642-2, and specifies a filter 642-4 (to filter Merchant Type Description to Home Supply Warehouse). Suppose further that the user makes a typo 642-6 in refining the query, or suppose natural language query processing is unable to understand the request. Some implementations provide several suggestions for the user to refine the query. In this example, suggestion 642-8 asks if the user wants to add "Transaction Amt at least −20.870." Without semantic information on transaction amounts, the natural language processing information allows filters to use negative amounts.

Figure 6F:
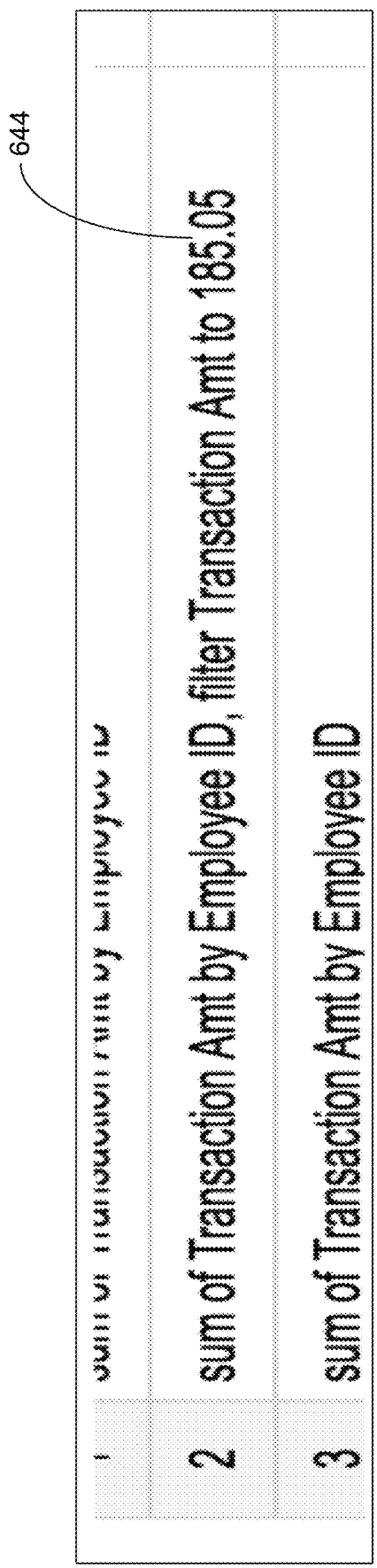
FIG. 6F illustrates example usage data in accordance with some implementations.

FIG. 6F illustrates example usage data in accordance with some implementations. For the running example, the usage statistics include data on the usage of "Transaction Amt." With this usage data, some implementations determine that value '185.05' is frequently used in user queries, and therefore infer that value as a much more reasonable value for Transaction Amt. Some implementations flag the derived "Transaction Amt" value suggested in FIG. 6E as a suspect value, short of inferring the reasonable value.

Figure 6G:
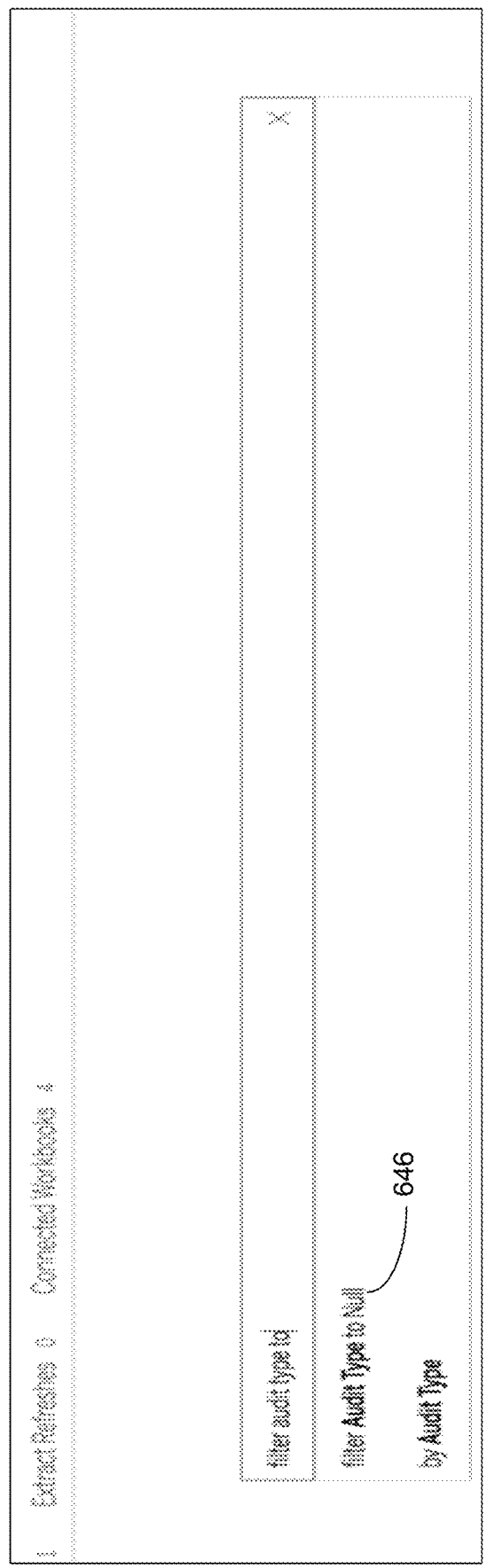
FIG. 6G illustrates example inferences in accordance with some implementations.

FIG. 6G illustrates example suggestions for filtering data in accordance with some implementations. In this example, a suggestion 646 for filtering on Audit Type field includes a default inference value here of null. FIG. 6H illustrates example usage statistics according to some implementations. For the current example, based on usage data 648 for "Audit Type" (corresponding to "Transaction Amt"), some implementations determine that "Alcohol" is much more popular than all other Audit Type values. Based on this usage data, some implementations determine the inferred value in this instance to be "Alcohol."

FIG. 6I illustrates example suggestions for natural language queries, in accordance with some implementations. In the example shown, after aggregating on Merchant Name 650, various suggestions 652, 654, and 656 fail to provide useful hints to the user. In particular, it does not make sense in this instance to suggest to add filter on count of Merchant Name. On the other hand, suggestion 660 (to add field/filter like Transaction Amount at least 100) or suggestion 662 (to add salary at least 0), makes more sense. In this way, some implementations apply usage data associated with data fields (e.g., usage statistics stored in semantic role or semantic information) to improve suggestions.

Figure 6J:
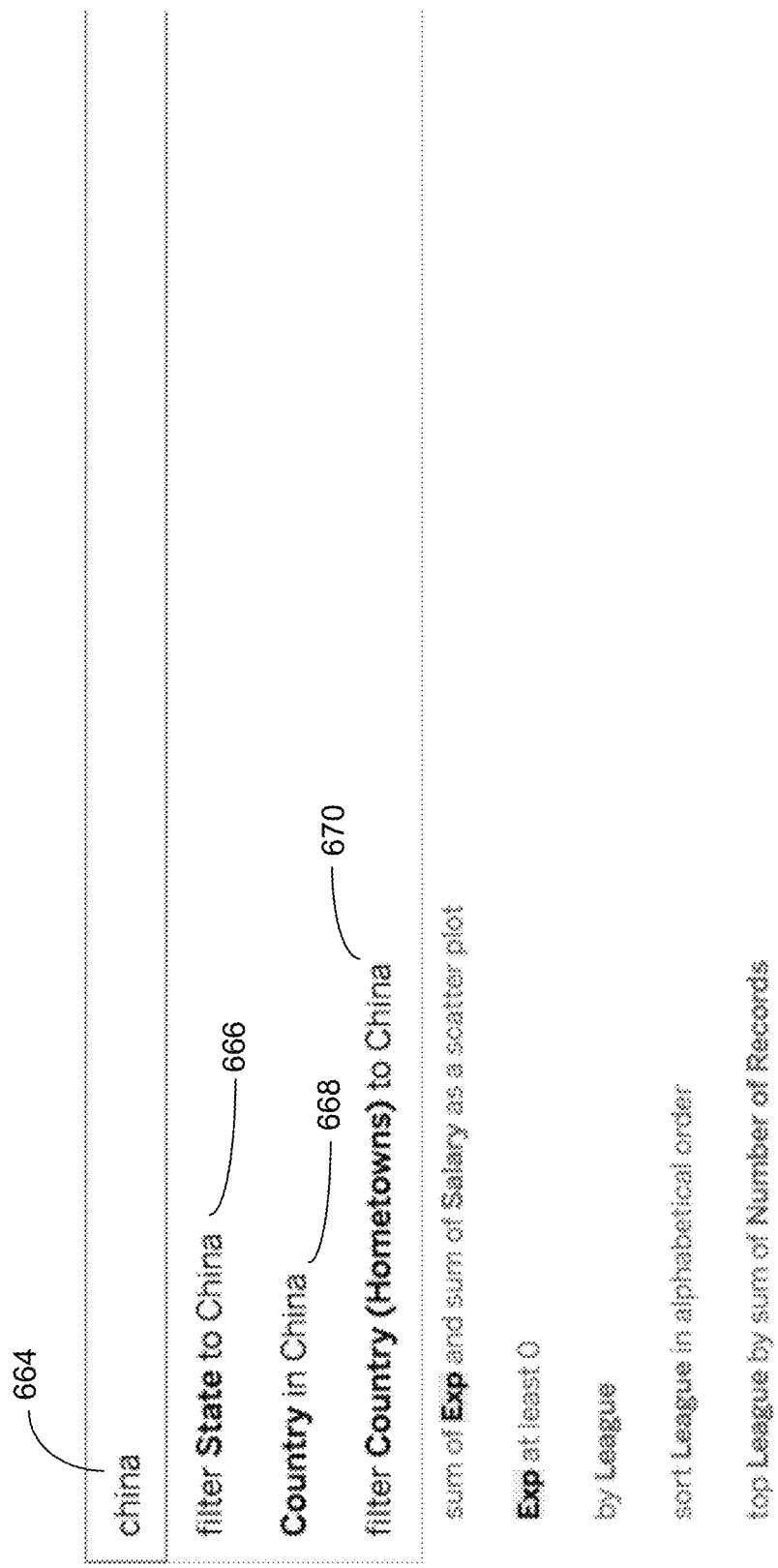
FIG. 6J illustrates examples of smarter suggestions based on usage statistics, in accordance with some implementations.

FIG. 6J illustrates examples of smarter suggestions based on usage statistics, in accordance with some implementations. Some implementations provide smarter recommendation for full expression or partial expression provided by a user (as part of a natural language query). In the example shown in FIG. 6J, suppose the value "China" 664 exists in both Country and State, and suppose State is more popular than Country. The first suggestion 666 incorrectly treats China as a state. Based on usage, since few people would select China as a state, in some implementations, a natural language parser is able to auto-correct the data source and interpret China correctly as Country (as indicated by the suggestions 668 and 670).

In some implementations, usage statistics is represented using a data structure that associates a look-up map to obtain for each data source for each value, an example of which is shown below:

UsageStats struct {
datasourceURI string
Lookup map[StatKey][ ]ValueCount
}

Some implementations use one or more interfaces that represent keys used to fetch top values and counts. FIG. 6K illustrates a table 672 of example implementations of interfaces for fetching usage statistics, in accordance with some implementations. In the table, the first column 674 corresponds to various interfaces, the second column 676 corresponds to type of statistics supported by the interfaces in the first column, the third column 678 corresponds to keys to pass to the interface in the first column, and the last column 680 corresponds to values returned by the respective interfaces in the first column.

Some implementations use a data structure to represent the values returned by the interfaces explained above in reference to FIG. 6K, an example of which is shown below:

ValueCount of type{
value interface{ }
count int32
}

Some implementations convert the value to specific types depending on the type of StatKey the value is attached to.

Some implementations use interfaces (e.g., StatKey) in a parser (e.g., a natural language query parser) to get values and counts. For example, to fetch the most popular value for the field sales and filter atLeast, some implementations perform the following operations:

values:=usageStats.Loopup[NewFieldFilterToValueKey ("sales", "atLeast")] mostPopularValue:= values[0].value.(complexValue)

Some implementations guarantee that the above conversion will succeed, and that all Values are validated before adding to UsageStats.

Some implementation use one or more semantic model interfaces. The following provides an example of a semantic model interface:

func (s*Usage Stats) GetTopVizTypes(interpretation_nlg string) vizTypes [ ]string
func (s*UsageStats) GetRecommendedExpsForToken(token string, datasource*Datasource) [ ]ExpCount
type ExpCount struct{
   Type string (Field, AnalyticalConcept, TextValue)
   Value string (fieldGraphID, ConceptID or textValue)
   Count int32
}

Some implementations interface with an ArkLangData module to fetch usage statistics (e.g., func (parser) GetStats (exp ArkLangExp) [ ]Stat). Some implementations store natural language processing recommendation records for tracking usage statistics. In some implementations, each row in the recommendation record stands for daily counts of an analytical concept, and includes time information (e.g., a month when the record was created), a data source URI string, a statistic type string, a string that represents the keys, a data string, and/or a count string. Some implementations also include a data visualization type column for natural language processing based visualizations.

Some implementations store natural language processing usage statistics. Some implementations include, in the statistics, a data source URI string, and usage statistics (e.g., in JSON format).

Some implementations store performance estimates, such as the number of visualizations over a period of time (e.g., last 90 days). Some implementations store the number of statistics (e.g., 20 statistics) or a range of statistics for each visualization. Some implementations store aggregated counts per month (e.g., 5 per month implying 60,000 records/5=12,000 records) for the natural language processing statistics. Some implementations store the number of active data sources (e.g., 200 active data sources), and/or the number of records per data source.

Various Applications of Data Roles

In some implementations, knowledge about the real world, when associated with a data element such as an object, field, or value, is used to automate or augment analytics experiences. Such knowledge provides understanding of the semantics of a data field and in turn, are used to help users clean their data, analyze it, present it effectively, and/or relate it to other data to create rich data models.

Some implementations standardize different representations of same data values that originate from different sources or data values that are manually entered. In some implementations, the semantics of field help describe the expected domain values that are used for standardization.

In some implementations, the knowledge of data includes concepts that apply generically in many different contexts, such as geocoding, email, and URLs, for example. Sometimes, these concepts are called global data roles.

In addition to global data roles, in some implementations, the knowledge of data also includes concepts that are relevant in domain-specific contexts. These are referred to as user-defined data roles. In many instances, customer use cases involve non-standard domains, such as product names or health codes. For example, a user may set up a custom data role (e.g., a user-defined data role) to help standardize domain values by automatically identifying invalid values and helping users fix them (e.g., applying a fuzzy match against known values).

In some implementations, user-defined data roles are only available to users when they are connected to (e.g., signed in to) a server. In some implementations, semantics and standardization rules included in first user's user-defined data roles may be shared with other users for data preparation and analysis via the server. Thus, a user who is connected to the server may share, find, and discover content in an organization such as user-defined data roles that have been created by other users in the same team, group, or company.

In some implementations, a user may be able to, in a current application, access and re-utilize a user-defined data role that was previously defined in another application that is different from the current application.

In some implementations, a plurality of applications share and leverage a pool of data roles in order to get additional value unique to each application's context. Examples of application-specific semantic capabilities include:

applying a data role to a data field to identify domain values that don't match the role so a user can clean the data field;

analyzing a user's data and suggest a matching data role to apply to a data field;

for a data field that has a data role, analyzing a user's data and recommending cleaning transformations to apply to the data field;

once a data field has a data role, choosing a good default formatting option for displaying values in the data field;

cleaning up a user's data field and saving the cleaned data field to a server as a data role, thereby providing other users, in the user's organization who are connected to the server, access to the data role for further data prep and analysis;

identifying a data field by a synonym entered in a user's query (e.g., a natural language command, question, or search input);

automatically converting units of a data field from its canonical units to units entered in a user's query;

inferring a field from a data role of a specific data value entered in a user's query (e.g. user queries such as "user sessions for name@company.com");

inferring a calculated data field from an understanding of the relationship between data fields and an objective of a user's query (e.g., compute duration from start and end dates in a data source);

inferring a join between tables from an understanding of the relationship between data fields and an objective of a user's query. (e.g., a natural language input, "messages sent by John" results in joining Users and Messages on sender_id filtered by "John");

searching for fields can match field names in a table with synonyms used in the query.

searching across a flow can generally handle more expressive queries (e.g., "all input steps that connect to customers");

creating a calculated data field from an understanding of a relationship between data fields and an objective of a user's query (e.g., compute duration from start and end dates in a table);

creating a join between tables from an understanding of a relationship between data fields and an objective of a user's query (e.g., a natural language input, "messages sent by users" joins Users and Messages on sender_id);

searching for data sources can match data field names in a data source with synonyms used in a query;

searching can generally handle more expressive queries (e.g., "all bug data sources used by at least 5 workbooks");

viewing and editing a catalog of user-defined data roles shared across an organization or company;

automatically labelling axes or legends with units;

automatically normalizing units on a dual axis graph (e.g., comparing a measure in Celsius with the measure in Fahrenheit);

automatically converting units when performing calculations with values in different units (e.g. adding a temperature in Fahrenheit to a temperature in Celsius);

default sorting for a bar chart ordered by priority (e.g. "High", "Medium", "Low") is by associated scalar value (e.g. 1, 2, 3);

color coding of areas on a map identified by political party affiliation defaults to party color;

assigning data roles to data fields, exporting data source(s) to clean to a data preparation application in order to clean (e.g., remove) invalid values, and importing the cleaned data source(s) back into the initial data application or desktop to continue analysis;

searching for data sources can match data field names in a data source with synonyms used in a query;

searching can generally handle more expressive queries (e.g., "all bug data sources used by at least 5 workbooks");

impact analysis: finding all flows and data sources that contain data fields that use a particular data role;

identifying data fields that are related semantically (e.g., a Name, Address and ID field are all associated with customers when they are in the Customer object) via a set up object model;

automatically joining data fields and/or data tables using Object Model relationships;

suggesting a group of data fields with semantic associations (e.g., Product_Name, Product_Code, Product_Details can be suggested to be grouped into a Product Object); and suggesting relationships based on joins done with other tables during an object model building phase.

In some implementations, data roles have short-term implications and effects on a user's work flow. For example, data roles are used to automatically detect dirty data in a data preparation application (e.g., mark invalid phone numbers so a user knows they require cleaning). In another example, data roles are used to automatically interpret synonyms in natural language inputs on data sources in a server (e.g., mapping "Great Britain" to "United Kingdom"). In yet another example, created user-defined data roles are published to a server for shared use.

In some implementations, data roles have longer-term implications and effects on a user's work flow. For example, data roles are used to recommend or infer calculated data fields on published data sources (e.g., inferring "age" when "birth date" is known). In another example, data roles are used to add support for measure units (e.g., perform a unit conversion from kilometers to miles in response to receiving a natural language input such as "distance at least 4,000 km").

By employing user-defined data roles, users are introduced to new experiences in authoring, association, and governance workflows.

In some implementations, when a user adds a data source to either the user's desktop, a data preparation application, or a connected server, relevant data fields in the data source are automatically associated with known (e.g., predefined or previously used) field-level data roles. This association is visible to the user and the user can choose to override the inferred data role by selecting a data role from a set of existing data roles. In the case where many data roles exist, users can search and/or navigate a catalog of options to more easily choose a concept that is relevant to the current data source context and/or to the user's own preferences.

In some implementations, there may not be an existing data role that meets a user's needs. In such instances, a user can author (e.g., create, generate, or customize) a new field-level data role. For instance, users can publish metadata from an existing data field as a data role to a connected server. In some implementations, the metadata includes the name(s) of the data field, synonyms, definition, validation rules (e.g., a regular expression), or known domain values. In some implementations, users can edit these properties before publishing the data role to the server. In some implementations, users may also author a new field-level data role from scratch, without inheriting properties from an existing data field. In some implementations, newly authored data roles are persisted to a storage (e.g., storage managed by a semantics service), and/or automatically detected with other data sources. Furthermore, users can choose whether to share their data roles with other users that are using applications that are provided by the same server.

In some implementations, users can browse a catalog of authored data roles to view their metadata and trace the lineage of data roles to understand which data sources have elements associated with them. In some implementations, users may also modify data roles from within the catalog of concepts on a connected server. For instance, users may modify existing concepts (e.g., adding synonyms, changing validation rules, changing known domain values, etc.) in the metadata, create a new concept (e.g., duplicating an existing concept with modifications, authoring a new concept from scratch), de-duplicate concepts and update data sources to point to a same concept, delete concepts, and control permissions of which other users on the server can modify the user's data roles.

Data Analysis Use-Case Examples

Some implementations provide data analysis capabilities, examples of which are shown below.

- A user cleans up a data field (e.g., using a regular expression ("regex"), using group and replace to map value synonyms to canonical values) that includes a list of product names.
- A user saves a data field's domain as a data role (including the synonym mapping) so that the user can assign the data-role to data fields from other data sources in order to validate and clean other data fields and data sources.
- A user saves a cleaned data field's domain as a data role so that other users in his or her organization can use the data-role for validation and cleaning.
- A user uses a previously defined data-role in one or more applications to validate and clean other data fields (e.g., automatically or through the use of natural language inputs).
- A user edits a previously defined data role (for example, to correct a mistake or update the data role).

For example, the user may connect to a data source that includes information on product inventory. The user creates a data cleaning step and the application may suggest that the user apply a data role "Product Name" to the "prod_name" data field in the data source. Although the user has worked with this data source before, this may be, for example, the first time that the application has made this suggestion. After accepting the recommendation and applying the suggested data role to the suggested data field, the user sees that some of the product names are not valid names. The user then receives another recommendation to automatically clean the data by mapping the invalid names to corresponding valid ones. The user accepts the recommendation and the invalid values in the data field "prod_name" are replaced with valid names.

In another example, a user publishes a data source that already exists and promotes a data role from one of the data fields in the published data source so that values in the data field stay in sync (so that if the data source is republished, the data role is automatically updated). In some cases, the one or more data fields in the data source require some cleanup and the user creates a data preparation flow to clean the data field and update the published data source. The user publishes the data preparation flow to a server and specifies a data field for the data role. The user then places the data preparation flow on a weekly refresh schedule so that the data role is updated every week. In some instances, the user (or a different user than the one who published the data role) retrieves the data role from the server and/or applies the data role to fields in other data preparation flows.

Example Data Catalog Use Cases

Some implementations provide data cataloging capabilities, examples of which are shown below.

- A user promotes a data field in a published data source to a data role so that the user may reuse it in another application or with other data sources.
- A user applies existing data roles to data fields in published data sources to enable an application that includes a natural language input interface to associate synonyms and language patterns.

For example, a user may be working with two different data visualizations for the number of alerts by priority. The user suspects that the two data visualization are using the same data source but one data visualization has several priority values that are different from the other data visualization. The user can check the lineage for each data visualization using a data catalog and determine that, for example, one data visualization is directly connected to a database while the other one is using a published data source connected to a data preparation flow which in turn connects to the same database. The Priority field in the published data source has a data role associated with it with a set of valid values and the data preparation includes a cleaning step that filters out rows with priority values that don't match the data role. The user notifies the author of the first data visualization to consider using the published data source.

In another example, a user updates a "Product Name" data role by removing some outdated product names and adding some new ones. In yet another example, a user promotes a data role from a data field.

In some implementations, the data role values stay in sync with the data fields, so that if the user republishes the data source, the data role is automatically updated. This way, other analysts can start using it in their data preparation flows. In some implementations, natural language query processing systems create better insights.

In another example, a user promotes a data field in a published data source to a data role so that the user may reuse the data-role with other data sources or in other applications.

In another example, a user reviews a list of data roles saved on a server to make sure that they are valid. The user may delete any data roles that may be inappropriate (e.g., data roles that are outdated or include incorrect information).

In another example, a user confirms that data roles containing sensitive data have the correct permissions, making them available to only the intended people. The user may edit the permissions to ensure that the list of people who have access to the data roles is up-to-date.

In another example, A user edits synonyms associated with a data role on a server in order to improve the effectiveness of using an application that has a natural language input interface with data sources.

Use-Cases in An Application that Includes A Natural Language Input Interface

In one example, a user applies existing data roles to data fields in a published data source to enable the application to associate synonyms and language patterns (e.g., "like geography").

In another example, a user provides a natural language command or query that includes a unit that is different from the unit(s) stored in a selected data source. The application uses the data role to automatically convert data in the data source to the unit specified by the user's natural language input.

For example, a user may provide a natural language input, "average order size by category". The application maps the phrase "order size" to a "quantity" data field and shows a bar graph data visualization that shows average quantity by category.

For example, a user may provide a natural language query for "largest countries." The application creates a data visualization showing the top countries by population in descending order (most populated to least populated).

For example, a user may provide a natural language query for "average event duration" and the term "duration" is not included in the data source. The application computes duration, as a function of start and end date, which are included in the data source, and creates a bar graph data visualization. Duration can also be computed using start time and end time.

Example Data Roles

In some implementations, a data role includes: a name for the data role, a description of the data role, synonyms of the data role name, a data role identification string, a data role version number, a data type (e.g., string, integer, date, Boolean, or 64-bit floating point), and/or a data role type. Some examples of data role types include: (i) dictionary data role type, which is a discrete list of valid domain values, (ii) a range of values for the data role type, which is a range (e.g., a numerical range) defining the values that are valid, and (iii) a regular expression data role type, which includes one or more values matching one or more regular expressions that are considered valid. Each domain value in a dictionary can have an associated list of synonym values. For example, a "Month" data role (e.g., a data role with the name "Month") can have an integer type with domain values: (1, 2, 3, 4, 5, 6, 7, 8, 9, 10, 11, 12) and can have a synonym domain of matching string values: ("January", "February", . . . , "December").

In some implementations, a data role type is more meaningful when understood in combination with other data fields. For example, a zip code data field may be invalid when city and state data fields are provided. In some implementations, the importance or priority of a given data field may be determined based on a hierarchy between related data fields. For example, in a geographical hierarchy, a city data field may be prioritized over state and country data fields since the city data field provides information that corresponds to a more precise location compared to the state and country data fields.

Some implementations represent a semantic type as an object with a set of associated defining attributes. For example, a city type is represented using attributes city name, state name, and country name. Some implementations only expose one of these attributes in the field itself.

In some implementations, data roles include optional attributes, such as default aggregation, dimension/measure, continuous/discrete, default view type (data visualization type), default formatting, units, and visual encoding information. Visual encoding information can include related fields and derived attributes. For example, for an attribute Profit, a derived attribute can be "Profitable," which has calculation Profitable:=(Profit>0).

Associated Data

In some implementations, data roles can be associated with field domain data. For example, a dictionary data role is defined by a list of all valid domain values. As another example, a regular expression data role references a list of valid values used as sample data to illustrate valid data to a user. In some implementations, these data roles are stored in a data source, allowing a user to: (i) use the data source embedded in a data role to keep the data private to the data role, (ii) create a data role from a previously published data source, (iii) use a published data source, output from a data preparation flow on a server that is refreshed on a schedule, as the data for a dictionary data role, and/or (iv) manage connections to data sources used by data roles in bulk, together with connections from other data sources.

In some implementations, a user can publish a workbook with a data source embedded in it that is private to the workbook. The workbook may also reference published data sources that are available to others to connect to. Some implementations allow users to make changes to connections. Some implementations allow users to make changes in bulk (e.g., across many data sources). In some implementations, connections used by both published and embedded data sources may be edited together.

Examples use cases for associated data in data roles include:

- A user publishes a user-defined dictionary data role from a data preparation flow where the source data for a data field has been cleaned. If the user does not want this data to be visible on a server outside of the data role, the data source is marked accordingly (e.g., using a label, such as "embedded extract only").
- A user publishes a user-defined dictionary data role from a data preparation flow where the source data for a data field has been cleaned. If the user wants this data to be visible on a server outside of the data role so that the data can be connected to separately from the data role for analysis, the data source is marked accordingly (e.g., using a label, such as "published extract only").
- A user creates a user-defined dictionary data role from a data source that is already published on a server and has a live connection to a database (e.g., a Hadoop database). In this case, the data source is published as a live connection to the database.
- A user uses a published data source that is an extracted CSV as the source of sample data for a regular expression data role. In this case, the data source is a published extract connected to a file.

Modifying Data

In some implementations, an application includes a user interface that allows a user to edit and modify data source values. For example, a user may be able to, via the user interface, modify data source values on a server when a data role uses an embedded data source with a connection to a file.

In some implementations, such as when a data role uses a published data source, users can use any applications or tools that are used to create data roles and its associations to modify the data role.

Figure 7A:
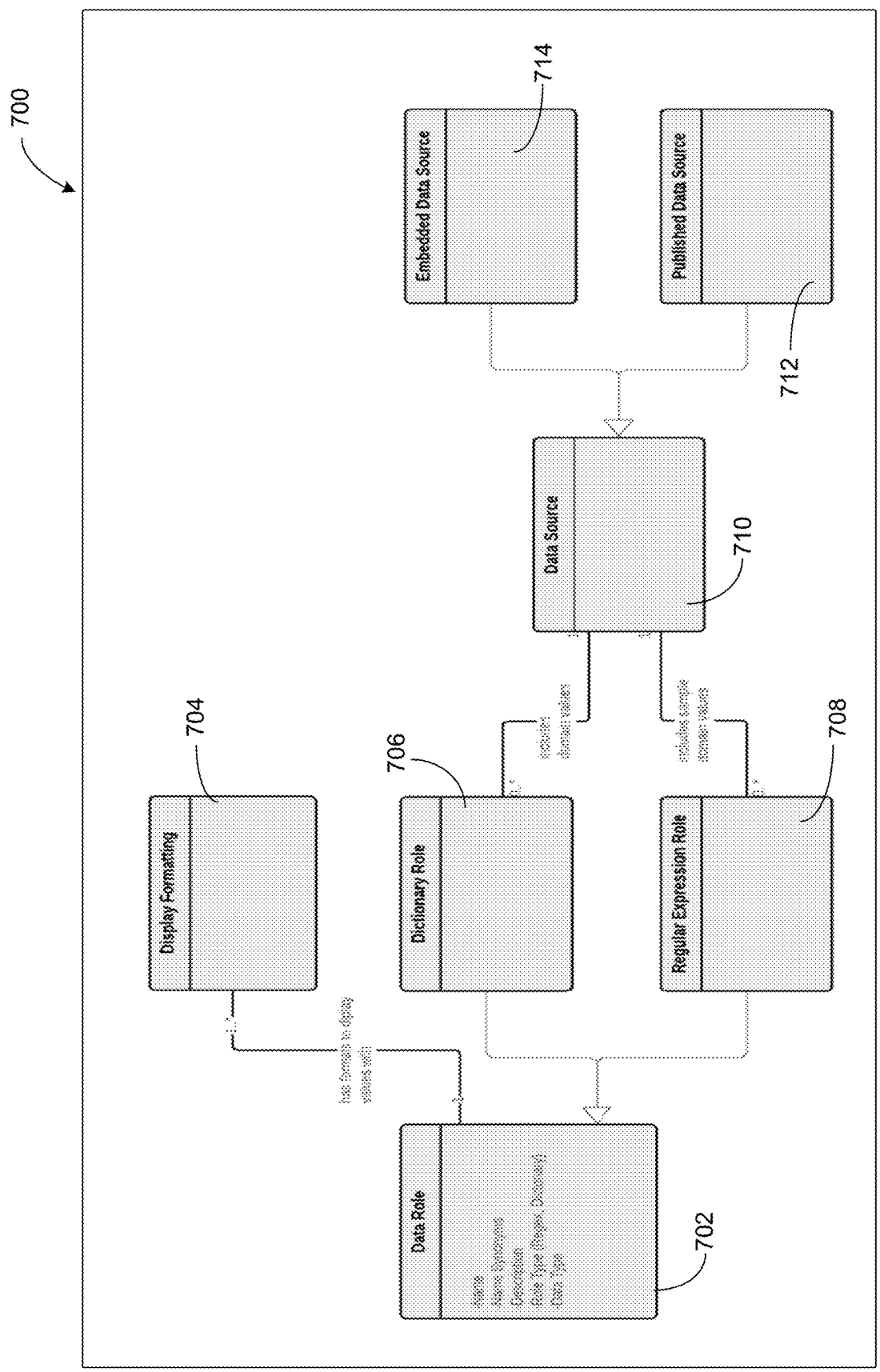
FIG. 7A illustrates a UML model for a data role that uses a data source to store domain values, in accordance with some implementations.

FIG. 7A illustrates a UML model 700 for a data role that uses a data source to store domain values, in accordance with some implementations. The example data role 702 shown in FIG. 7A stores semantic information including name, name synonyms, description, role type (regular expression or dictionary), and a data type. In some implementations, the data fields associated with the data role 702 have one or more display formats 704 to display values. The data role 702 can have a dictionary role 706, and/or a regular expression role 708, in accordance with some implementations. If the data role 702 performs the role of a dictionary, domain values for the dictionary role are stored in a data source 710, according to some implementations. If the data role performs the role of a regular expression (sometimes called 'regexp') then the data source 710 stores sample domain values, according to some implementations. In some implementations, the data source 710 is an embedded data source 714. In some implementations, the data source 710 is a published data source 712.

Figure 7B:
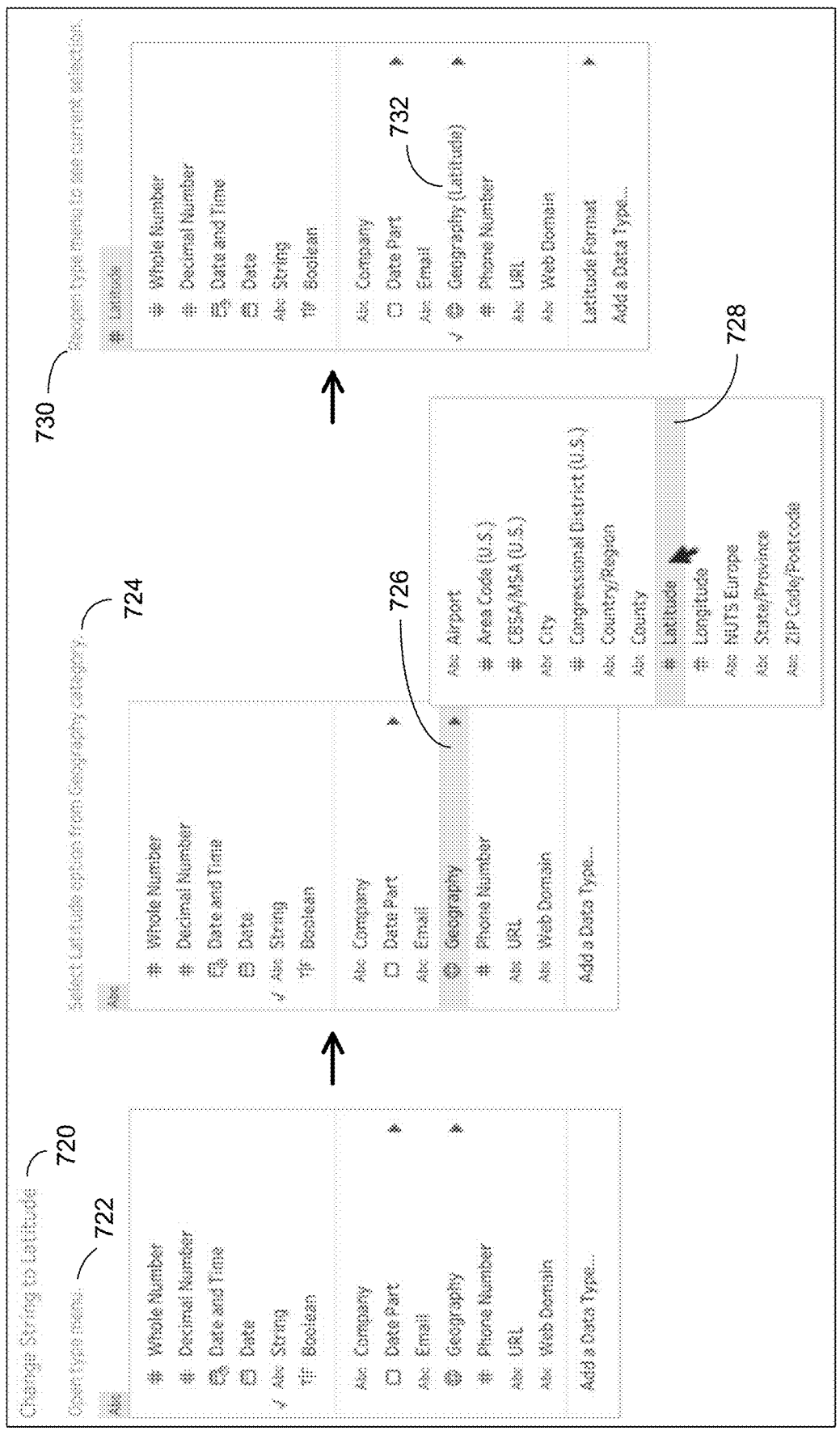
FIG. 7B illustrates an example process for assigning data roles, in accordance with some implementations.

FIG. 7B illustrates an example process for assigning data roles, in accordance with some implementations. Suppose a user wants to change (720) a data field identified as a string to a latitude (i.e., change the semantic role or information).

Some implementations provide a menu of different options to choose from in response to the user selecting an open type menu option 722. Suppose further that the user selects (724) the latitude option from geography category 726. Some implementations show various sub-categories of geography type data, including latitude 728. Suppose the user selects the latitude option 728, some implementations allow the user to reopen (730) the type menu to see current selection. For example, the type menu is refreshed to show the sub-category latitude 732 in the Geography type field. This way, some implementations allow a user to change semantic role for data fields.

Figure 7C:
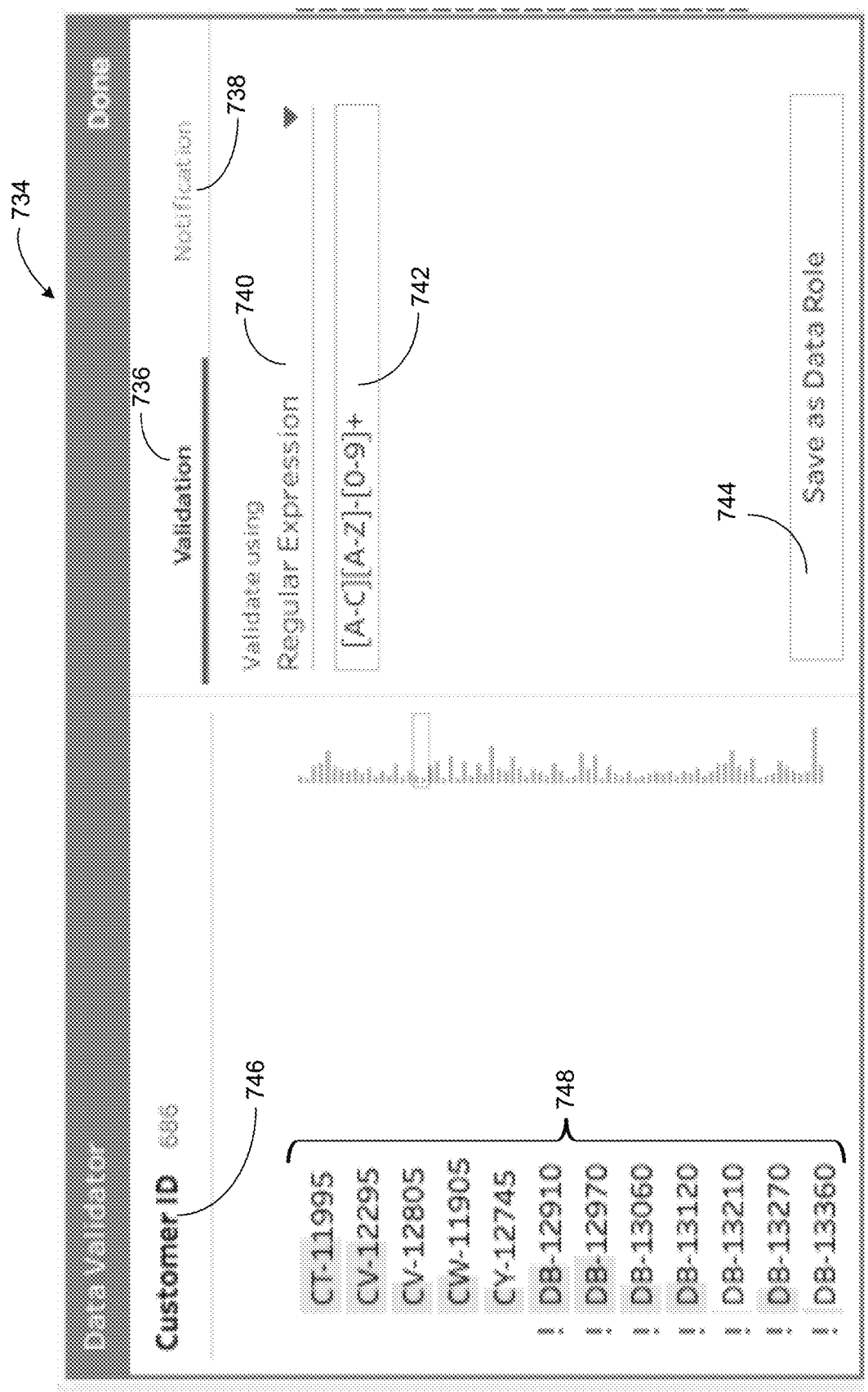
FIG. 7C illustrates an example user interface for validating data, in accordance with some implementations.

FIG. 7C illustrates an example user interface 734 for validating data, in accordance with some implementations. Some implementations allow a user to set up data validation rules 736. Some implementations allow a user to set up triggers or notifications 738 (e.g., actions that take place when validation fails). Some implementations allow a user to input validation rules and have them converted into a data role. In the example shown, the user has selected to validate data using regular expression 740. Some implementations provide various options for validation using a pull-down menu. The example also shows a regular expression 742 that the user has entered to validate the data. After the user has selected validation rules, some implementations provide an option 744 to save the validation rule as a data role. In some implementations, each customer (identified by a customer ID 746) is shown specific options based on permissions. (In some implementations, the displayed options also depend on past usage, data fields, data roles of similar fields, and/or object-level information.) Some implementations also provide options to switch between data sources or databases 748 when setting up the validation rules and/or data roles.

Figure 7D:
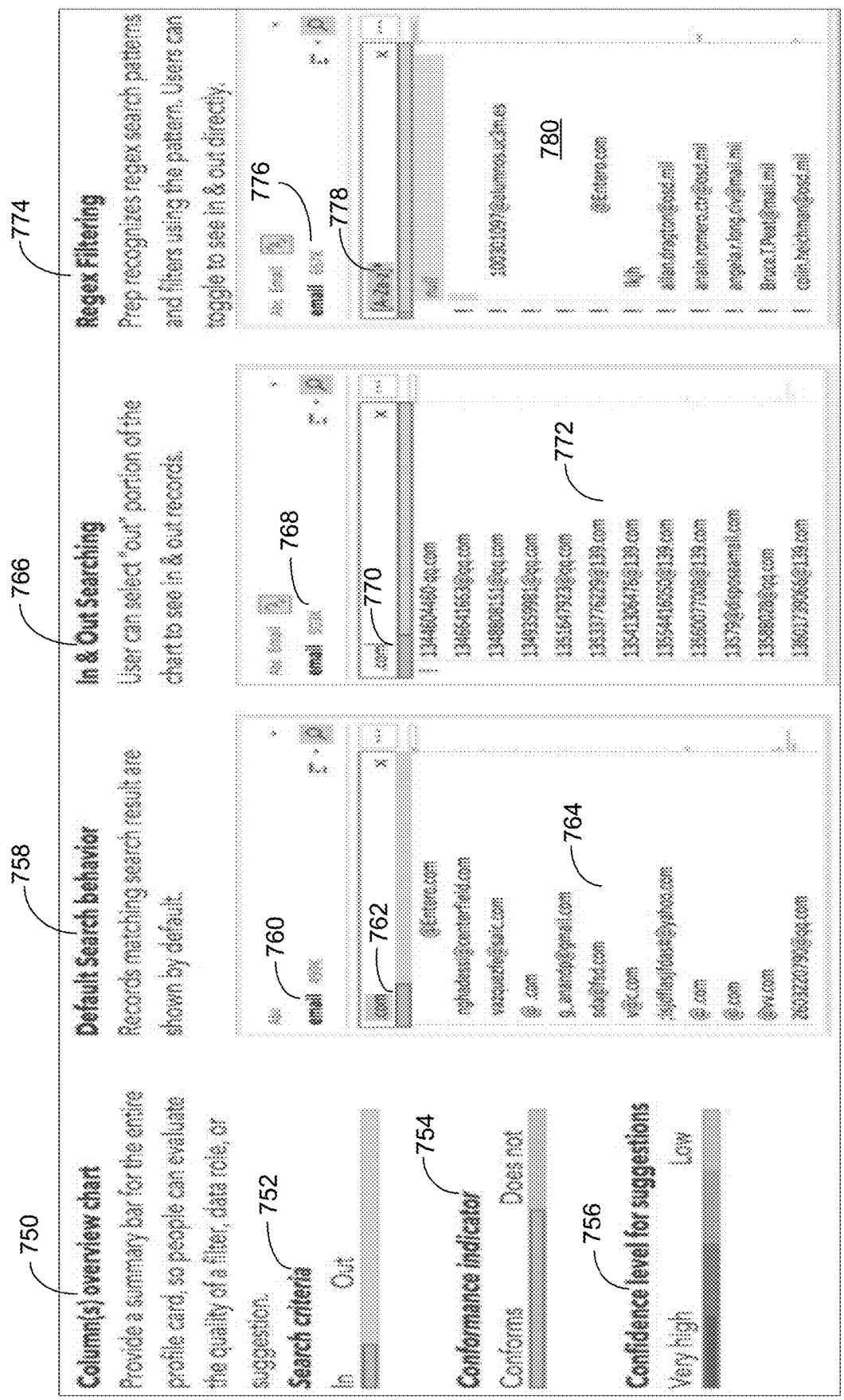
FIG. 7D illustrates example user interfaces for improved search that make use of semantic information, in accordance with some implementations.

FIG. 7D illustrates example user interface windows for improved search using semantic information, in accordance with some implementations. Some implementations provide an interface (e.g., the first interface 750) that provides an overview of columns. Some implementations provide a summary bar for the entire profile card, so a user can evaluate the quality of a filter, data role, or suggestion. Some implementations provide an option 752 to select a search criteria. Some implementations provide a conformance indicator 754, which indicates the extent to which underlying data conforms to the search criteria. Some implementations also provide an indication 756 of the confidence level for suggestions (e.g., low to very high). Some implementations provide a second interface (e.g., the interface 758), which allows the user to set default search behavior. Records that match search result are shown by default, according to some implementations. In the example shown, the user is viewing e-mail 760 related options. Some implementations select an appropriate e-mail domain address (e.g., .com 762) and/or show various options 764 for the email addresses. Some implementations provide a third interface (e.g., the interface 766) for in & out searching. In some implementations, users can select the "out" portion of the chart to see in and out records. In the example shown, the user has selected e-mails 768, and the system responds by choosing a domain 770 and/or several e-mail options 772. Some implementations provide a fourth interface (e.g., the interface 774) for regular expression filtering. In some implementations, a data preparation application recognizes regex search patterns and filters using the pattern. In some implementations, users can toggle to see in and out portions of the chart directly. In the example shown, the user has selected to filter e-mails 776.

Some implementations show the regular expression 778 as well as a sampling 780 of email addresses that match the regular expression.

Some implementations provide user interfaces and/or options to author and/or edit data roles. Some implementations provide user options to edit domain values. Some implementations allow a user to import or export CSV or Excel files to change embedded data roles. Some implementations allow a user to edit a regular expression (e.g., validation rules for a data role). In some implementations, an embedded data source is an extract file without an associated source data document. In some implementations, data roles have specific data formats that enhance machine readability, and/or for easier manipulation. In some implementations, the specific file format enables export or sharing of data roles with other prep (or data preparation) users without a server. In some implementations, an embedded data source is embedded in the same document that includes the data fields. Some implementations allow a user to drop files into preparation or prep repository folders to add data roles.

In some implementations, data roles have their own format (e.g., a JSON file format stored in a Semantic Service), which includes information about the data roles, including name, validation criteria, and sort order. In some implementations, data roles are associated with a published or embedded data sources (e.g., a specific data format that a data visualization platform or a data preparation flow knows how to consume, update, edit, and/or assign permissions).

Some implementations exposing data role format to users and others suppress or hide such information from the user. Some implementations allow a user to publish a data role from a shared data role file (e.g., via a data preparation or prep flow). Some implementations allow a user to create data roles using command line and/or using bulk additions or batch processing.

Some implementations allow users to see data values and test applying regex on the data values. Some implementations allow users to import or connect to a data base table or system, to set up data roles. In some implementations, embedded data roles are excluded from searches.

Figure 7E:
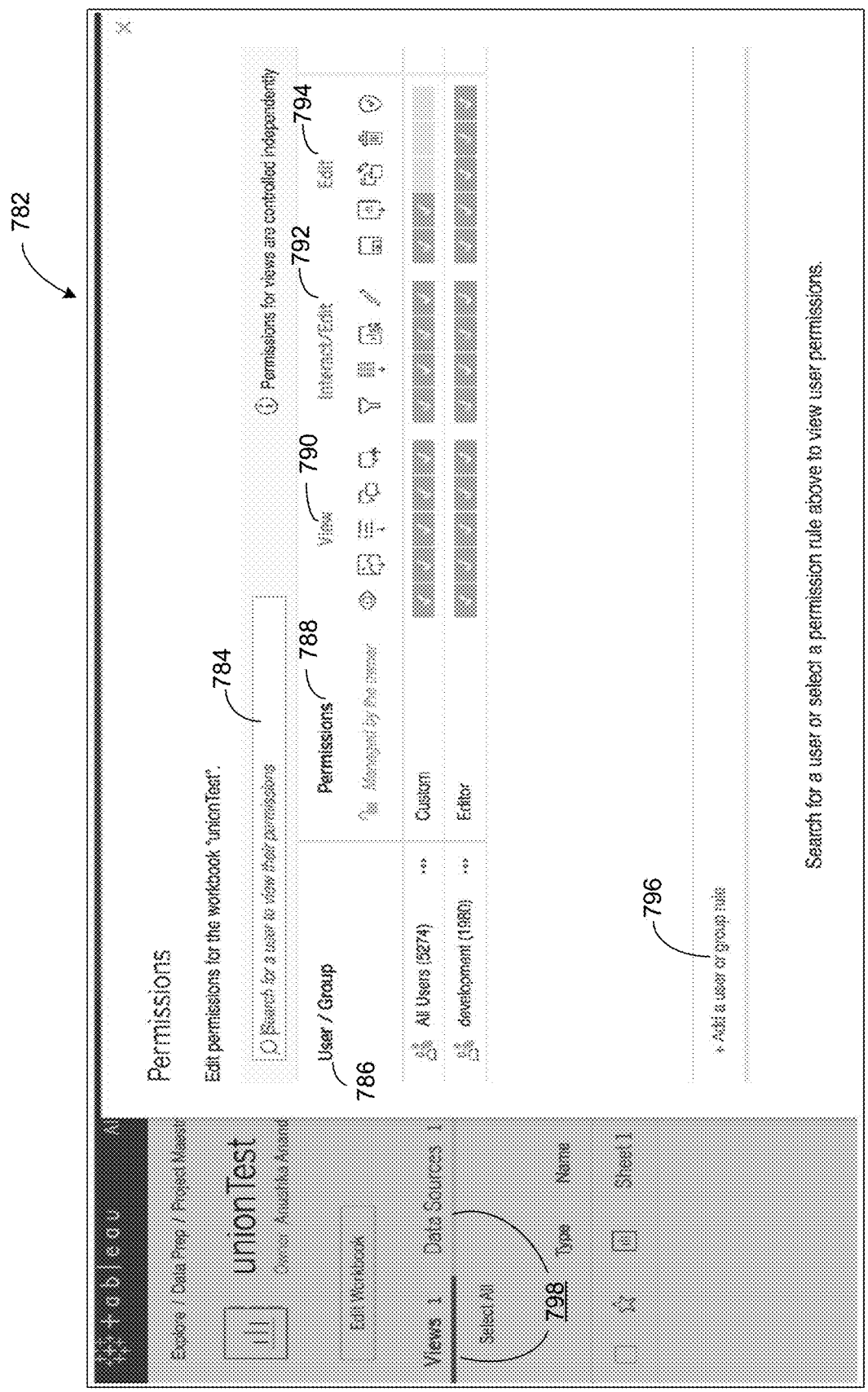
FIG. 7E illustrates an example user interface for controlling permissions to access to data roles, in accordance with some implementations.

Some implementations allow a user to set or change permissions on access to data roles. For example a data preparation user wants to save a data role for personal user, and does not publish the data role to share with others. FIG. 7E illustrates an example user interface 782 for controlling permissions on access to data roles, in accordance with some implementations. Some implementations provide a search box 784 to search for users, and options to grant permissions 788 to view 790, interact/edit 792, and/or edit 794 data roles (and/or underlying data sources or views 798). Some implementations allow a user to select a user or groups of users 786. Some implementations allow the user to add (796) another user or a group rule 796. In this way, various implementations provide access control for data roles.

Some implementations provide differential access (and/or control) to global versus local data roles (local to some group of data objects), and/or custom versus built-in data roles. In some implementations, built-in data roles are not editable. In some implementations, users are allowed to view data sources that reference values corresponding to a built-in role (e.g., geographic roles).

Some implementations allow users to catalog and/or search lineage included in a data catalog for data roles. Some implementations allow users to search for data roles, and/or search for objects (e.g., data sources) that use a data role. Some implementations provide browsable and/or searchable content (e.g., content hosted by a data visualization server)

for semantic types. Some implementations exclude lineage information for custom data roles. Some implementations process data roles similar to other content on database servers, allowing a user to search for data roles by name and not values, without requiring a catalog. Some implementations allow data roles to be packaged as a product that can be sold like other database products. Some implementations allow users to specify data roles while authoring desktop or web documents. Some implementations allow users to associate data roles with fields in a desktop application so that when the information is exported to a data source and/or brought into data preparation data flows, the data is automatically validated.

Data Roles and Cleaning

Some implementations automatically update data roles to reflect changes in a user's workflow. Some implementations automatically maintain data roles by cleaning the data roles (e.g., updating and/or removing old, out-of-date or irrelevant data roles).

Some implementations output data roles to a database that does not support semantic types. Some implementations discover semantic types and write the discovered semantic types when outputting data roles to the database. Some implementations use semantic types as an aid to clean data. In some implementations, there are multiple output steps, some of which write back to a database (that do not support semantic types). Some implementations do not output semantic types from a work flow, even if the semantic types are used to facilitate data role cleaning and/or shaping.

Some implementations allow user to connect to data sources and uses data provided by the data source without type changes or cleaning the data. This step allows users to view the data before any changes are made to the data. In some implementations, for databases that have strictly typed fields, the data types are shown at an input step. In the case of a text file (e.g. CSV), some implementations identify all data with a string data type, and perform additional data type identification in a subsequent transform step.

To illustrate further, suppose a user wants to filter down data to only include the last 3 months of data. Some implementations provide the user with at least two options at the input step: a moderate option which includes primitive type identification, and a flexible option that includes semantic type identification. Suppose further that the user selects the moderate option. Some implementations respond by identifying primitive data types (e.g., number, string, date, or Boolean) without cleaning the data. Some implementations perform initial data type inference for text files. Some implementations support filtering. For fields where data type identification results in dropping of data or values, some implementations notify the user and allow the user to, for example, change the data type to a string and perform cleaning in a subsequent transform step. More advanced semantic type identification is done only in a subsequent transform step. Suppose, on the other hand, the user selects the flexible option. Some implementations allows users to discover and/or assign data types. Some implementations allow the user to discover semantic types during the input step. In some implementations, the user can initiate discovery of semantic types in order to ensure that initial data type identification is fast and efficient. For example, the initial step may include an option to launch a semantic type analysis. In some implementations, users can optionally clean data during the input step. Some implementations allow full type discovery, and/or disallow cleaning, during the input step.

Some implementations perform filtering during the input step to remove unwanted fields so that the unwanted fields are excluded from the work flow. For instance, rows can be filtered out to reduce data that runs through the flow. In some cases, such as when a sampling limit is imposed, some implementations perform filtering during the input step. Some implementations identify semantic types in order to make it easier for a user to understand which data fields should be excluded or filtered out during the input step. Some implementations provide data cleaning or semantic type suggestions regardless of whether a full domain for a data field is provided or known.

In some implementations, data cleaning is an iterative process that balances interactive performance of the tool against the robustness of running the flow against all data. In some instances, data may need to be updated or cleaned for a number of reasons, such as when operating on sampled data and transitioning to data that includes full domains. In other words, the cleaning may remain accurate and sufficient for a limited period of time, but a transition to data that includes full domains causes the data to change and new domain values are introduced, thereby invalidating assumptions about the data. For example, an iterative data cleaning process includes providing a user with suggestions so that the user may clean the data based on sampled data. Subsequently, the user runs the flow and various kinds of assertions lead to notifications informing the user as to where processed data runs counter to assumptions that were made interactively during the first step. In a specific example, a user sets up a group and replace mapping for a data field. When the user runs the full flow, new values outside of the original sample data are found. Alternatively, the user may change the data type of the data field using group and replace so that the data values in the data field map to values in a specification. In such cases, the new values in the data field are found, which are not valid for the previously defined data type (when operating on the sampled data). As a result of either of these scenarios, in some implementations, the user receives a series of resulting notifications when the user opens the flow again, and the user may edit the flow to account for this new information. After finishing any edits, the user may run the flow again.

Semantic Role Interaction with Data Type

Some implementations treat semantic types as an extension to the existing type system. For example, a user selects a single data type name (e.g. "Email address") and this single data type name identifies a primitive data type (e.g., string) and any associated semantics. When the user selects the "Email address" type, the data type of the data field is changed to "string" (if it is not already), and invalid values within the data field are identified to the user. In such implementations, the treatment of semantic types allows there to be a single, underlying data type for a semantic role. The data type chosen is the one that best reflects the semantics of the role and allows the user to perform expected manipulations, and/or cleaning on values with that role. In some instances, not coercing values to the ideal underlying data type can lead to problems, such as preventing the user from normalizing values into a single representation or performing meaningful calculations or cleaning operations.

Some implementations treat semantic roles as being independent from the underlying primitive data type, and the two attributes can be changed independently from one another. For example, a user may set a data type to "Whole Number" and then apply the semantic role "Email Address" to the data field in order to see which of the values are invalid (e.g., the values are all numbers and the data type remains Whole Number). In another example, zip codes may be stored in a whole number data type, with the semantic role set to "Zip Code/Postcode." In this way, the semantic role is applied without changing the data type of the data field, even though the most general data type required to allow all valid values is in fact a "String" (to handle alphanumeric postcodes and possibly hyphens). In some instances, this is useful if the user ultimately wants to write the data field back to a database so that the data field should remain as a whole number data type.

In some implementations, a user may access all of the semantic roles available for any data through a user interface. Additionally, the user interface may also include any of: a list of available data types that should be suitable for any data field, a list of available semantic roles that should be suitable for any data field, a list of data types and/or data roles that are available, a list of semantic roles that a user may pick from where each of the semantic roles is not dependent on current field data type (e.g., the user can change from any permutation to any other permutation of data type or data role). In some implementations, the user interface displays both the semantic role and the primitive data type (e.g., via a representative icon on the field header that summarizes the data field). In some implementations, changing formatting of a data field does not change the data type in order to maintain calculations. In some implementations, users are able to merge formatting into data fields during an output step (e.g., exporting, writing, or saving).

Some implementations maintain a data type separate from the semantic role. This is helpful when an output target does not retain the semantic role (e.g., a modeling attribute). In such instances, it can be useful to maintain user awareness of a stable data type element throughout a work flow. Some implementations maintain an underlying basic data type without changing the data type and also store the semantic role independently. For example, some implementations surface this information in a tooltip when the system detects an input (e.g., a user moves the cursor or hovers it over a data type icon in a profile). User awareness of data type is also important in calculations (which only work on primitive data types). Some implementations maintain user awareness of the data type without changing the data type and the semantic role independently of one another. In some implementations, representation of the data is maintained throughout the work flow so that the information displayed in a user interface maintains context throughout a user's work flow. For example, the data representation is maintained from an input step (e.g., data cleaning step) to an output step (e.g., the saving, publishing, exporting, or writing step).

In some implementations, a semantic role applies to more than one data type. In some implementations, when a semantic role is selected, the data type is not automatically changed in order to keep the data type consistent for output purposes.

In some implementations, when there are different data field types, the data fields can be automatically changed to a more general type (with no semantics) that can represent values in both data fields. Alternatively, when dealing with different data field types, the data fields can be automatically changed to a more general type that can represent values in both fields. On the other hand, if the semantic roles are different, the semantic role is automatically cleared.

Some implementations identify invalid joins based on the semantic roles of the join clause fields. For example, suppose the join clause fields have different data types or different semantic types. Some implementations identify invalid joins when the join clauses have similar semantic roles.

In some implementations, the data type of a data field retains the original data type regardless of format (e.g., even when a user changes a display format of the data field) so that the data field can be manipulated as expected. For example, a date data field may have a pure numeric format or string format, but will retain the same canonical date data type, regardless of how it is displayed. In another example, a "day of week" data field retains its underlying number type, even if the data field value displays text, such as "Monday," so that calculations can still be performed using the data values in the "day of week." For example, if the value is "Monday," the calculation "day+1" will give the result, "Tuesday". In this example, accepted data values are strings, (e.g., "Sunday," "Monday," . . . "Friday," "Saturday"). At an output node, the data type of the "day of week" data field may need to be changed depending on user goals and output target. For example, data may be output to a strongly typed database so that the data output defaults to a base data type and requires a switch of the date data field to a "string" data type in order to maintain format. Alternatively, in some implementations, the data output defaults to a "string" data type and thus does not require a change in the data type to preserve formatting. In some implementations, the data type can be changed by a user.

Some implementations support various semantic type manipulations even while maintaining underlying primitive data types. For example, suppose a user manipulates a date field with a date type to change the format of the date. Some implementations maintain a primitive data type for the date as a whole number even though the format changes. Some implementations identify the primitive data type and indicate the semantic type only when the user requests that type.

In some implementations, the data is not cleaned at an input node (described above). Some implementations notify a user of any data that is dropped by a type assignment and the user will be provided with opportunities to edit the data in a subsequent transform node. In some implementations, the transform node can be initiated by the user from the input node. Additionally, the data quality and cardinality may not be shown during the input step and shown only during the transform step.

In some implementations, semantic types have a corresponding mode. Some implementations include a strict mode and a non-strict mode. If the semantic type is in the strict mode, values that fall out of the definition of the type are not preserved in the domain. If the semantic type is set to the non-strict mode, values that fall out of the definition of the type are preserved in the domain and are carried through the flow. In some implementations, primitive types are always strict and do not support values that fall outside of the type definition throughout the flow.

Some implementations perform text scanning and notify a user if the data is being dropped for a particular type. Some implementations provide the user with the values of the data being dropped. In some implementations, for a type change operation, values that fall outside of the type (which will be dropped) are marked in a profile view when a type change recipe is selected. In some implementations, once the user moves on to a new (e.g., next) recipe, these dropped values will no longer be shown. Thus, an immediate visibility to values dropped (or to be dropped) are provided to the user so that the user can select them and perform a remap, if desired. Additionally, some implementations allow the user to select an action from a list of actions, which creates a remap to null for all values that fall outside the type definition. In some implementations, the user can also edit or refine the remap or select the remap action from one or more of provided suggestions or recommendations. In some implementations, the remap performed immediately before the type change operation so that the remap values will flow into the type change (since values that are dropped do not leave the type change operation so they cannot be remapped after the type change). In some implementations, semantic types are used as data asserts rather than, or in addition to being treated as, a type. Some implementations allow a user to indicate to the system that "this is the sort of data I expect here; notify me if that is not the case," and the system automatically notifies the user accordingly.

In some implementations, an additional automatic clean-up step is included to provide type identification and suggestions. In some implementations, the additional automatic clean-up step may be run in the background (e.g., by a backgrounder) or may be cancelled by a user.

For example, when an existing column is duplicated, if any data is being dropped for a particular type, the values in that column that are being dropped are remapped to null. Some implementations provide a side-by-side comparison of the original column and the duplicated column.

Some implementations allow a user to add an auto clean step, which adds a step and kicks off type identification and suggestions. In some implementations, the step is performed as a background job. Some implementations provide a user option to cancel a job while it is running.

Some implementations duplicate columns to clean up data. Some implementations duplicate an existing column, map type specification values in a column to null, perform or display side by side comparison of columns (e.g., selecting null in mapped columns to brush mapped values in duplicate column), allow a user to select data field value out of type values in the duplicate column, and filter to obtain only those rows that contain the values so as to show other fields in row as context for correction. Some implementations allow a user to correct values mapped to null in a duplicate column, then remove original columns. Some implementations use an interface similar to the join clause tuple remap user interface to allow the user to perform the operations described herein.

Some implementations obtain full domain values for fields to do robust correction. Some implementations indicate domain values.

In response to a type change action, some implementations incorporate remap to auto map values out of specification to null. Some implementations allow a user to edit remap from type change recipes.

Some implementations show values that are out of type specification when a user selects a type change recipe. In some implementations, if another recipe is added, out of specification values disappear (so they don't move through the flow). Some implementations perform inline or edit remap on these values, which creates remap recipe before type change recipe. Some implementations show group icons on values that are groups when a user selects a recipe.

In some implementations, type change operations create a recipe to remap to map out of specification values to null, followed by a type change recipe, so that values are remapped before hitting type change. Some implementations use this as an alternative if it is not possible to display out of specification values marked in the domain when a user selects a type change recipe.

In some implementations, type change actions implicitly exclude any values that are out of type specification. In some implementations, a recipe corresponds to a number of values excluded. Some implementations allow a user to create a remap upstream for type change mapping (e.g., to map excluded values to null). In some implementations, when the cleaning flow is run, a list of excluded values is provided to the user, so that the user can add the values to an upstream remap to clean data.

In some implementations, a user interface allows a user to delete recipes by dragging a selected annotation (corresponding to a recipe) out of a profile. In some implementations, type assignment is strict in the input and output steps and is non-strict (e.g., flexible) during intermediate steps (e.g., steps between the input and output steps) in order to preserve values.

In some implementations, a data type and/or semantic role for a field indicates a user's aspiration for what the user wants the data in the data field to be. In combination with a data name, the data type helps communicate the meaning and provide an understanding of the data field. For example, if the value is a decimal number called "Profit", it is likely that the values are either in dollars or a percentage. Thus, the data type can inform or determine what sort of operations are allowed with the data field, thereby providing both the user and the application with increased confidence regarding the context (including inferred context) of the data field (and sometimes the data source) and an outcome of an operation, such as a calculation, a remap, or applying a filter. For example, if a data field has a numeric type, the user can be confident that the user can perform mathematical calculations.

Some implementations use semantic roles for a data field to help a user clean the data by highlighting values that don't match the data type and require cleaning and/or filtering. In some implementations, the data type and/or semantic role for a data field provide context allowing a data preparation application to perform automated cleaning operations on the data field.

In some implementations, when a user selects a type change for a field, values that are outside of the type specification are grouped and mapped to null. Some implementations exclude such values and/or allow a user to inspect and/or edit values in the group. Some implementations group out of type specification values and out of semantic role values separately. Some implementations allow a user to select the group and merge/apply the group to a new field.

Some implementations show a profile summary view that visualizes and indicates select outlier values (e.g., null values). Some implementations show each value in a histogram. Some implementations show values that do not match the data type (e.g., labeled "Dropped") values that do not match semantic role (e.g., labeled "Invalid" values) and/or elect outlier values. Some implementations indicate values that do not match the data type using strike-though text. Some implementations indicate values that do not match semantic role in red text, or by a special icon. Some implementations filter the values to show only outliers, values that do not match data type, and/or values that do not match semantic role. Some implementations provide a search box for filtering, allowing the user to activate search with options in a drop down to "Search within invalid values". Some implementations provide options to filter the list. Some implementations provide options to select individual outliers or an entire summary histogram bar, and move the selection onto another field (e.g., a right click option or drag and drop capability), or move values between fields to create a new field. Some implementations show the data types of new fields and/or indicate that all values match the data type. Some implementations provide a user with options to clean values in the new field, and/or subsequently drag dropped values or an entire field back to the original field to merge back changes.

Recommendations in Data Preparation

In some implementations, automated suggestions include transforming values of individual fields. In some cases, this may be facilitated by assigning a data role to a data field. In other cases, assigning a data role to a data field is not required. When a data role is applied to a data field, a validation rule is applied on data values in the data field and outliers are shown in a different visual treatment in the profile and data grid (e.g., outliers may be emphasized, such as highlighted or shown in a different color font, or deemphasized, such as grayed out or shown in a light color font). This visual treatment of the outliers is maintained throughout the various steps in the workflow.

In some implementations, remap suggestions include: (i) manual remapping of the outlier values, (ii) remapping the outlier values by leveraging a fuzzy match against a domain associated with the assigned data role, and/or (iii) automatically remapping outlier values to null.

Some implementations provide a 1-click option to filter out the outlier values. Some implementations provide a 1-click option to extract the outlier values into a new data field so that the user can edit the extracted values (either manually, through remap operations, or by applying data roles), then merge the edited values back into the data field or store the edited values separately. Some implementations provide an option to drop the data field if the majority of values are null.

In some implementations, when a user selects a data role for a particular data field, the data preparation application offers transformation suggestions. For example, for domains for URLs or area codes for phone numbers, the transformation suggestion(s) may include an extract/split transformation (e.g., from 1112223333 to "area code"="111" and "phone number"="2223333"). In another example, transformation suggestions may include a reformat suggestion for data fields such as: (i) state names to state abbreviations (e.g., California to CA), (ii) phone numbers to a specific format (e.g., from 1112223333 to (111) 222-3333), (iii) transforming dates to be represented in different formats, or by different extracted parts (e.g., extract Dec. 1, 1990 to only year, or change format to 12/01/1990).

Some implementations auto-parse, validate, and/or correct/clean date fields in various formats. Some implementations standardize country values. Some implementations display values based on a canonical list of names. Some implementations recognize age to be a positive number and/or provide options to search and/or standardize age values. Some implementations allow users to standardize lists of database names based on connector names. Some implementations allow the user further edit options and/or provide manual overrides. Some implementations standardize city, state, or similar values based on semantic roles.

In some implementations, a remapping recommendation is used to inform a user that semantics of a data field have been identified and to offer the user suggestions to clean the data. In some implementations, the cleaning suggestions include showing the user at least a portion of the metadata so that the user can better understand what each suggestion is and why the suggestion is relevant to the user's needs. In some implementations, a user's selections drives analysis and/or further suggestions. In some implementations, a user interface includes options for a user to view an overview and/or details, zoom, and/or filter data fields and/or data sources.

In some implementations, the user interface includes a result preview (e.g., a preview of a result of operations such as a filter, a zoom, or applying a data role) so that the user may proceed with confidence.

Figure 8:
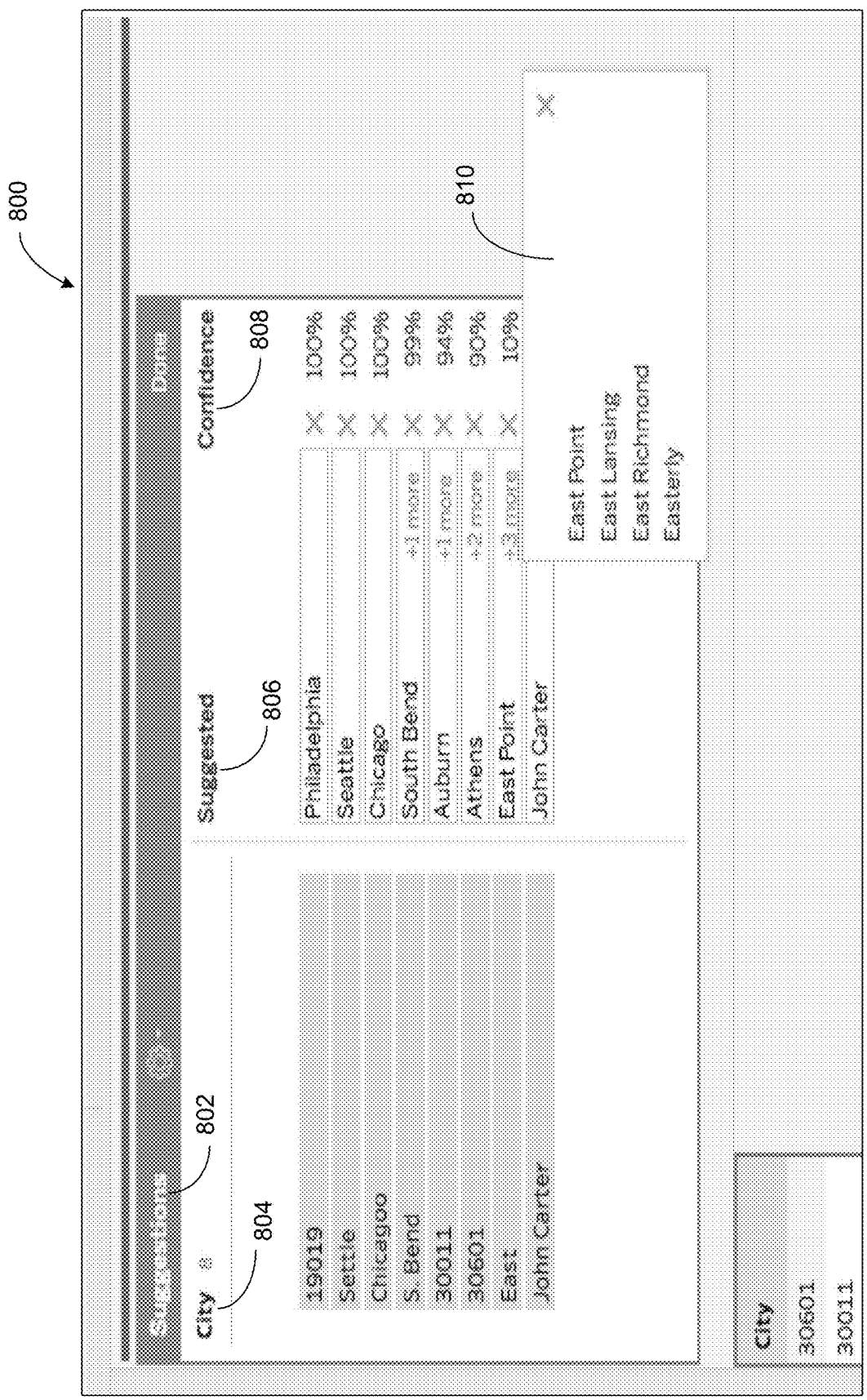
FIG. 8 illustrates an example user interface for previewing and/or editing a cleaning recommendation, in accordance with some implementations.

FIG. 8 illustrates an example user interface 800 for previewing and/or editing a cleaning recommendation, in accordance with some implementations. The example shown in FIG. 8 shows suggestions 802 for city 804. Some implementations show a list of initially suggested options, followed by further suggestions 806. Some implementations show confidence levels 808 for the additional suggestions 806. Some implementations show specific suggestions (or individual values) which can be especially useful for long values or names. Some implementations show multiple possible suggestions when confidence is below a predetermined threshold (e.g., 80% confidence level). Some implementations show more suggestions in response to user clicks or selection. Some implementations allow users to select from a list 810 rather than having to type in additional suggestions, especially for lengthy suggestions. Some implementations provide such options as part of a viewing mode (e.g., a mode in a group and replace editor). Some implementations provide user options to switch between viewing modes. For example, one viewing mode may be more appropriate for one set of data roles, whereas others might be more suitable for other set of data roles.

Figure 9A:
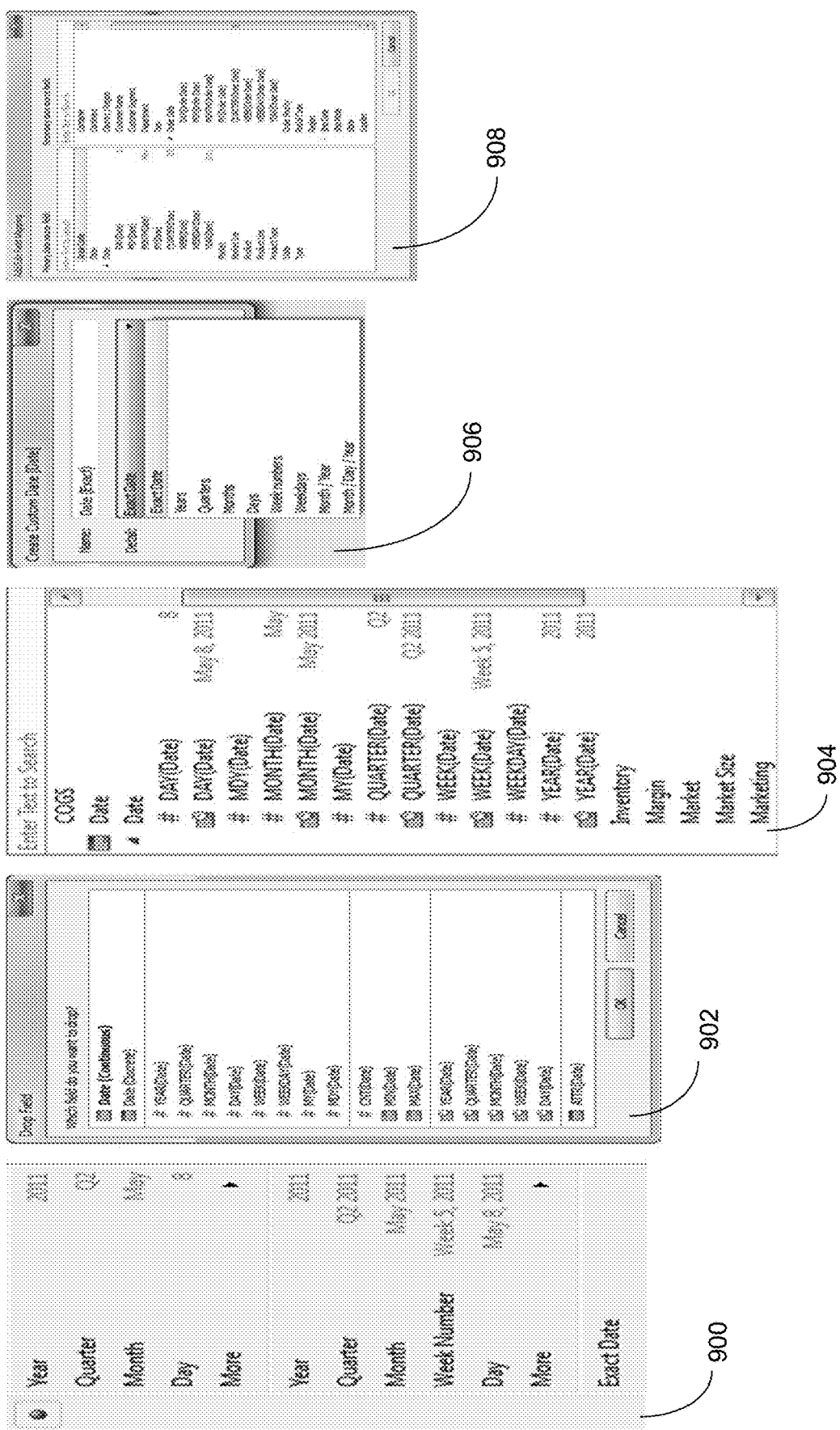
FIGS. 9A-9D illustrate example user interfaces for resource recommendations based on semantic information, in accordance with some implementations.
Figure 9B:
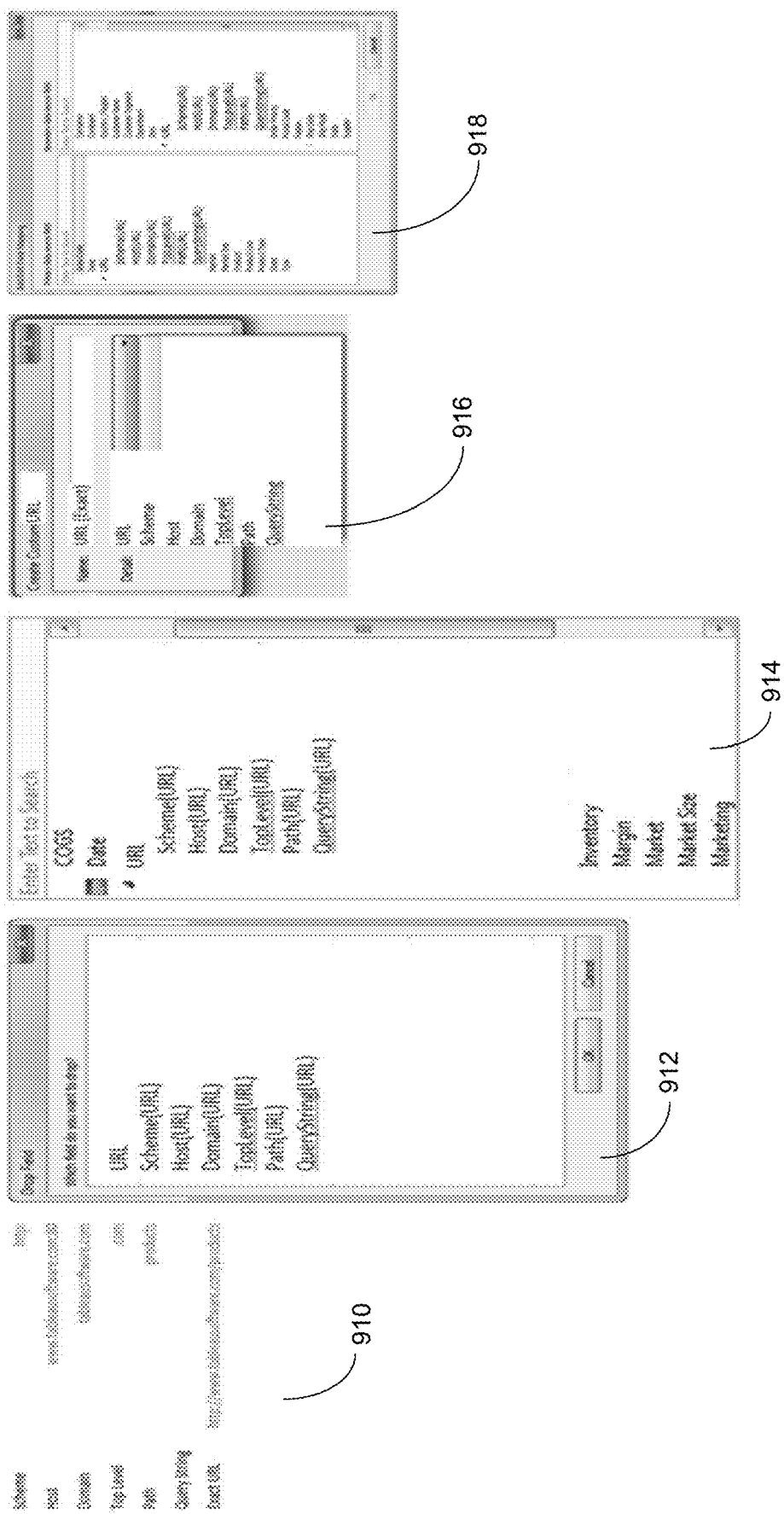
Figure 9C:
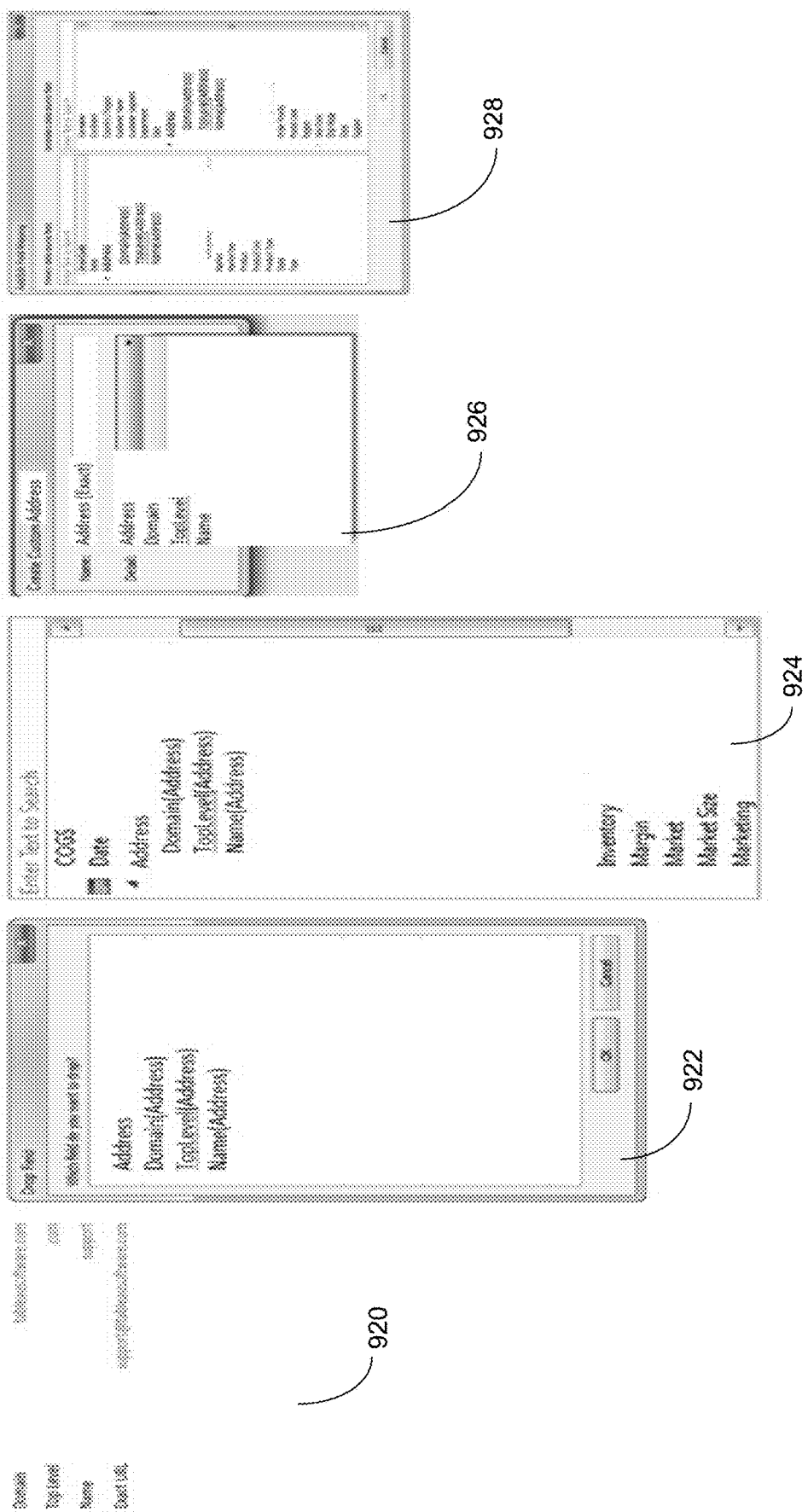
Figure 9D:
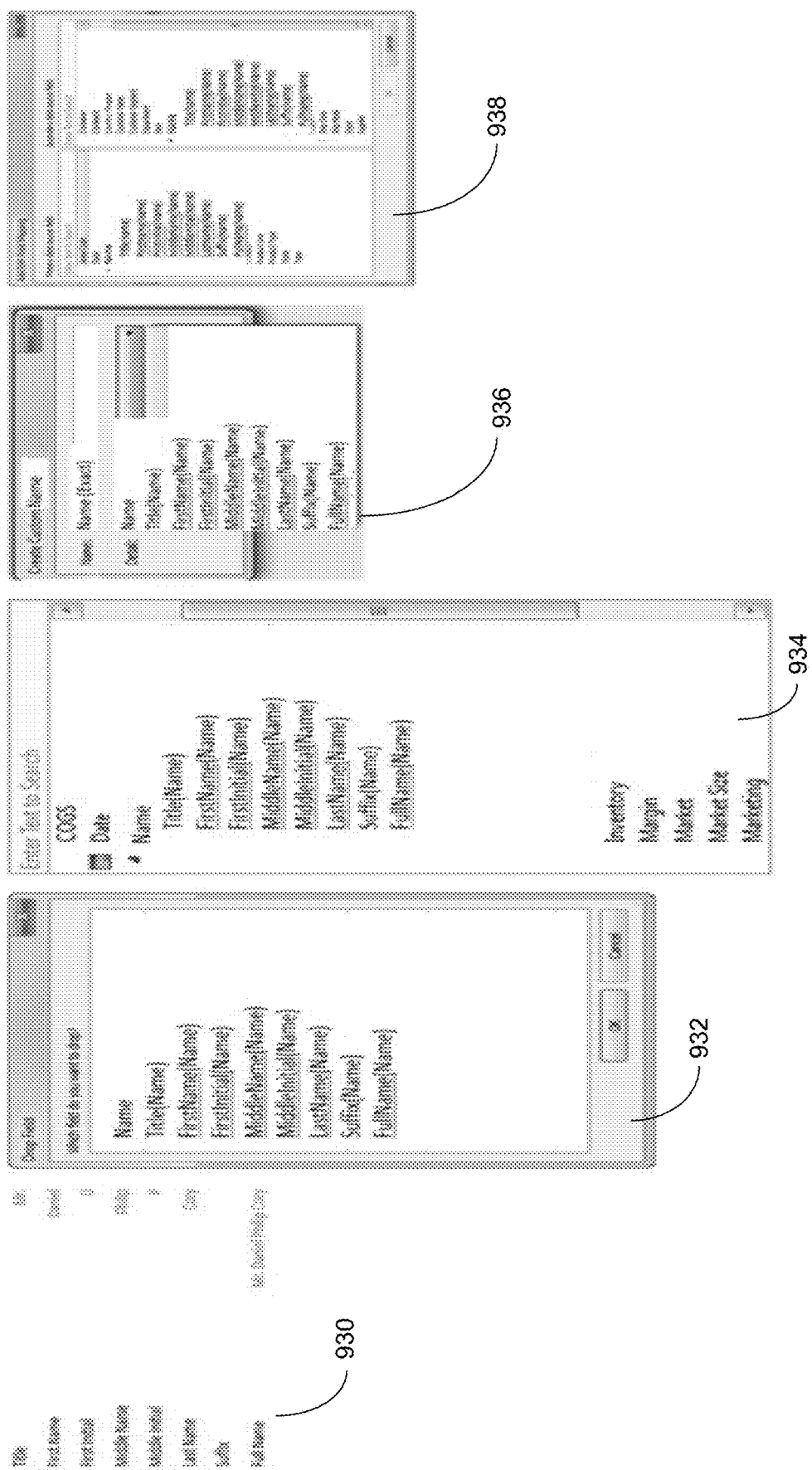

FIGS. 9A-9D illustrate example user interfaces for resource recommendations based on semantic information, in accordance with some implementations. FIG. 9A shows various interfaces for manipulating parts of dates, according to some implementations. Example interface 900 is a pill context menu that shows various options for dates. Example interface 902 shows right drag and drop options that allow a user to drop fields (date types in this example). Example interface 904 shows options for user to enter text to search for actions. Example interface 906 shows options to create custom dates. Example interface 908 shows options for adding and/or editing field mapping to allow a user to edit relationships (e.g., relationships between fields). Some implementations provide DATEPART and/or DATETRUNC functions to manipulate date fields. FIG. 9B shows various interfaces for manipulating parts of URLs. Example interface 910 is a pill context menu that shows various options for URLs. Example interface 912 shows right drag and drop options that allow a user to drop fields (URL types in this example). Example interface 914 shows options for user to enter text to search for actions corresponding to URLs. Example interface 916 shows options to create custom URLs. Example interface 918 shows options for adding and/or editing field mapping to allow a user to edit relationships between URL fields. Some implementations provide functions to manipulate data fields and/or data roles, similar to BigQuery's HOST( ), DOMAIN( ) and TLD( ) functions. FIG. 9C shows various interfaces for manipulating parts of e-mail addresses. Example interface 920 is a pill context menu that shows various options for e-mails. Example interface 922 shows right drag and drop options that allow a user to drop fields (e-mail parts in this example). Example interface 924 shows options for user to enter text to search for actions corresponding to e-mails. Example interface 926 shows options to create custom e-mails or filter e-mails (e.g., using date). Example interface 928 shows options for adding and/or editing field mapping to allow a user to edit relationships between e-mail fields. FIG. 9D shows various interfaces for manipulating parts of names. Example interface 930 is a pill context menu that shows various options for names. Example interface 932 shows right drag and drop options that allow a user to drop fields (parts of names in this example). Example interface 934 shows options for user to enter text to search for actions corresponding to names. Example interface 926 shows options to create custom names or filter e-mails (e.g., using date). Example interface 928 shows options for adding and/or editing field mapping to allow a user to edit relationships between e-mail fields. Some implementations include examples for field names, group parts, include truncations, and/or match parts (for editing field mapping) in one or more user interfaces.

Figure 10A:
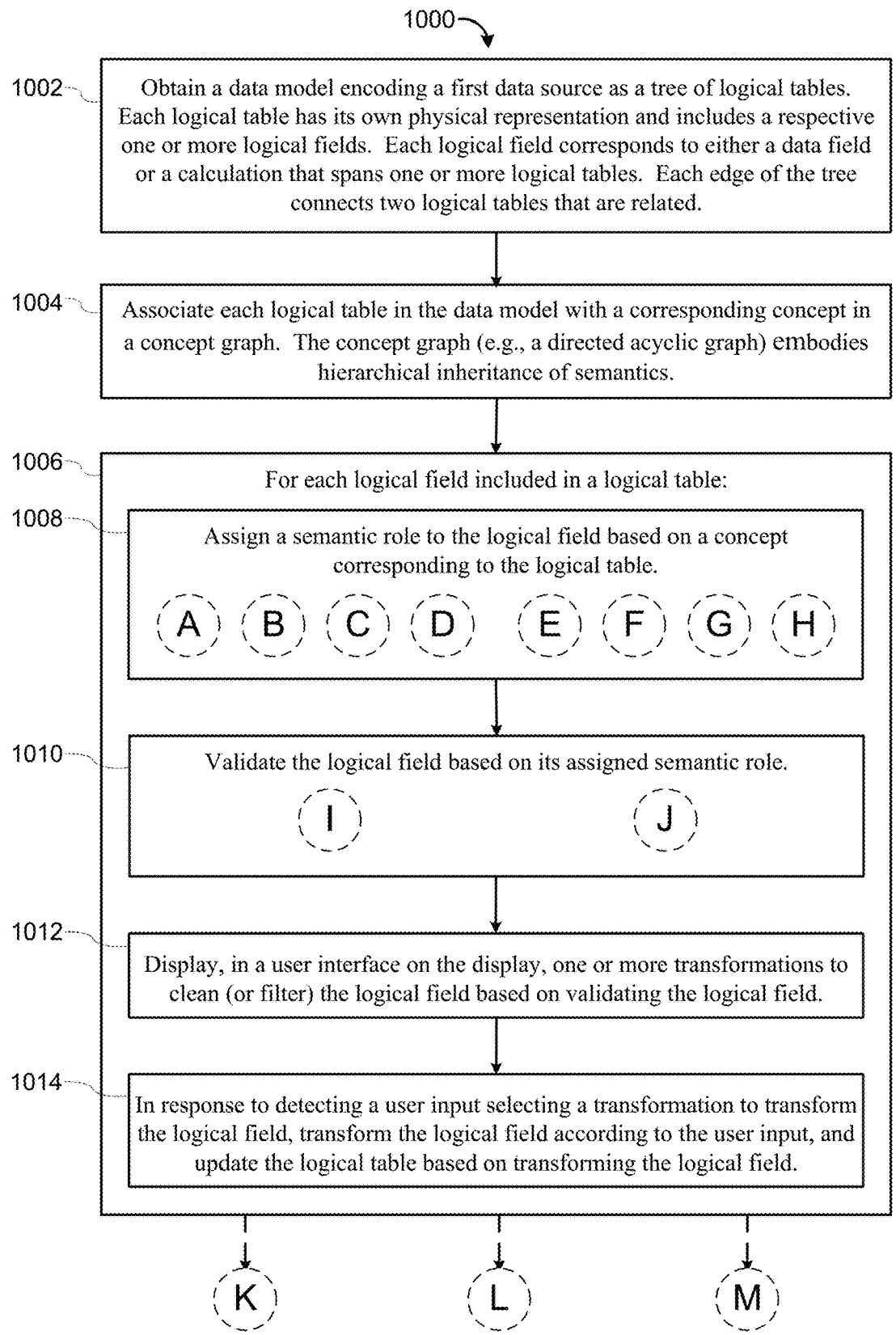
FIGS. 10A-10N provide a flowchart of a method 1000 of preparing data for subsequent analysis, in accordance with some implementations.
Figure 10B:
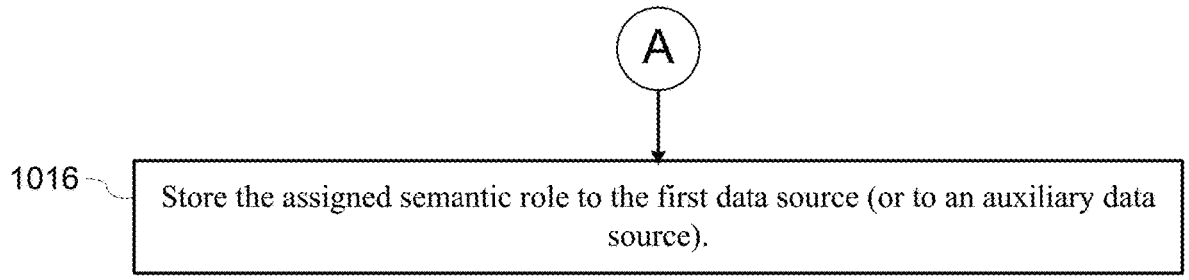
Figure 10C:
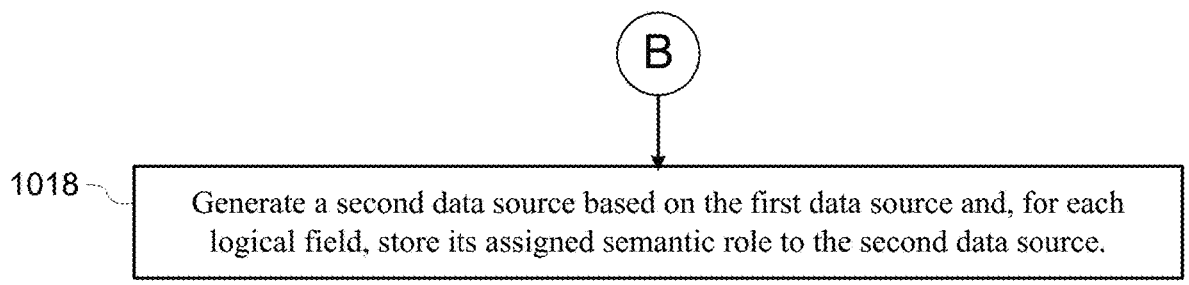
Figure 10D:
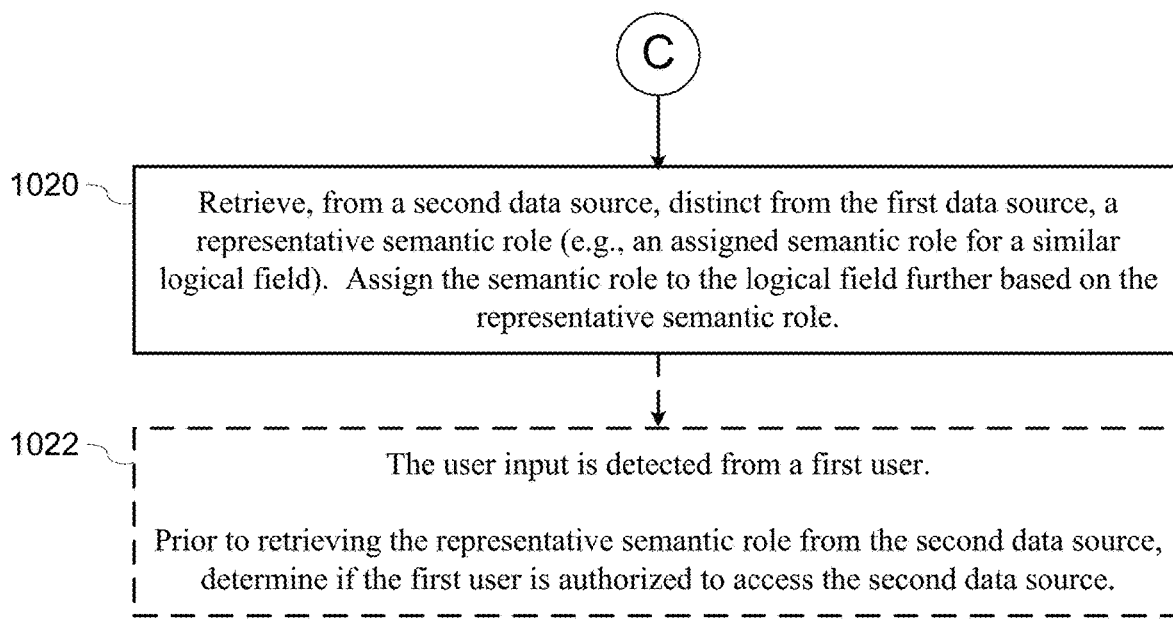
Figure 10E:
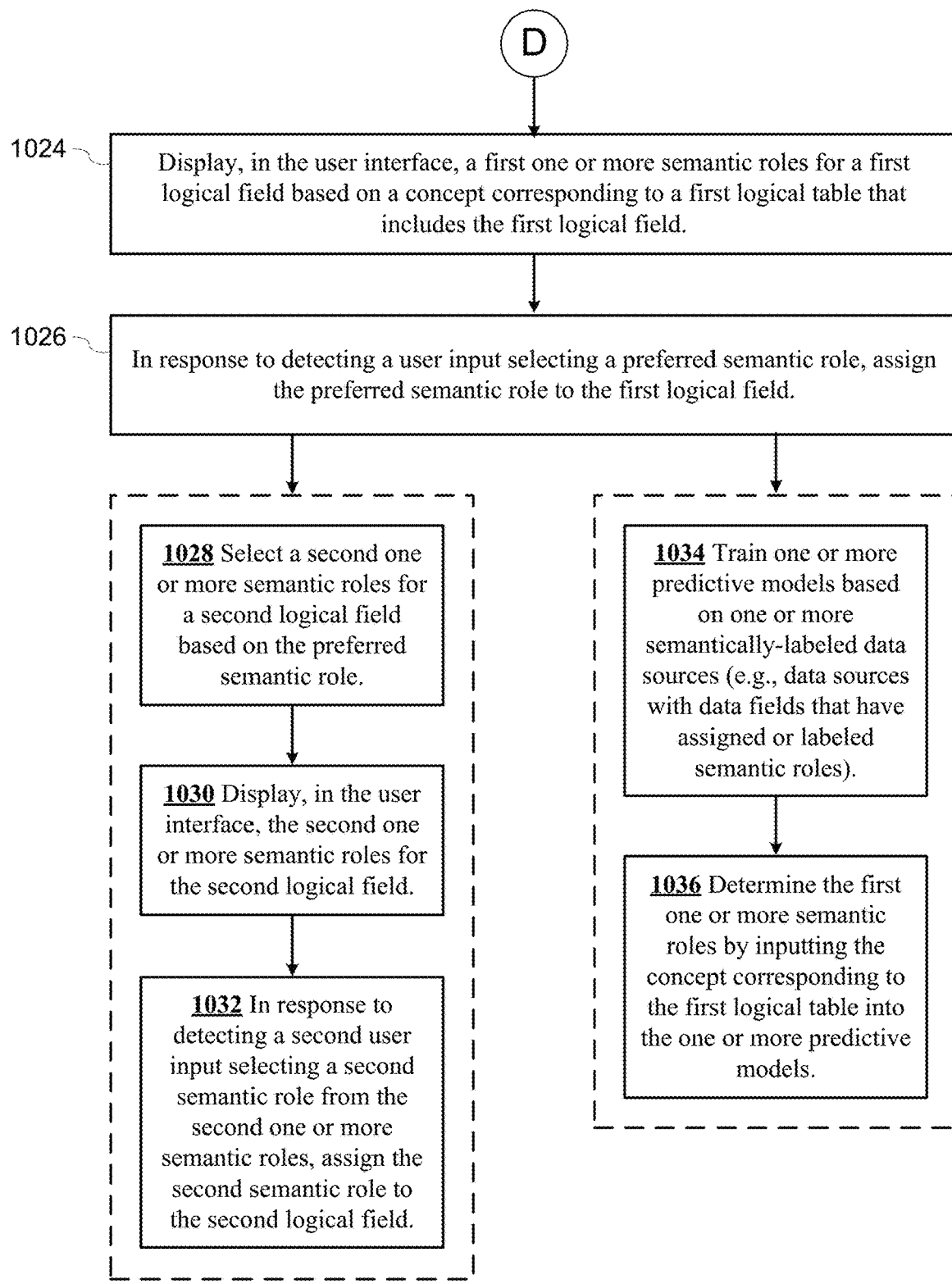
Figure 10I:
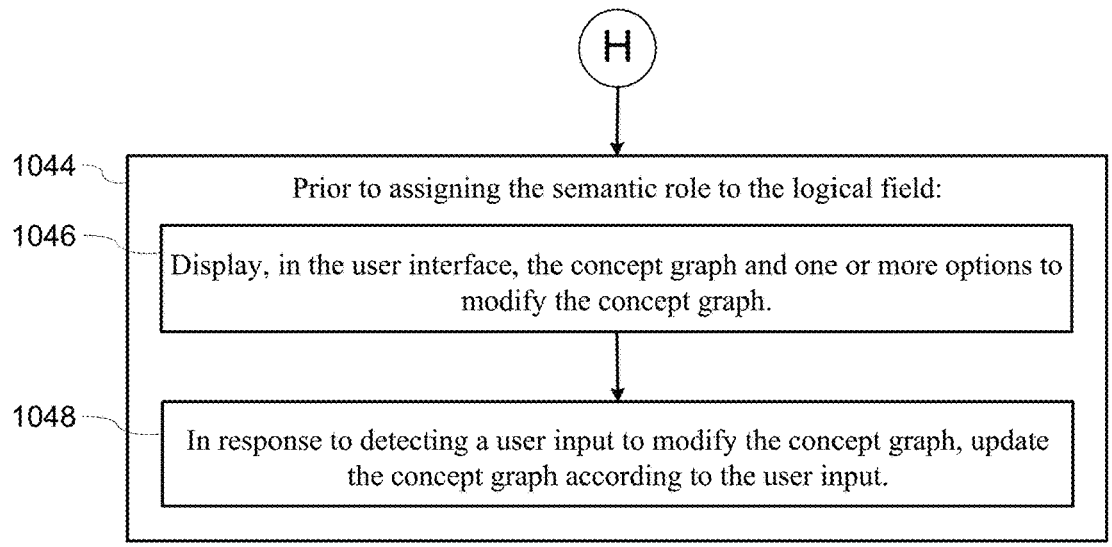
Figure 10J:
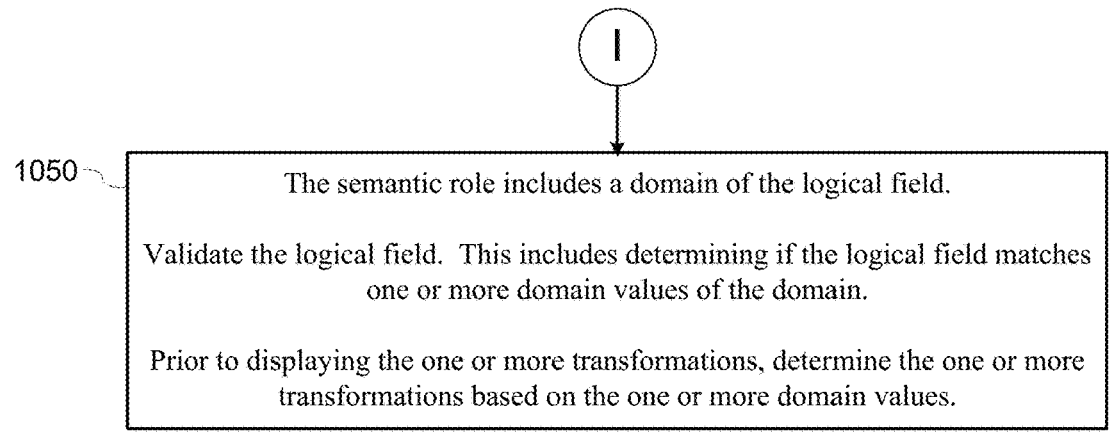
Figure 10K:
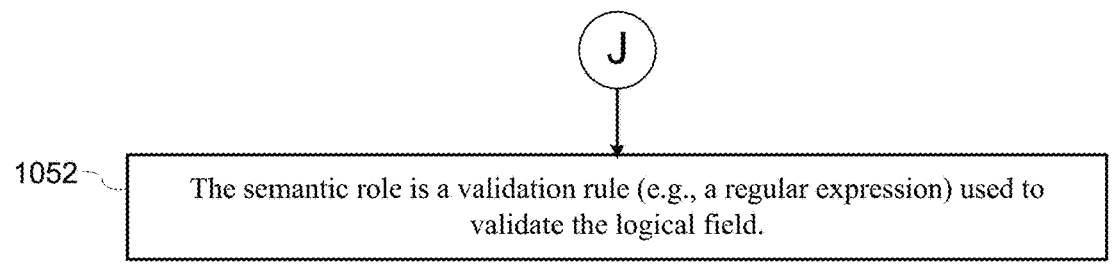
Figure 10L:
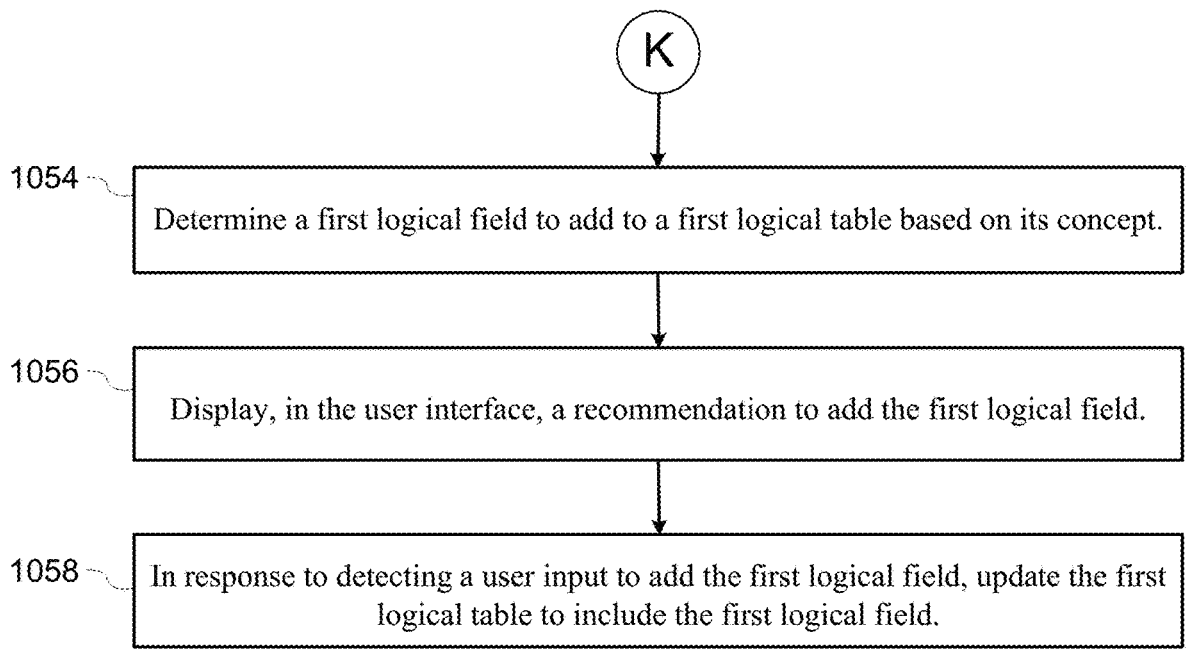
Figure 10M:
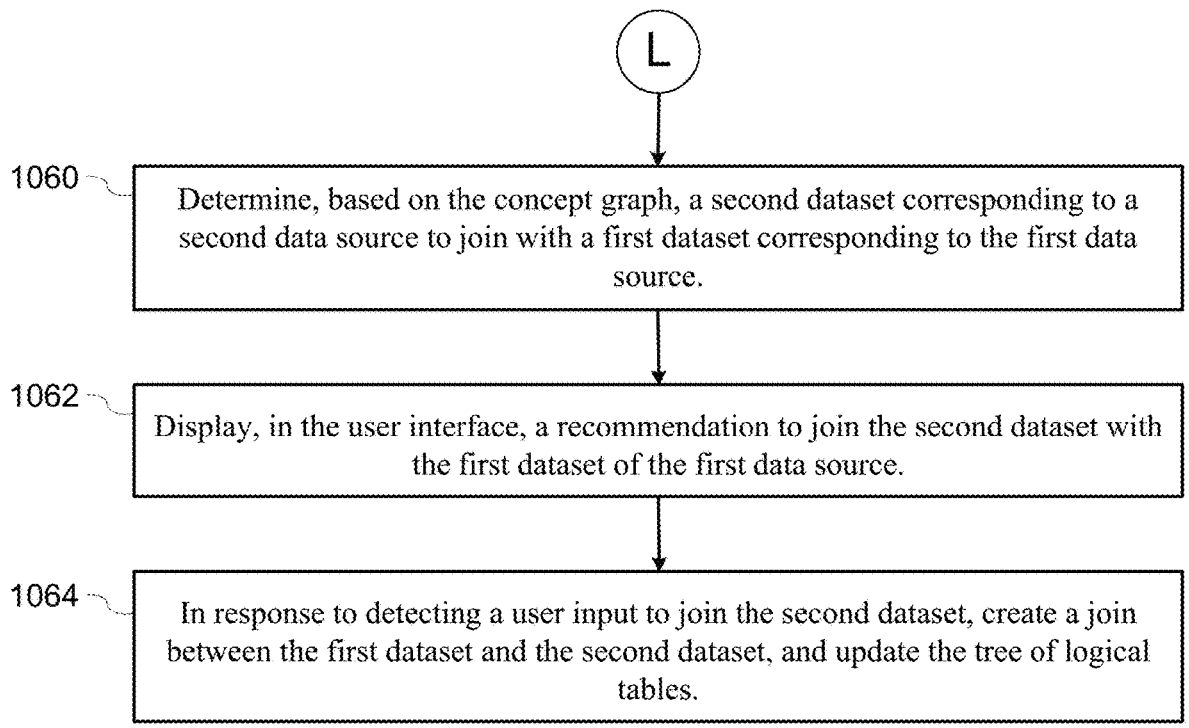
Figure 10N:
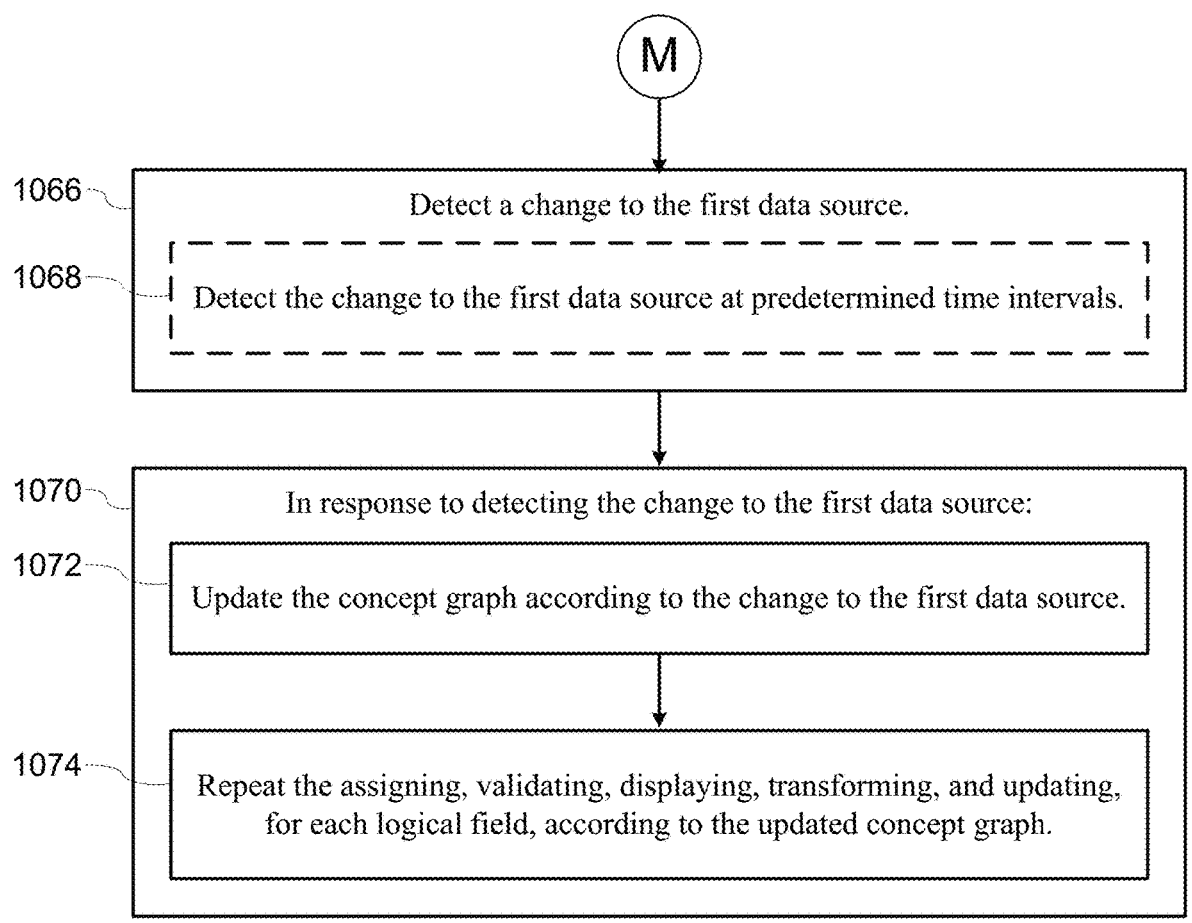

FIGS. 10A-10N provide a flowchart 1000 of a method of preparing data for subsequent analysis in accordance with some implementations. The method is typically performed at a computer 200 having a display 208, one or more processors 202, and memory 214 storing one or more programs configured for execution by the one or more processors.

The method includes obtaining (1002) a data model (e.g., the object model 108) encoding a first data source as a tree of logical tables. Each logical table has its own physical representation and includes a respective one or more logical fields. Each logical field corresponds to either a data field or a calculation that spans one or more logical tables. Each edge of the tree connects two logical tables that are related. The method also includes associating (1004) each logical table in the data model with a corresponding concept in a concept graph. The concept graph (e.g., a directed acyclic graph) embodies hierarchical inheritance of semantics for the logical tables. An example concept graph is described above in reference to FIG. 4, according to some implementations. The method also includes, for each logical field (1006) included in a logical table, assigning (1008) a semantic role (sometimes called a data role) to the logical field based on a concept corresponding to the logical table.

Referring next to FIG. 10B, in some implementations, the method further includes, for each logical field, storing (1016) its assigned semantic role to the first data source (or to an auxiliary data source).

Referring next to FIG. 10C, in some implementations, the method further includes generating (1018) a second data source based on the first data source and, for each logical field, storing its assigned semantic role to the second data source.

Referring next to FIG. 10D, in some implementations, the method further includes, for each logical field, retrieving (1020), from a second data source, distinct from the first data source, a representative semantic role (e.g., an assigned semantic role for a similar logical field). Assigning the semantic role to the logical field is further based on the representative semantic role. In some implementations, the user input is detected from a first user, and the method further includes, prior to retrieving the representative semantic role from the second data source, determining (1022) if the first user is authorized to access the second data source.

Referring next to FIG. 10E, in some implementations, the method further includes, displaying (1024), in the user interface, a first one or more semantic roles for a first logical field based on a concept corresponding to a first logical table that includes the first logical field. The method also includes, in response to detecting a user input selecting a preferred semantic role, assigning (1026) the preferred semantic role to the first logical field. In some implementations, the method further includes, selecting (1028) a second one or more semantic roles for a second logical field based on the preferred semantic role. The method also includes displaying (1030), in the user interface, the second one or more semantic roles for the second logical field. In response to detecting a second user input selecting a second semantic role from the second one or more semantic roles, the method includes assigning (1032) the second semantic role to the second logical field. In some implementations, the method further includes, training (1034) one or more predictive models based on one or more semantically-labeled data sources (e.g., data sources with data fields that have assigned or labeled semantic roles). The method also includes determining (1036) the first one or more semantic roles by inputting the concept corresponding to the first logical table to the one or more predictive models.

Referring next to FIG. 10F, in some implementations, the logical field is (1038) a calculation based on a first data field and a second data field, and assigning the semantic role to the logical field is further based on a first semantic role corresponding to the first data field and a second semantic role corresponding to the second data field.

Referring next to FIG. 10G, in some implementations, the method includes determining (1040) a default format for a data field corresponding to the logical field, and assigning the semantic role to the logical field is further based on the default format for the data field.

Referring next to FIG. 10H, in some implementations, the method further includes selecting and storing (1042), to the first data source, a default formatting option for displaying the logical field based on the assigned semantic role.

Referring next to FIG. 10I, in some implementations, the method further includes, prior to assigning (1044) the semantic role to the logical field, displaying (1046), in the user interface, the concept graph and one or more options to modify the concept graph. In response to detecting a user input to modify the concept graph, the method includes updating (1048) the concept graph according to the user input.

Referring back to FIG. 10A, the method also includes validating (1010) the logical field based on its assigned semantic role. Referring next to FIG. 10J, in some implementations, the semantic role includes (1050) a domain of the logical field, and validating the logical field includes determining if the logical field matches one or more domain values of the domain. The method further includes, prior to displaying the one or more transformations, determining the one or more transformations based on the one or more domain values. Referring next to FIG. 10K, in some implementations, the semantic role is (1052) a validation rule (e.g., a regular expression) used to validate the logical field.

Referring back to FIG. 10A, the method further includes displaying (1012), in a user interface on the display, one or more transformations to clean (or filter) the logical field based on validating the logical field. In response to detecting a user input selecting a transformation to transform the logical field, the method transforms (1014) the logical field according to the user input, and updates the logical table based on transforming the logical field.

Referring next to FIG. 10L, in some implementations, the method further includes determining (1054) a first logical field to add to a first logical table based on its concept. The method also includes displaying (1056), in the user interface, a recommendation to add the first logical field. In response to detecting a user input to add the first logical field, the method includes updating (1058) the first logical table to include the first logical field.

Referring next to FIG. 10M, in some implementations, the method further includes determining (1060), based on the concept graph, a second dataset corresponding to a second data source to join with a first dataset corresponding to the first data source. The method also includes displaying (1062), in the user interface, a recommendation to join the second dataset with the first dataset of the first data source. In response to detecting a user input to join the second dataset, the method also includes creating (1064) a join between the first dataset and the second dataset, and updating the tree of logical tables.

Referring next to FIG. 10N, in some implementations, the method further includes detecting (1066) a change to the first data source. In some implementations, detecting the change to the first data source is performed (1068) at predetermined time intervals. In response (1070) to detecting the change to the first data source, the method includes updating (1072) the concept graph according to the change to the first data source, and repeating (1074) the assigning, validating, displaying, transforming, and updating, for each logical field, according to the updated concept graph.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of preparing data for subsequent analysis, comprising:
    at a computer having a display, one or more processors and memory storing one or more programs configured for execution by the one or more processors:
        obtaining a data model encoding a first data source as a tree of logical tables, each logical table having its own physical representation and including a respective one or more data fields of the first data source, wherein each edge of the tree connects two logical tables that are related; and
        for each of a plurality of data fields included in the logical tables:
            automatically assigning a semantic role to the data field based on a concept obtained from a concept graph, a data type of the data field, and data values of the data field, wherein the concept graph embodies hierarchical inheritance of semantics and a child concept in the concept graph inherits characteristics of a parent concept in the concept graph;
            determining one or more hierarchies between the data field and other data fields in the first data source based on a respective semantic role of the data field and semantic roles of the other data fields;
            validating the data field based on the assigned semantic role and the determined one or more hierarchies;
            displaying, in a user interface on the display, one or more transformations to clean the data field based on the assigned semantic role; and
            in response to detecting a first user input selecting a transformation to transform data values from the data field:
                transforming one or more data values for the data field according to the first user input; and
                updating the logical table according to the transformed data values;
    wherein:
        a first logical table of the logical tables includes a calculated data field based on a calculation that uses a first data field and a second data field; and
        assigning a semantic role to the calculated data field is further based on a first semantic role corresponding to the first data field and a second semantic role corresponding to the second data field.

2. The method of claim 1, further comprising:
    for each data field included in a logical table, storing the assigned semantic role of the data field to the first data source.

3. The method of claim 1, further comprising:
    generating a second data source based on the first data source; and
    for each data field included in a logical table, storing the assigned semantic role of the data field in the second data source.

4. The method of claim 1, further comprising:
    for each of the plurality of data fields included in logical tables, retrieving, from a second data source, distinct from the first data source, a representative semantic role, wherein assigning the semantic role to the data field is further based on the representative semantic role.

5. The method of claim 4, wherein the first user input is detected from a first user, the method further comprising:
    prior to retrieving the representative semantic role from the second data source, determining whether the first user is authorized to access the second data source.

6. The method of claim 1, further comprising:
    displaying, in the user interface, one or more first semantic roles for a first data field; and
    in response to detecting a second user input selecting a preferred semantic role from the one or more first semantic roles, assigning the preferred semantic role to the first data field.

7. The method of claim 6, further comprising:
    automatically selecting one or more second semantic roles for a second data field based on the preferred semantic role;
    displaying, in the user interface, the one or more second semantic roles for the second data field; and
    in response to detecting a third user input selecting a third semantic role from the one or more second semantic roles, assigning the third semantic role to the second data field.

8. The method of claim 6, further comprising:
training one or more predictive models based on one or more semantically-labeled data sources; and
determining the one or more first semantic roles by inputting a first concept corresponding to a first data field included in a first logical table to the one or more predictive models.

9. The method of claim 1, further comprising:
for each of the plurality of data fields included in logical tables:
determining a default format for the data field, wherein automatically assigning the semantic role to the data field is further based on the default format for the first data field.

10. The method of claim 1, further comprising:
for each of the plurality of data fields included in logical tables:
selecting and storing, to the first data source, a default formatting option for displaying the data field based on the assigned semantic role.

11. The method of claim 1, further comprising:
prior to assigning the semantic role to the data field:
displaying, in the user interface, the concept graph and one or more options to modify the concept graph; and
in response to detecting a second user input to modify the concept graph, updating the concept graph according to the second user input.

12. The method of claim 1, wherein the semantic role comprises a domain of the data field, and validating the data field comprises determining whether data values for the data field match domain values of the domain, and the method further comprises:
prior to displaying the one or more transformations, determining the one or more transformations based on domain values for the domain.

13. The method of claim 1, wherein the semantic role is a validation rule used to validate the data field.

14. The method of claim 1, further comprising:
determining a first data field to add to a first logical table based on the first data field having a first concept;
displaying, in the user interface, a recommendation to add the first data field; and
in response to detecting a user input to add the first data field, updating the first logical table to include the first data field.

15. The method of claim 1, further comprising:
determining, based on the concept graph, a second dataset corresponding to a second data source to join with a first dataset corresponding to the first data source;
displaying, in the user interface, a recommendation to join the second dataset with the first dataset; and
in response to detecting a second user input to join the second dataset:
creating a join between the first dataset and the second dataset; and
updating the tree of logical tables.

16. The method of claim 1, further comprising:
detecting a change to the first data source; and
in response to detecting the change:
updating the concept graph according to the change; and
for each of the plurality of data fields included in logical tables:
repeating the automatically assigning, determining, validating, displaying, transforming, and updating according to the updated concept graph.

17. The method of claim 16, wherein detecting the change to the first data source is performed at predetermined time intervals.

18. A computer system for preparing data for subsequent analysis, comprising:
a display;
one or more processors; and
memory;
wherein the memory stores one or more programs configured for execution by the one or more processors, and the one or more programs comprising instructions for:
obtaining a data model encoding a first data source as a tree of logical tables, each logical table having its own physical representation and including a respective one or more data fields of the first data source, wherein each edge of the tree connects two logical tables that are related; and
for each of a plurality of data fields included in the logical tables:
automatically assigning a semantic role to the data field based on a concept obtained from a concept graph, a data type of the data field, and data values of the data field, wherein the concept graph embodies hierarchical inheritance of semantics and a child concept in the concept graph inherits characteristics of a parent concept in the concept graph;
determining one or more hierarchies between the data field and other data fields in the first data source based on a respective semantic role of the data field and semantic roles of the other data fields;
validating the data field based on the assigned semantic role and the determined one or more hierarchies;
displaying, in a user interface on the display, one or more transformations to clean the data field based on the assigned semantic role; and
in response to detecting a first user input selecting a transformation to transform data values from the data field:
transforming one or more data values for the data field according to the first user input; and
updating the logical table according to the transformed data values;
wherein:
a first logical table of the logical tables includes a calculated data field based on a calculation that uses a first data field and a second data field; and
assigning a semantic role to the calculated data field is further based on a first semantic role corresponding to the first data field and a second semantic role corresponding to the second data field.

19. A non-transitory computer readable storage medium storing one or more programs configured for execution by a computer system having a display, one or more processors, and memory, the one or more programs comprising instructions for:
obtaining a data model encoding a first data source as a tree of logical tables, each logical table having its own physical representation and including a respective one or more data fields of the first data source, wherein each edge of the tree connects two logical tables that are related; and
for each of a plurality of data fields included in the logical tables:
automatically assigning a semantic role to the data field based on a concept obtained from a concept graph, a data type of the data field, and data values of the data field, wherein the concept graph embodies hierarchical inheritance of semantics and a child concept in the concept graph inherits characteristics of a parent concept in the concept graph;

determining one or more hierarchies between the data field and other data fields in the first data source based on a respective semantic role of the data field and semantic roles of the other data fields;

validating the data field based on the assigned semantic role and the determined one or more hierarchies;

displaying, in a user interface on the display, one or more transformations to clean the data field based on the assigned semantic role; and in response to detecting a first user input selecting a transformation to transform data values from the data field:

transforming one or more data values for the data field according to the first user input; and updating the logical table according to the transformed data values;

wherein:

a first logical table of the logical tables includes a calculated data field based on a calculation that uses a first data field and a second data field; and assigning a semantic role to the calculated data field is further based on a first semantic role corresponding to the first data field and a second semantic role corresponding to the second data field.

\* \* \* \* \*